United States Patent
Ujisato et al.

(10) Patent No.: US 8,068,701 B2
(45) Date of Patent: Nov. 29, 2011

(54) IMAGE-PROCESSING APPARATUS, IMAGE-PROCESSING METHOD AND IMAGE-PROCESSING PROGRAM

(75) Inventors: Takanobu Ujisato, Tokyo (JP); Nobuhiro Tsunashima, Kanagawa (JP)

(73) Assignee: Sony Corporation (JP)

( * ) Notice: Subject to any disclaimer, the term of this patent is extended or adjusted under 35 U.S.C. 154(b) by 1077 days.

(21) Appl. No.: 11/897,005

(22) Filed: Aug. 28, 2007

(65) Prior Publication Data
US 2008/0056619 A1 Mar. 6, 2008

(30) Foreign Application Priority Data

Aug. 31, 2006 (JP) ................ P2006-236145
Sep. 20, 2006 (JP) ................ P2006-254817

(51) Int. Cl.
*G06K 9/54* (2006.01)
*G06K 9/46* (2006.01)
(52) U.S. Cl. ............ 382/305; 382/236
(58) Field of Classification Search .......... 382/103, 382/107, 236, 305; 348/143, 152, 155, 169
See application file for complete search history.

(56) References Cited

U.S. PATENT DOCUMENTS

| | | | |
|---|---|---|---|
| 5,268,968 A * | 12/1993 | Yoshida ............ | 382/141 |
| 5,933,534 A * | 8/1999 | Yoshimoto et al. ...... | 382/236 |
| 6,704,433 B2 * | 3/2004 | Matsuo et al. ........ | 382/103 |
| 7,184,604 B2 * | 2/2007 | Mizuno et al. ........ | 382/248 |

FOREIGN PATENT DOCUMENTS

| | | |
|---|---|---|
| JP | 11-146416 A | 5/1999 |
| JP | 2000-156852 A | 6/2000 |
| JP | 2000175178 A | 6/2000 |
| JP | 2002-368982 A | 12/2002 |
| JP | 2005-176339 A | 6/2005 |
| JP | 2006-031114 A | 2/2006 |
| JP | 2008-060967 A | 3/2008 |

OTHER PUBLICATIONS

Toygar, et al. "Boosting Face Recognition Speed with a Novel Divide-and-Conquer Approach", Springer-Verlag Berlin Heidelberg 2004, pp. 430-439.*
Akihiko Iketani, et al: "Detecting Persons on Changing Background" Proceedings of 14th International Conference of Pattern Recognition, vol. 1, pp. 74-76; Aug. 1998.
Search Report from Singapore Application No. 2010005569, dated Oct. 29, 2010.

* cited by examiner

*Primary Examiner* — Daniel Mariam
(74) *Attorney, Agent, or Firm* — Lerner, David, Littenberg, Krumholz & Mentlik, LLP

(57) ABSTRACT

Disclosed herein is an image-processing apparatus which may include an image holding section configured to store an input image; an image division section configured to divide the input image stored in the image holding section into a plurality of image portions having the same size and the same shape; a characteristic-quantity computation section configured to compute a characteristic quantity of each of the image portions generated by the image division section; and a difference computation section configured to carry out a difference computation process of computing a difference between the characteristic quantity computed by the characteristic-quantity computation section as the characteristic quantity of each individual one of the image portions generated by the image division section and a value determined in advance as well as a determination process of producing a result of determination as to whether or not the individual image portion is a portion of a background of the input image on the basis of the difference.

17 Claims, 36 Drawing Sheets

F I G . 2
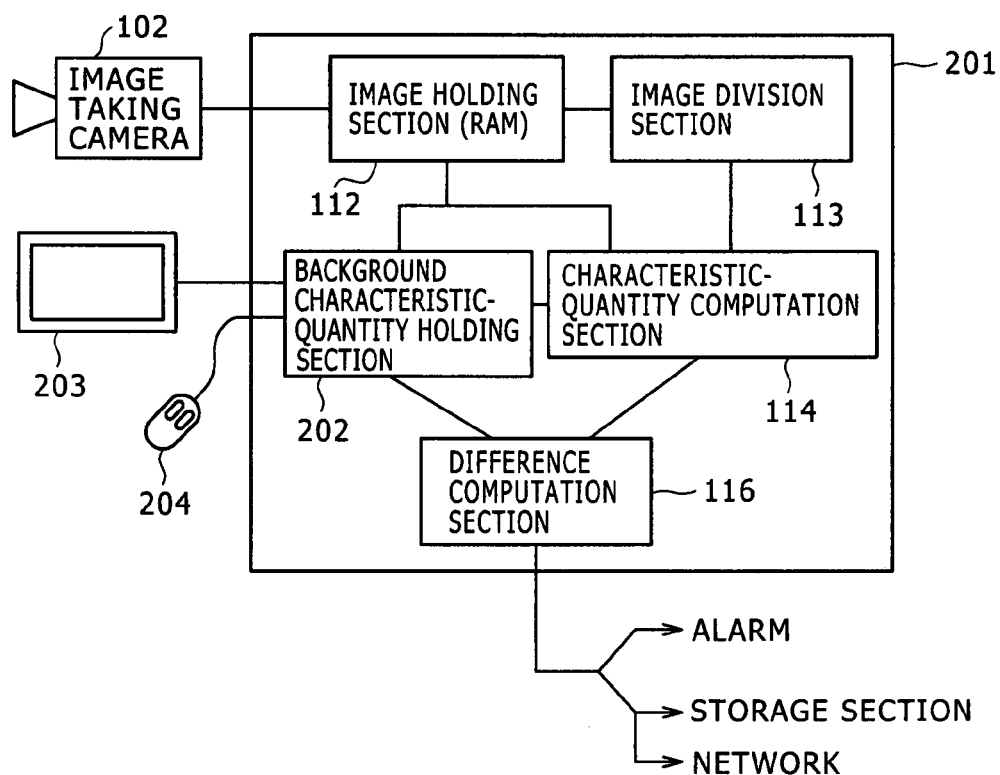

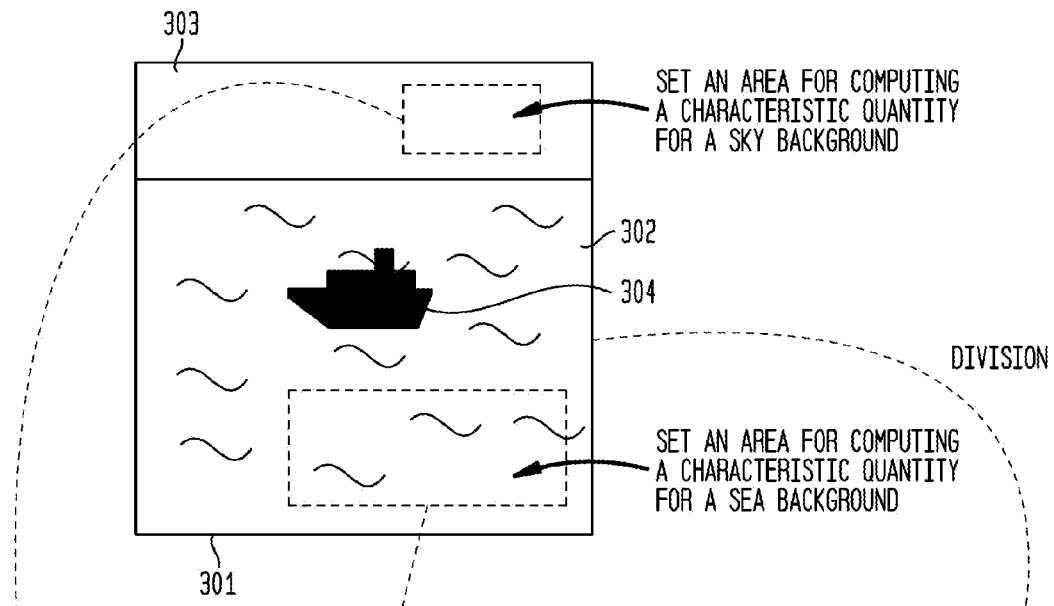
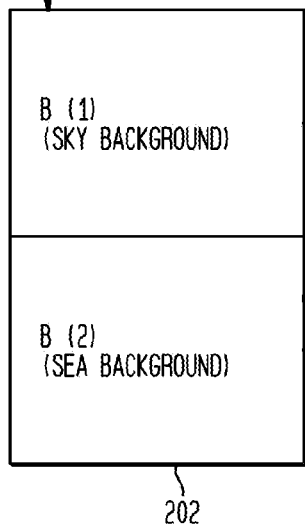

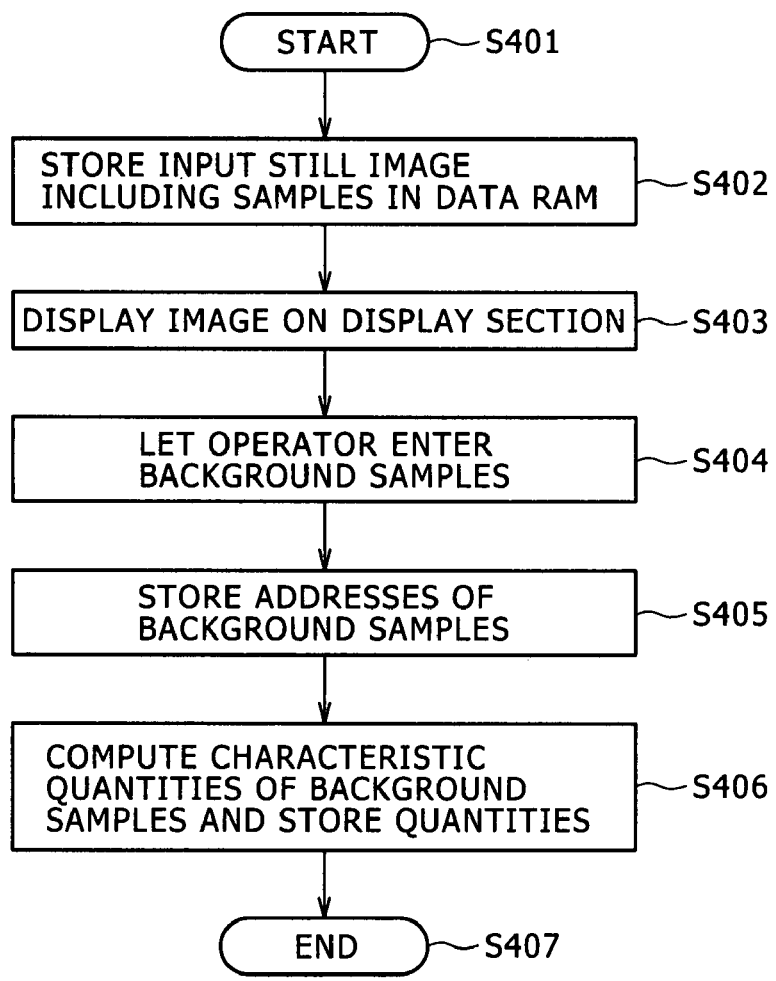

801

802

FOURIER ANALYSIS f (x,y)

FIG. 12A
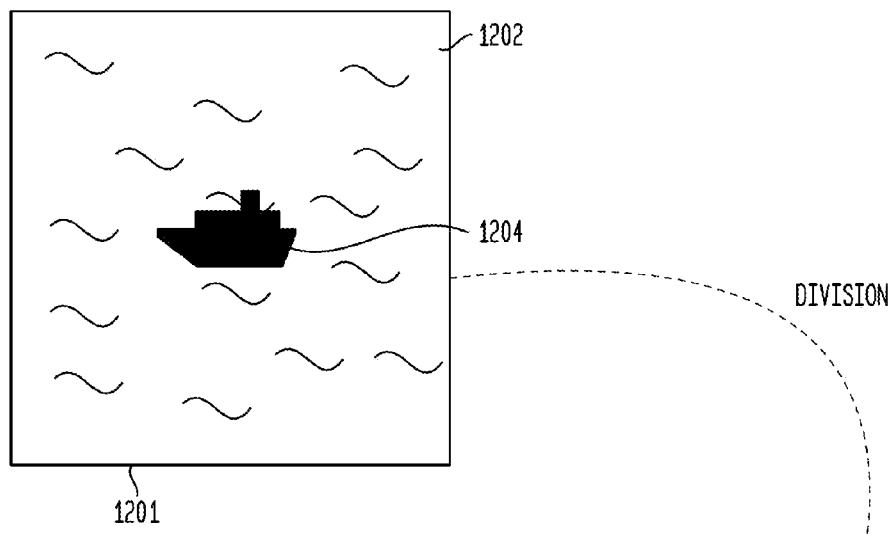
FIG. 12B
FIG. 12C
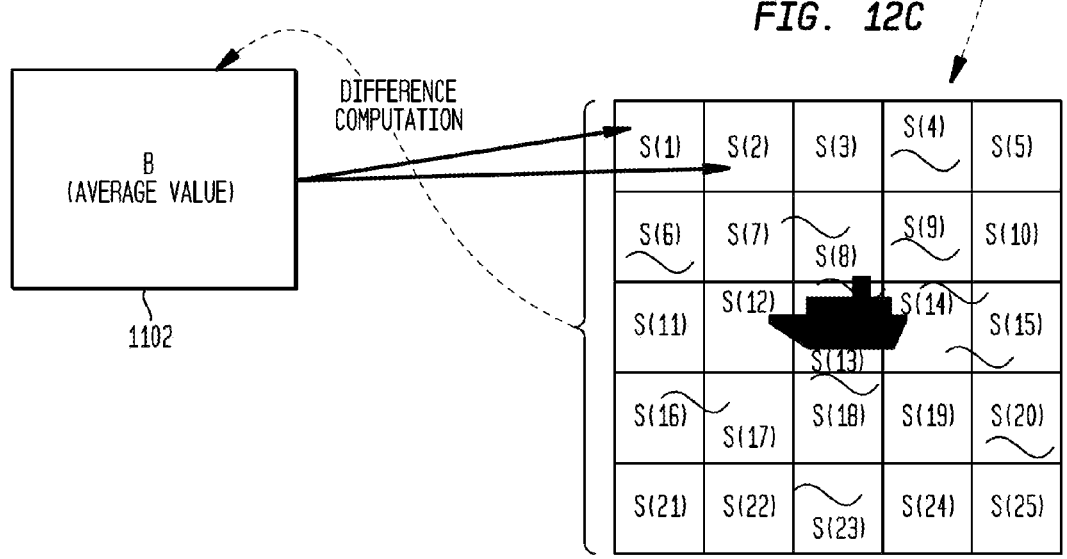

PIECES OF INFORMATION ON
POSITIONS OF AN OBJECT DETECTED
BY COMPUTATION OF CHARACTERISTIC
QUANTITIES ARE COMPARED WITH EACH
OTHER TO DETECT THE MOVEMENT OF THE
OBJECT WITHOUT DETECTING WAVE MOVEMENTS

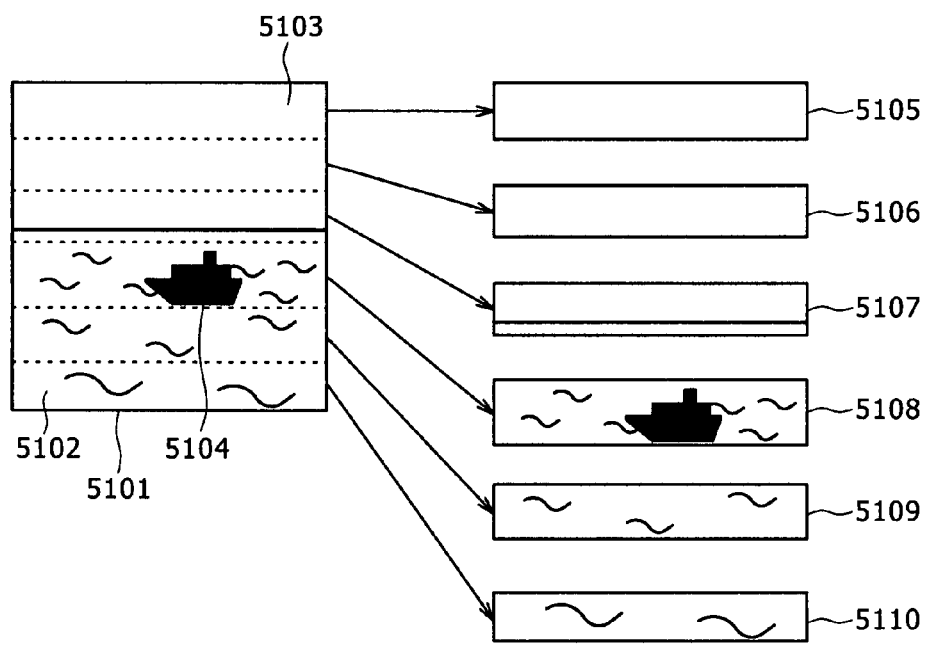

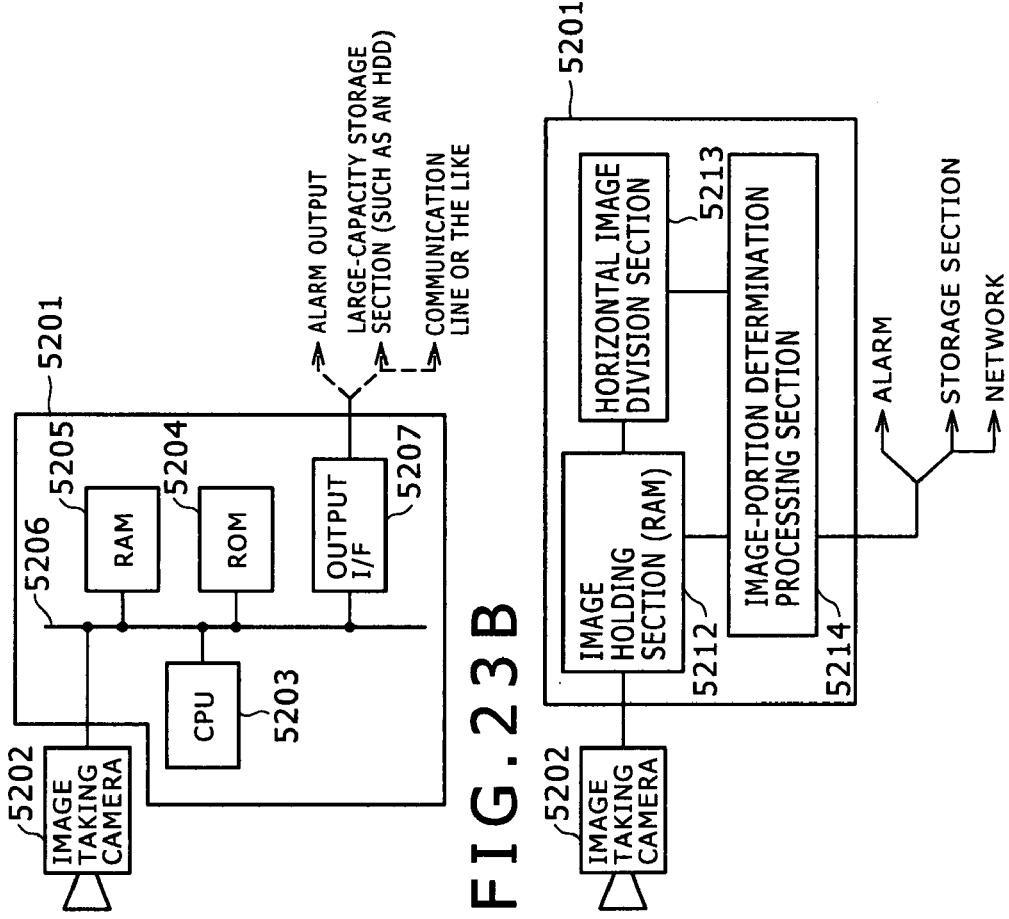
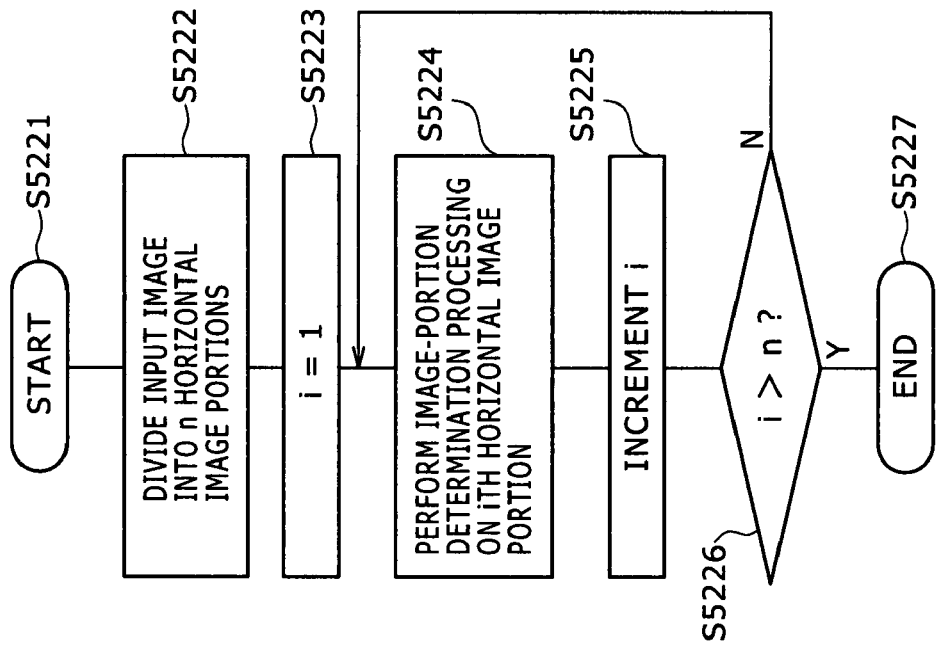

FIG.27A
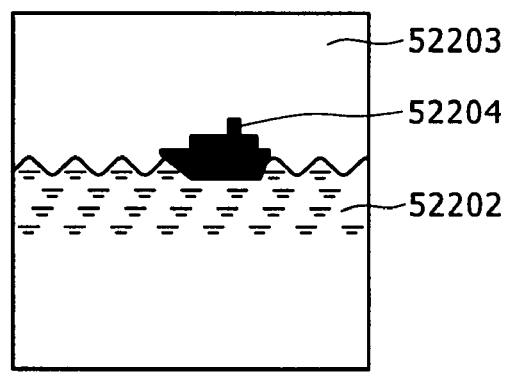
FIG.27B
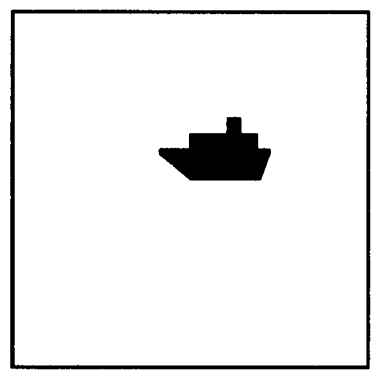
FIG.27C

IMAGE-PROCESSING APPARATUS, IMAGE-PROCESSING METHOD AND IMAGE-PROCESSING PROGRAM

CROSS-REFERENCE TO RELATED APPLICATIONS

This application claims priority from Japanese Patent Application No. JP 2006-236145 filed in the Japanese Patent Office on Aug. 31, 2006, and Japanese Patent Application No. JP 2006-254817 filed in the Japanese Patent Office on Sep. 20, 2006, the entire contents of which are incorporated herein by reference.

BACKGROUND OF THE INVENTION

1. Field of the Invention

The present invention relates to an image-processing apparatus, an image-processing method and an image-processing program. To put it in detail, the present invention relates to a technology suitably applicable to detection of an unidentified object and/or a suspicious individual from an image obtained as a result of photographing a monitored place determined in advance by making use of a monitoring camera.

2. Description of the Related Art

A monitoring system in related art for monitoring objects determined in advance by making use of a monitoring camera. In the monitoring system, a monitoring object is monitored by visually recognizing an image obtained from a photographing operation making use of a monitoring camera as the image of the monitoring object.

With such a monitoring camera, however, it becomes difficult for the monitoring person to continuously carry out the monitoring operation for 24 hours as the number of places to be monitored increases. In addition, the monitoring system is also forced to store a limited number of images in a video recorder connected to the monitoring camera in order to shorten the operating time.

Thus, it is necessary to provide the monitoring system with a technology for detection of an unidentified object and/or a suspicious individual from an input image.

For example, in a bank ATM or the like, if a sensor capable of detecting a human body is available, it will be relatively easy to satisfy the requirement described above.

However, such a sensor may not be used for detection of an unidentified object and/or a suspicious individual from a remote scene such as seashore.

SUMMARY OF THE INVENTION

In many cases in the past, there was adopted a monitoring technique disclosed in Japanese Patent Laid-open No. 2006-14215 as a technique of comparing the present image with an image immediately preceding the present image in a situation described above.

When a physical body enters a place being monitored, the brightness of an image portion composed of the physical body in video data changes to a brightness level different from the place. Thus, by detecting an area having a difference in luminance from the rest of the image as a different area, the physical body can be detected. In the case of a scenery such as a sea, a desert, a field of grass or the sky, however, things other than the physical body serving as the object of detection also move. Examples of the things other than the physical body are the water of the sea, the sands of the desert, the grass of the grass field and clouds in the sky. Thus, the technique in related art has a problem that a result of comparing the present image with an image immediately preceding the present image causes the other things to be detected mistakenly as a moving physical body or the like.

As a method serving as a solution to the problem, documents such as Japanese Patent Laid-open No. Hei 10-328226 disclose another technique in related art.

In accordance with the technique disclosed in Japanese Patent Laid-open No. Hei 10-328226, a difference between the present image taken in a photographing operation and an image immediately preceding the present image is created and converted into binary data by carrying out a threshold comparison process. At the same time, a background image changing a threshold value with a cumulative result of past differences taken as a reference is generated in an attempt to reduce the number of detections mistakenly made as detections of fluctuations of trees an/or a water surface, which exist in the background image.

In accordance with this technique, however, a case in which the threshold value becomes an excessively large value for a larger luminance change caused typically by a fluctuation of a tree is very likely conceivable. In such a case, it is feared that an intrusion made by an intruder or the like as an intrusion of importance is undetected undesirably.

According to an embodiment of the present invention, it may be desirable to provide an image-processing apparatus capable of stably detecting an intrusion made by a suspicious individual or an unidentified object from an image taken in a photographing operation by making use of a monitoring camera for monitoring a place at which fluctuations caused by mainly natural phenomena as fluctuations of an image, which is taken in the photographing operation as the picture of the water of a sea, the sands of a desert, the grass of a grass field and snows in the sky, take place.

According to an embodiment of the present invention, the image-processing apparatus may once store an input image and then divide the image into image portions having the same size and the same shape. Subsequently, the image-processing apparatus may compute a characteristic quantity for each of the image portions. Then, a difference between each of the computed characteristic quantities and a value determined in advance may be computed and used to produce a result of determination as to whether or not the image portion associated with the computed quantity is a background. Then, on the basis of the determination result, information on the existence/nonexistence of an unidentified object or the like may be output.

The inventors of the present invention have determined that the method used for distinguishing the background and an unidentified object or the like from each other in a photographing object moving while following rules determined in advance as is the case with a natural scene such as a sea may be improper. The method is based on the technology in related art and is used for distinguishing the background and an unidentified object or the like from each other by comparing the present image with an image immediately preceding the present image. Then, the inventors of the present invention searched for a technology for distinguishing the background and an unidentified object or the like from each other by making use only an input image. As a result, the image-processing apparatus according to an embodiment of the present invention may divide the image into image portions having the same size and the same shape. Subsequently, the image-processing apparatus may compute a characteristic quantity for each of the image portions. Then, a difference between each of the computed quantities and a value determined in advance may be computed.

Let us assume for example that the entire image is a background. In this case, the characteristic quantity computed for each of the image portions obtained as a result of dividing the image hardly may change from area to area. In accordance with the image processing method based on this technological concept, even if the image fluctuates due to natural phenomena as is the case with the image of a sea, the sky or the like, an unidentified object or the like may be distinguished from the background having a constant characteristic quantity and a fluctuating background such as a sea and the sky.

According to an embodiment of the present invention, there is provided an image-processing apparatus as a monitoring apparatus for monitoring a background exhibiting constant fluctuations as is the case with specially a sea, a desert, a field of grass or the sky. The image-processing apparatus is capable of recognizing a background without mistakenly recognizing each of natural phenomena such as waves of a sea and clouds in the sky as an unidentified object or the like.

The embodiments may each demonstrate a high capability of detecting an unidentified object from one input image of a natural scenery or the like without dividing the input image into a plurality of horizontal image portions.

In the case of an image taken from a remote location as the image of a scenery as described earlier, however, one input image does not always assure a result that can be said to be a satisfactory result of detection of an unidentified object. Thus, in order to solve the problem, in a process of detecting an unidentified object from an image taken from a remote location, the input image may be divided into a plurality of horizontal image portions in preprocessing before carrying out a variety of determination processes to be explained below. Then, each of the horizontal image portions may be handled as an image in execution of the determination processes. The preprocessing may contribute to improvement of the detecting an unidentified object from an image taken from a remote location.

BRIEF DESCRIPTION OF THE DRAWINGS

These and other features of the present invention will become clear from the following description of the preferred embodiments given with reference to the accompanying diagrams, in which:

FIG. 2 is a block diagram showing an entire image-processing apparatus according to the first embodiment of the present invention;

FIG. 3A is a diagram showing a typical image taken by making use of the image-processing apparatus according to the first embodiment as an image of a sea, the sky and a ship serving as an unidentified object;

FIG. 3B is a diagram showing backgrounds of the image shown in FIG. 3A;

FIG. 3C is a diagram showing fine image portions obtained as a result of dividing the image shown in FIG. 3A;

FIG. 4 shows a flowchart representing preprocessing preceding actual operations carried out by the image-processing apparatus according to the first embodiment;

FIG. 12A is a diagram showing a typical image taken by making use of the image-processing apparatus according to the second embodiment as an image of a sea and a ship serving as an unidentified object;

FIG. 12B shows an average-value holding section for holding a value computed by the average-value holding section as the average value of characteristic quantities S(1) to S(25) each found by the characteristic-quantity computation section as the characteristic quantity of one of image portions shown in FIG. 12C;

FIG. 12C is a diagram showing the image portions obtained as a result of dividing the image shown in FIG. 12A;

FIG. 22A is a diagram showing a typical image taken by making use of an image-processing apparatus according sixth to ninth embodiments as an image including a sea, the sky and a ship serving as an unidentified object floating on the sea;

FIG. 22B is a diagram showing horizontal image portions obtained as a result of dividing the image shown in FIG. 22A;

FIG. 23A is a block diagram mainly showing actual hardware of an entire image-processing apparatus according to the sixth to ninth embodiments of the present invention;

FIG. 23B is a block diagram showing mainly functional sections of the entire image-processing apparatus shown in FIG. 23A;

FIG. 23C shows a flowchart representing processing carried out by the image-processing apparatus shown in FIG. 23B;

FIG. 27A is a diagram roughly showing an input-image bitmap stored in the RAM employed in the sixth embodiment;

FIG. 27B is a diagram roughly showing an image flag bitmap stored in the RAM employed in the sixth embodiment;

FIG. 27C is a diagram roughly showing an enlarged portion of the image flag bitmap shown in FIG. 27B;

DETAILED DESCRIPTION

First to fifth embodiments of the present invention are explained by referring to FIGS. 1 to 21.

1: Outline of the Embodiments

Figure 1A:
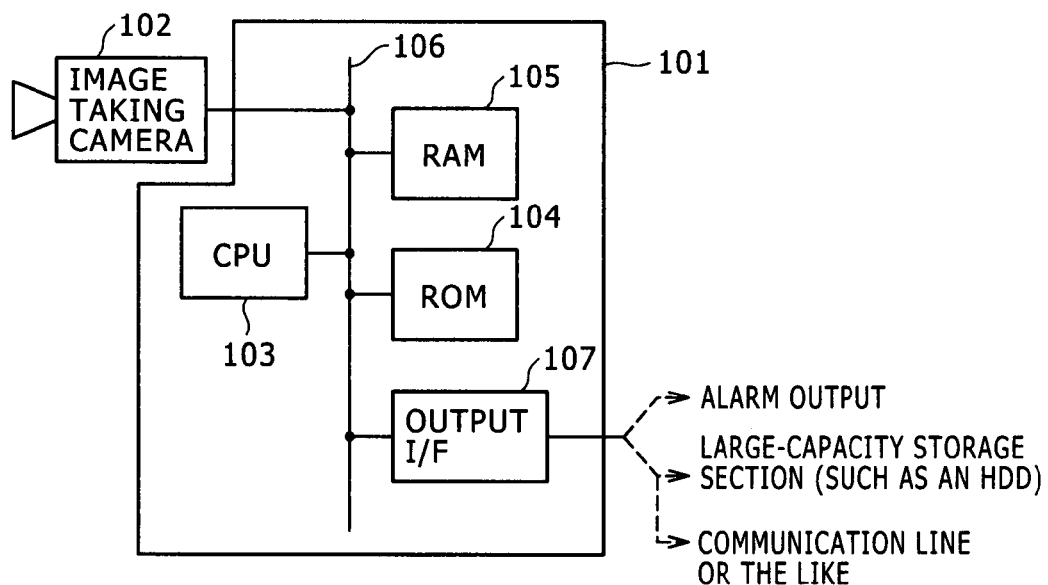
FIG. 1A is a block diagram mainly showing actual hardware of each of entire image-processing apparatus according to first to fifth embodiments of the present invention.
Figure 1B:
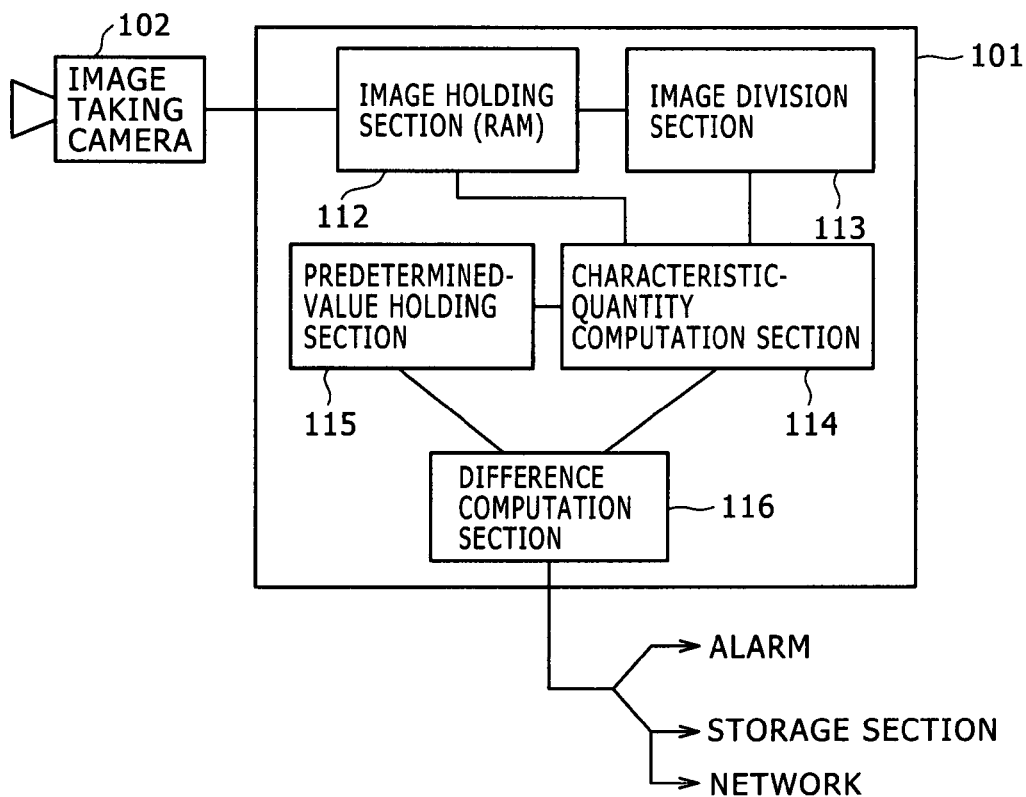
FIG. 1B is a block diagram showing mainly functional sections of the entire image-processing apparatus shown in FIG. 1A.

FIG. 1 is an entire block diagram showing an image-processing apparatus based on a concept common to embodiments of the present invention. To be more specific, FIG. 1A is a block diagram mainly showing actual hardware of the image-processing apparatus whereas FIG. 1B is a block diagram showing mainly functional sections of the apparatus.

The image-processing apparatus 101 shown in FIG. 1A detects the existence or nonexistence of an unidentified object from an image output by an image-taking camera 102 and generates a binary signal serving as an alarm output for reporting the existence of the unidentified object or generates an image signal obtained as a result of a process determined in advance. The image-taking camera 102 is a generally known camera employing typically a CCD image taking device for generating the image signal. The image signal generated by the image-taking camera 102 is stored in a large-capacity memory such as an HDD or output to a host apparatus through a communication line or the like.

The image-processing apparatus 101 is basically a microcomputer employing a CPU 103, a RAM 105 and a ROM 104, which are connected to each other by a bus 106. The CPU 103, the RAM 105 and the ROM 104 carry out a process determined in advance on the image output by the image-taking camera 102 in order to generate a signal determined in advance or the like. Then, the image-processing apparatus 101 outputs the signal through an output I/F 107.

It is to be noted that the configuration shown in FIG. 1A is a configuration common to all embodiments to be described later in detail.

All the functional sections shown in FIG. 1B except an image holding section 112 and a predetermined-value holding section 115 are software programs stored in the ROM 104 to be executed by the microcomputer described above. The image holding section 112 is implemented as the RAM 105 whereas the predetermined-value holding section 115 includes the RAM 105 and the ROM 104.

An image received from the image-taking camera 102 is stored in the image holding section 112 as a still image.

An image division section 113 is a module for dividing the image stored in the image holding section 112 into image portions having the same size and the same shape.

A characteristic-quantity computation section 114 is a module for computing the characteristic quantity of each of the image portions obtained as a result of the process carried out by the image division section 113 to divide the image stored in the image holding section 112. The predetermined-value holding section 115 is a unit for providing a comparison value for each characteristic quantity computed by the characteristic-quantity computation section 114 or providing predetermined data based on a characteristic quantity. A difference computation section 116 is a module for computing the difference between each characteristic quantity computed by the characteristic-quantity computation section 114 and the comparison value provided by the predetermined-value holding section 115 or the predetermined data provided by the predetermined-value holding section 115 as data based on a characteristic quantity. The result of the process carried out by the difference computation section 116 is a binary alarm or an image output to a storage unit or a network.

It is to be noted that the configuration shown in FIG. 1B is a configuration common to all embodiments to be described later in detail.

The characteristic quantities computed by the characteristic-quantity computation section 114 for an image represent the pattern or texture of the image. That is to say, the characteristic quantities represent approximately what is called a texture in ordinary rendering software.

If the image is a picture of a grass field, the image includes a number of inclined parabolic lines with dark and light green colors.

If the image is a picture of the tranquil surface of a sea, a number of fine horizontal patterns reflecting sun light with the dark blue color serving as the underlying trend or a number of white portions such as wave splashes exist on the surface.

These natural sceneries do not mechanically create a fixed pattern such as tiling created artificially. Instead, each of the natural sceneries is recognized as an image having random variations and creating characteristics of resembling fixed patterns. Wave splashes do not exist in a field of grass while inclined parabolic lines with dark and light green colors do not exist on the tranquil surface of a sea.

These natural sceneries change due to natural phenomena as time goes by. Thus, by merely comparing a plurality of still images taken at different times in accordance with the existing technology, a background which should be naturally recognized as a background is mistakenly recognized as an unidentified object due to the fact that the background is moving.

By grasping the texture of the background in the case of a moving background, the embodiments are capable of providing a technology for recognizing a background with a high degree of consistency without being tripped up by changes occurring along the time axis.

By grasping the texture of a background or the pattern of a background, the characteristic of a foreign object can also be picked up as well. Thus, the process of picking up the texture of a background or the pattern of a background is a process to compute a characteristic quantity.

As described above, an input image is divided into uniform and fine image portions having the same size and the same shape and the characteristic quantity of each of the image portions is then computed. If a specific one of the computed characteristic quantities of the image portions shows a value deviating from the characteristic quantity of the background of the image, the specific characteristic quantity is determined to be the characteristic quantity of an unidentified object existing on the image. Thus, the characteristic quantity is computed for each of the image portions and compared with a target characteristic quantity set for the image portions in order to determine the degree of similarity between the computed characteristic quantity and the target characteristic quantity or the degree of dissimilarity between the computed characteristic quantity and the target characteristic quantity. In the following description, the target characteristic quantity is referred to as the characteristic quantity of a sample, which is selected from the background of the image. This is referred to as a difference computation process. Finally, the computed difference is typically compared with a threshold value determined in advance in order to produce a result of determination as to whether or not the image portion, for which the characteristic quantity has been computed, is a portion of the background used as the sample. This series of processes described above is an extension of a technological concept of computing a difference in luminance between individual pixels.

What is described above is a concept common to all embodiments.

A later description will explain how a characteristic quantity is obtained and how a difference between characteristic quantities is computed.

2: First Embodiment

A first embodiment is explained as follows. First of all, an outline of the embodiment is described. In this embodiment, an image is provided in advance, the background of the image is specified manually as a sample mentioned above and the characteristic quantity of the background is held. Then, when the image-processing apparatus is put in an actual operating state later on, the characteristic quantities each found for a portion of an input image are compared with the held characteristic quantity of the background.

FIG. 2 is a block diagram showing an image-processing apparatus 201 according to the first embodiment of the present invention. The diagram is based on FIG. 1B.

The image holding section 112 is a section for once storing an input still image generated by the image-taking camera 102.

The image division section 113 is a section for dividing the input still image into fine image portions.

The characteristic-quantity computation section 114 is a section for computing the characteristic quantity of each of the image portions.

On the other hand, a background characteristic-quantity holding section 202 is a section used for holding a characteristic quantity in advance as the characteristic quantity of a background specified by an operation carried out by the operator as a sample.

The difference computation section 116 is a section for computing a difference between a characteristic quantity computed by the characteristic-quantity computation section 114 for each of the image portions with the background characteristic quantity held in the background characteristic-quantity holding section 202 in order to produce a result of determination as to whether the image portion is a background portion.

If the determination result based on the difference computed by the difference computation section 116 is not a background portion, an alarm is output in order to notify the operator that an unidentified object exists in the input still image.

The background characteristic-quantity holding section 202 is connected to a display section 203 and an input section 204.

The display section 203 is a commonly known display unit such as an LCD unit.

The input section 204 is a generally known pointing device such as a mouse.

As described above, the background characteristic-quantity holding section 202 is a section used for holding a characteristic quantity in advance as the characteristic quantity of a background, which is specified from the input still image held in the image holding section 112 in an operation carried out by the operator as a sample. To put it in detail, before the image-processing apparatus is put in an actual operating state, an input image including the background sample is displayed on the display section 203 and, then, the operator operates the input section 204 in order to specify a range in the input image to serve as a background sample. The characteristic-quantity computation section 114 computes the characteristic quantity of the background used as the sample and stores the characteristic quantity in the background characteristic-quantity holding section 202.

FIGS. 3A, 3B and 3C are diagrams showing a typical image referred to in description of an outline of operations carried out by the image-processing apparatus according to the first embodiment.

FIG. 3A shows a typical image 301 of a sea 302, the sky 303 and a ship 304 serving as an unidentified object. The image is stored in the image holding section 112.

FIG. 3B shows backgrounds each specified as a sample in an operation carried out by the operator on the input section 204 from the image 301, which is displayed on the display section 203 in accordance with the operation carried out by the operator. The characteristic-quantity computation section 114 computes the characteristic quantity of each of the backgrounds and stores the characteristic quantities of the backgrounds in the background characteristic-quantity holding section 202 as the characteristic quantities of the samples. In the case of the image shown in FIG. 3A, the operators specifies two background samples B(1) and B(2), which are samples selected from the sky 303 and the sea 302 respectively.

FIG. 3C shows fine image portions generated by the image division section 113 as a result of dividing, the image 301. The characteristic-quantity computation section 114 computes the characteristic quantity of each of the image portions. As shown in the typical case of FIG. 3C, the image division section 113 divides the image 301 into 25 image portions S(1) to S(25).

The difference computation section 116 computes a difference between the characteristic quantity of each of the background samples B(1) and B(2) and the characteristic quantity of each of the image portions S(1) to S(25). To be more specific, the characteristic-quantity differences sequentially computed by the difference computation section 116 as the differences between the background samples B(1) and B(2) and the image portions S(1) to S(25) are listed as follows:

The difference between the characteristic quantities of the background sample B(1) and the image portion S(1);

the difference between the characteristic quantities of the background sample B(2) and the image portion S(1);

the difference between the characteristic quantities of the background sample B(1) and the image portion S(2);

the difference between the characteristic quantities of the background sample B(2) and the image portion S(2); and so on and, finally, the difference between the characteristic quantities of the background sample B(1) and the image portion S(25); and the difference between the characteristic quantities of the background sample B(2) and the image portion S(25).

Figure 5:
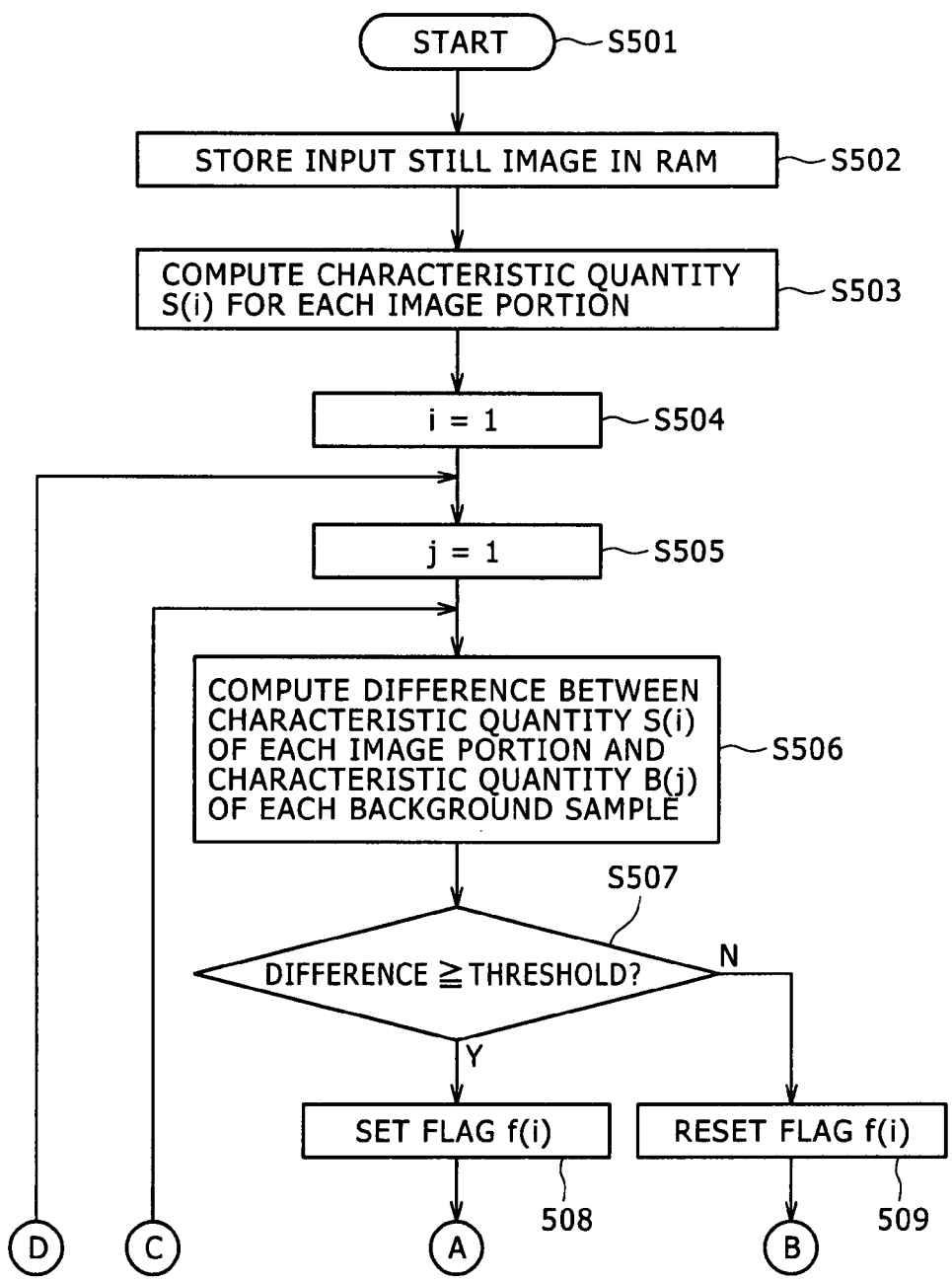
FIG. 5 shows the first part of a flowchart representing the actual operations carried out by the image-processing apparatus according to the first embodiment.
Figure 6:
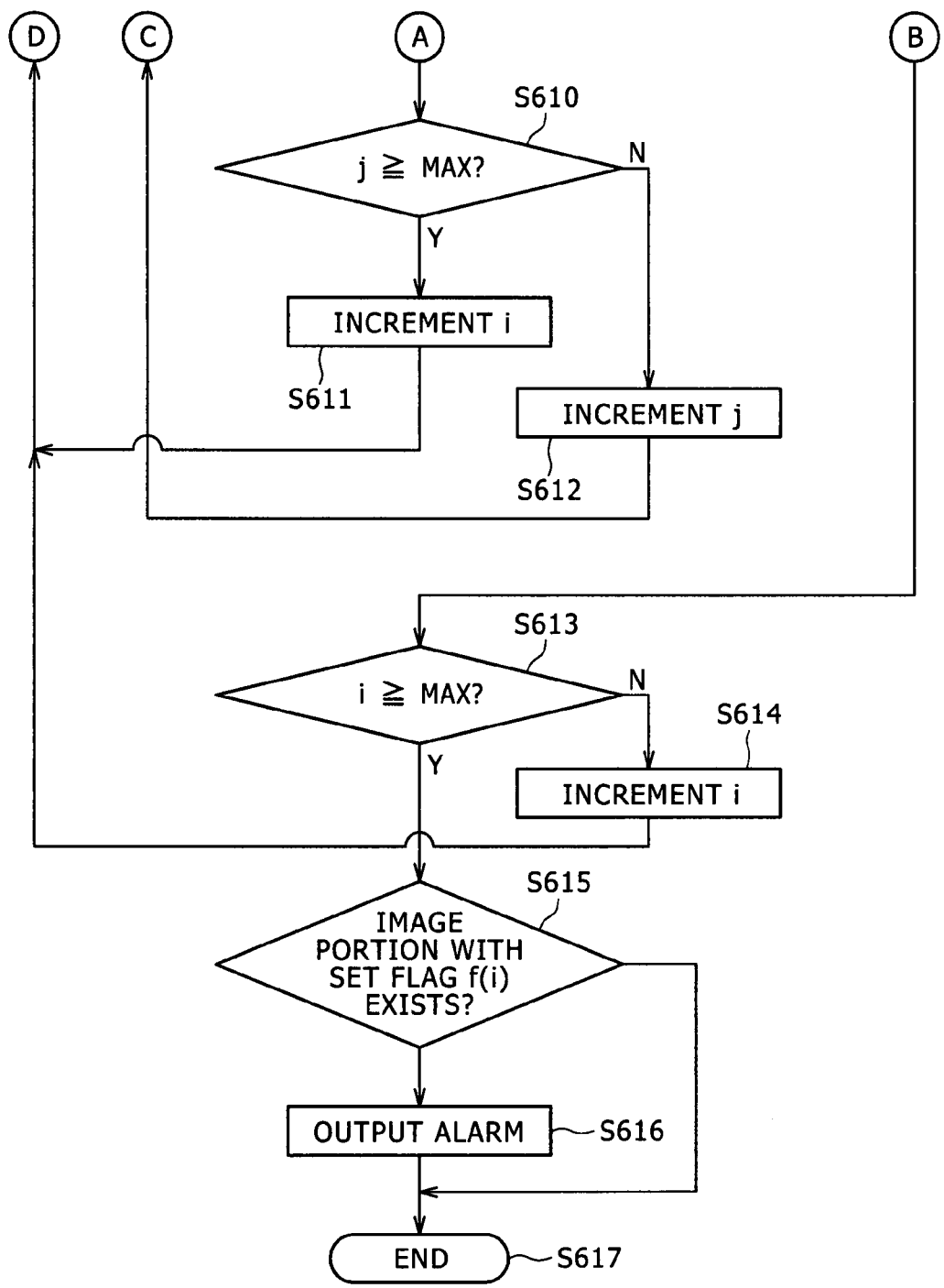
FIG. 6 shows the second part of the flowchart representing the actual operations carried out by the image-processing apparatus according to the first embodiment.

FIGS. 4, 5 and 6 show flowcharts representing details of the operations described above.

FIG. 4 shows a flowchart representing preprocessing preceding actual operations carried out by the image-processing apparatus 201 according to the first embodiment. As shown in the figure, the flowchart begins with a step S401 at which the execution of the preprocessing is commenced. Then, at the next step S402, an input still image including samples to be specified by the operator is stored in a RAM of the image holding section 112. As will be described below, backgrounds of the input still image are specified by the operator as samples.

Then, at the next step S403, the input still image is displayed on the display section 203.

While visually confirming the input still image displayed on the display section 203, at the next step S404, the operator operates the input section 204 in order to enter the range of addresses of every background to be used as a sample.

After the operator verifies the specified address ranges, at the next step S405, the address ranges are stored in the RAM. Then, at the next step S406, pixels of each of the address ranges each serving as a sample are extracted from the input still image and a characteristic quantity of the pixels is computed for each of the address ranges. Then, the characteristic quantities are held in the background characteristic-quantity holding section 202. Finally, at the last step S407, the execution of the preprocessing represented by this flowchart is ended.

FIGS. 5 and 6 show a flowchart representing the actual operations carried out in an operating state by the image-processing apparatus 201 according to the first embodiment.

As shown in FIG. 5, the flowchart begins with a step S501 at which execution of the actual operations is started. Then, at the next step S502, an input still image is stored in the RAM of the image holding section 112.

Then, at the next step S503, the characteristic-quantity computation section 114 computes the characteristic quantity of each of image portions generated by the image division section 113 as a result of dividing the input still image.

Subsequently, at steps following the step S503, the difference between the characteristic quantity of each of the image portions and the characteristic quantity of each of the background samples is computed.

At a step S504, a variable i is initialized to 1. The variable i is a variable used for identifying an image portion serving as an object in the processing to compute the difference between characteristic quantities.

By the same token, at a step S505, a variable j is initialized to 1. The variable j is a variable used for identifying a background sample serving as an object in the processing to compute the difference between the characteristic quantities.

Then, at the next step S506, the difference between the characteristic quantity of a background sample B(j) and the characteristic quantity of an image portion S(i) is computed.

Subsequently, at the next step S507, the difference computed in the process carried out at the step S506 is compared with a stored threshold value determined in advance. If the determination result indicates that the difference is at least equal to the threshold value, the flow goes on to a step S508 at which a flag variable f(i) is set at 1. There are provided as many flag variables f(i) as image portions (i). A flag variable f(i) can be set at 1 or reset to 0. It is to be noted that, if the determination result indicates that the difference is smaller than the threshold value, on the other hand, the flow goes on to a step S509 at which the flag variable f(i) is reset to 0.

Then, at a step S610 following the step S508, the variable j is examined whether or not the variable j is at least equal to a sample-count maximum value. In the case of the typical input still image shown in FIG. 3A through 3C, the number of background samples (j) is 2. Thus, the variable j is examined whether or not the variable j is at least equal to 2. If the determination result indicates that the variable j is at least equal to the sample-count maximum value, the flow goes on to a step S611 at which the variable i is incremented by 1. If the determination result indicates that the variable j is smaller than the sample-count maximum value, on the other hand, the flow goes on to a step S612 at which the variable j is incremented by 1. This is because there is still a background sample (j) that remains to serve as an object of the processes carried out at the step S506 and the subsequent steps.

At a step S613, the variable i is examined whether or not the variable i is at least equal to an image-portion-count maximum value. If the determination result indicates that the variable i is smaller than the image-portion-count maximum value, the flow goes on to a step S614 at which the variable i is incremented by 1. Then, the flow of the operations represented by this flowchart goes back to the step S505 without carrying the processes for the sea used as the second background sample because the present image portion (i) is known to be an image portion of the sky anyway.

If the determination result indicates that the variable i is at least equal to the image-portion-count maximum value, on the other hand, the result of the determination is interpreted as a determination result indicating that all the image portions (i) have been used as objects in the processes carried out at the step S505 and the subsequent steps. In this case, the flow of the operations represented by this flowchart goes on to a step S615 at which all the flag variables f(i) are examined whether or not there is a flag variable f(i) set at 1.

If the determination result indicates that there is no flag variable f(i) set at 1, the result of the determination is interpreted as a determination result indicating that all the image portions (i) are image portions of the backgrounds or a determination result indicating that there is no unidentified object.

If the determination result indicates that there is a flag variable f(i) set at 1, the result of the determination is interpreted as a determination result indicating that the image portion (i) with a flag variable f(i) set at 1 is not an image portion of a background, but an image portion of an unidentified object or a determination result indicating that an unidentified object exists on the image portion (i).

That is to say, if the existence of an unidentified object is recognized, the flow of the operations represented by this flowchart goes on to a step S616 at which an alarm is output. Finally, at the last step S617, the execution of the operations represented by this flowchart is ended.

In accordance with this embodiment, a background sample is specified in advance by carrying out a manual operation. Thus, the embodiment has a shortcoming that the embodiment is not capable of keeping up with a change in background characteristic. To put it concretely, let us assume for example that a sea serves as a background. In this case, if the sea gets rough due to the weather or the relation between the sea and the sky serving as another background changes because the photographing angle of the image-taking camera 102 is varied, incorrect recognition of an unidentified object may probably be carried out undesirably.

If the characteristic quantities of the backgrounds are known sufficiently and proper setting is made for the proper object of monitoring on the basis of the characteristic quantities, however, the embodiment is capable of well exhibiting its functions. Anyway, the method according to the embodiment can be applied to cases in which the characteristic quantities of the monitoring object hardly change, the photographing operation is carried out without changing the photographing angle of the image-taking camera 102 and background samples can be newly specified if the characteristic quantities change.

By the way, the way in which the size of the image portions is determined varies a little bit, depending on the object of monitoring. In the case of a background forming a complicated pattern, for example, if an excessively small size of the image portions is set, the characteristic quantity of each of the image portions cannot be said to be computable. If the size of an unidentified object to be detected is small and an excessively small size of the image portions is set, however, changes of the characteristic quantities computed for the image portions are undesirably difficult to observe. It is thus necessary to properly change the size of the image portions in accordance with the object of monitoring. For this reason, it is probably nice to determine an optimum size of the image portions in advance by properly changing the size on a trial-and-error basis while carrying out trial operations prior to the actual operations of the image-processing apparatus 201.

The description given above is summarized as follows. The core component of the image-processing apparatus 201 according to the embodiment is a microcomputer operating by execution of software. When an input still image is supplied to the image-processing apparatus 201, the image is stored in the image holding section 112, which is actually a RAM 105. The image division section 113 divides the input still image into image portions having uniform shapes. The characteristic-quantity computation section 114 computes a characteristic quantity for each of the image portions. The characteristic quantity of a background sample specified by carrying out a manual operation has been stored in advance as a value 115 determined in advance in the background characteristic-quantity holding section 202. The difference between the characteristic quantity computed for each of the image portions and the characteristic quantity of the background sample is found and compared with a threshold value determined in advance. An image portion with a difference found smaller than the threshold value is determined to be an image portion of the background. In this case, a flag provided for the image portion determined to be an image portion of the background is reset to 0.

Thus, by carrying out the processing described above, it is possible to produce a result of determination as to whether an image portion is an image portion of a background of an image portion or an unidentified object. As is obvious from the above description, the processing described above includes a process to compute a characteristic quantity for each of the image portions obtained as a result of dividing the input still image and a process to compute the difference between the characteristic quantity computed for each of the image portions and the characteristic quantity of the background sample.

2.1: Characteristic-Quantity Computation Method

A method for computing a characteristic quantity is explained as follows.

The characteristic quantity is numbers representing the characteristic of an image in a predetermined range.

There are a variety of conceivable characteristics of an image. The characteristics of an image include the color of the image, the chroma of the image and the pattern of the image. Thus, normally, the characteristic quantity of an image is not a single scalar quantity. Instead, the characteristic quantity of an image is a matrix having a number of elements.

Figure 7A:
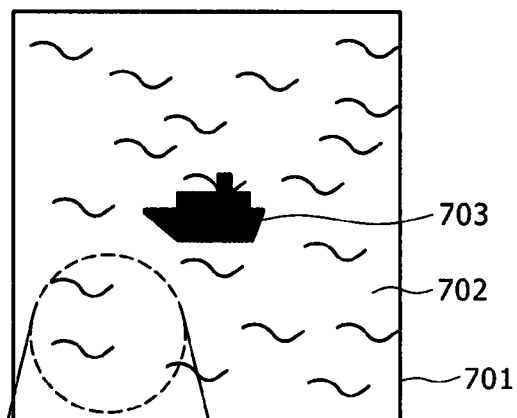
FIG. 7A is a diagram showing an input still image including a background sample to be specified and selected from the image in execution of a color-histogram technique adopted as one of methods to compute characteristic quantities.
Figure 7B:
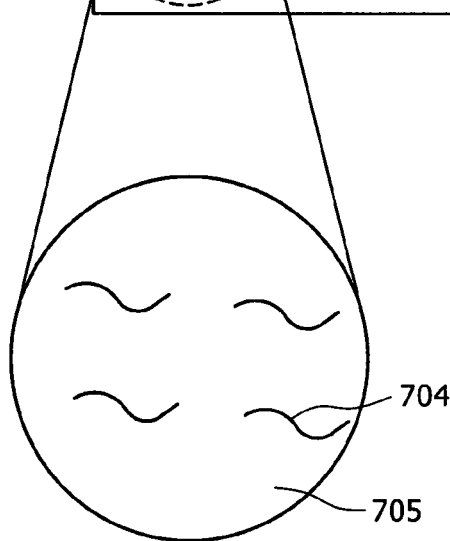
FIG. 7B is a diagram showing the background sample selected from the input still image shown in FIG. 7A.
Figure 7C:
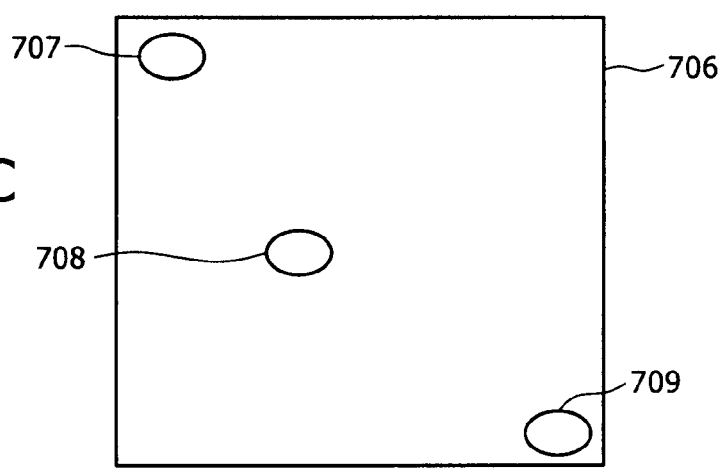
FIG. 7C is a diagram showing a matrix of all color components obtained as a result of the color-histogram technique.

FIGS. 7A, 7B and 7C are each a rough explanatory diagram referred to in description of a color histogram, which is one of methods to compute a characteristic quantity and common to all embodiments of the present invention described in this specification.

To be more specific, FIG. 7A shows an input still image 701 including a background sample to be specified and selected from the image. A sea 702 is spread all over the area of the input still image 701. On the sea 702, a ship 703 exists as an unidentified object. The ship 703 is composed of black-color pixels.

FIG. 7B shows the background sample extracted from the input still image 701 shown in FIG. 7A. The background sample shown in FIG. 7B is an enlarged portion of the sea 702. As shown in FIG. 7B, wave splashes 704 exist on the sea water 705 of the background sample. The sea water 705 is composed of blue-color pixels whereas each of the wave splashes 704 is composed of white-color pixels.

FIG. 7C shows a matrix 706 of all color components. Values of pixels existing in the input image shown in FIG. 7A are cumulatively added one by one to an element included in the matrix 706 as an element corresponding to the pixels. As a result, pixel values are concentrated in a white-colored area 707 expressing a wave splash, a blue-color area 708 expressing the sea water and a black-colored area 709 expressing the ship, which is an unidentified object. That is to say, it is probably nice to have the reader think that a curved surface like the commonly known Gauss curved surface is formed in each of the white-colored area 707, the blue-colored area 708 and the black-colored area 709.

As explained above, the color histogram of a colored image is data representing color appearance frequencies each counted for pixels in the colored image. The color histogram can also be regarded as data obtained as a result of discretely spreading color dots composing the colored image and then collecting the color dots of the same color component for every color component. Thus, the pattern concept is lost from the generated data.

FIGS. 8A, 8B, 8C and 8D are each a rough explanatory diagram referred to in description of a frequency analysis, which is one of methods to compute a characteristic quantity. The frequency-analysis method to compute a characteristic quantity can be used as a method common to all embodiments of the present invention described in this specification.

Figure 8A:
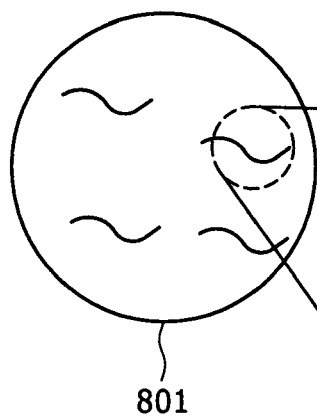
FIG. 8A is a diagram showing a portion of an input still image to which a frequency-analysis technique is applied as another one of the methods to compute characteristic quantities.
Figure 8B:
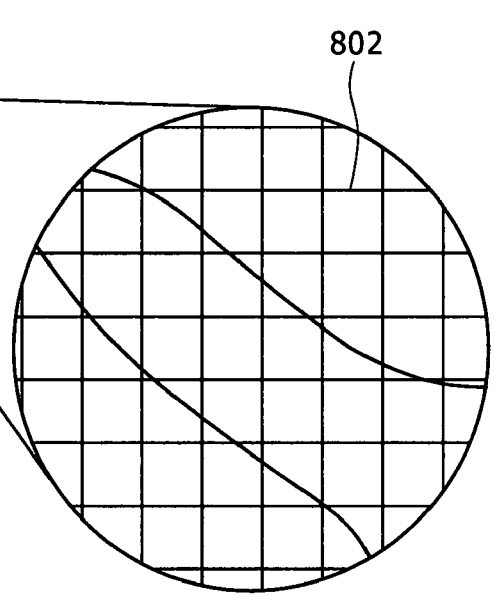
FIG. 8B is a diagram showing an enlarged wave splash taken as a background of the image portion shown in FIG. 8A.

To be more specific, FIG. 8A shows a portion 801 of an input image. The input-image portion 801 is the same as that shown in FIG. 7B. That is to say, the portion 801 is a portion of a sea. A background sample shown in FIG. 8B as a background sample extracted from the input-image portion 801 is an enlarged portion of the input-image portion, 801. The background sample shown in FIG. 8B is a wave splash. Pixels 802 of a wave splash are bright while pixels of the sea water are dark.

Figure 8C:
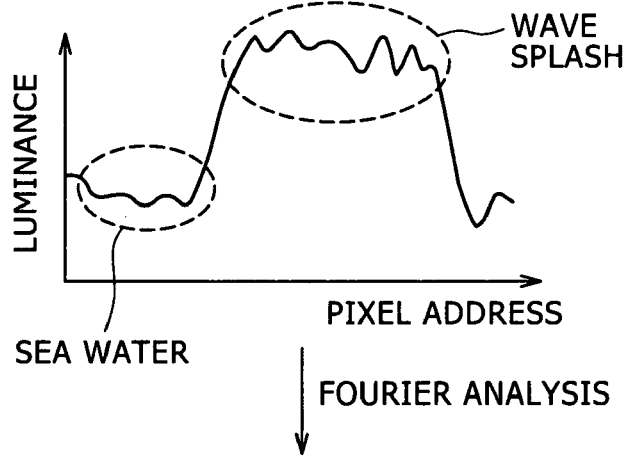
FIG. 8C is a diagram showing a typical graph produced by adoption of the frequency-analysis technique as a graph showing a result of plotting the luminance level of pixels composing the input still image.

FIG. 8C shows a typical graph obtained as a result of plotting the brightness of pixels composing the input image sequentially in the direction from the left to the right. As is obvious from the figure, the brightness level of pixels composing the sea water is low while the brightness level of pixels composing a wave splash is high. Then, the graph obtained in this way is handled as if the graph were the waveform of a signal. The frequency-analysis method for finding a characteristic quantity is a method of analyzing the frequency components of the signal.

Figure 8D:
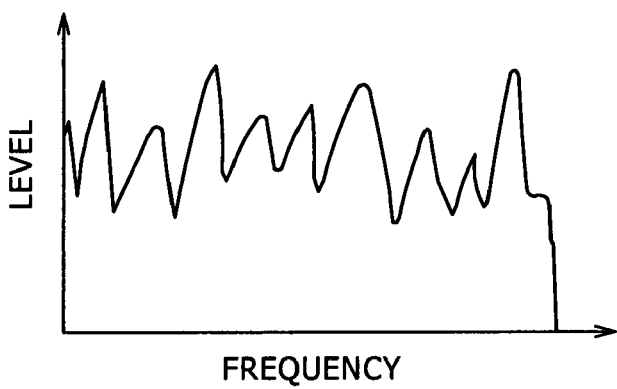
FIG. 8D is a diagram showing a typical graph produced by adoption of the frequency-analysis technique as a graph representing the relation between the luminance level and the frequency.

FIG. 8D shows a typical result of the frequency-analysis method. In accordance with the frequency-analysis method, the waveform plotted in FIG. 8C is subjected to a Fourier analysis and the result of the Fourier analysis is represented by a curve shown in FIG. 8D as a cure expressing a relation between the frequency represented by the horizontal axis and the luminance level represented by the vertical axis. Eventually, pieces of data represented by the curve are put in a matrix. The elements of the matrix are each a frequency component of a signal having a waveform representing the luminance of the input image.

As described above, in accordance with the frequency-analysis method for finding a characteristic quantity, a waveform representing luminance-level changes from pixel to pixel is created and subjected to the Fourier transformation for analyzing frequency components of the waveform. As a result of the Fourier transformation, a lightness/darkness pattern appearing as a pattern determined in advance is expressed by frequency components.

FIG. 9 is explanatory diagrams referred to in description of a simultaneous occurrence probability matrix.

Figure 9A:
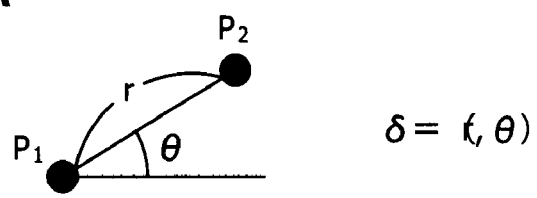
FIG. 9A is a diagram showing two arbitrary pixels P1 and P2 of an input still image to which a simultaneous occurrence probability matrix technique is applied as another one of the methods to compute characteristic quantities.

To be more specific, FIG. 9A shows two arbitrary pixels P1 and P2 of an image. The separation of the two pixels P1 and P2 from each other is represented by a distance r and an angle θ. A relative position function δ is a function dependent on the distance r and the angle θ. The relative position function δ is expressed as δ=(r, θ).

Figure 9B:
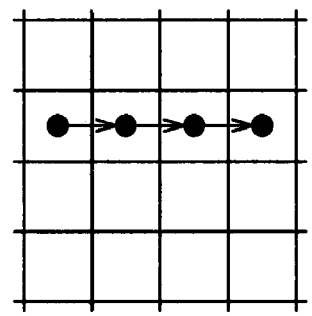
FIG. 9B is a diagram showing the pixel P2 as the next pixel adjacent to the pixel P1 for a case in which a relative position function $\delta$ is expressed as $\delta(1, 0°)$.

FIG. 9B shows the pixel P2 as the next pixel adjacent to the pixel P1 for a case in which the relative position function δ is expressed as δ=(1, 0°).

Figure 9C:
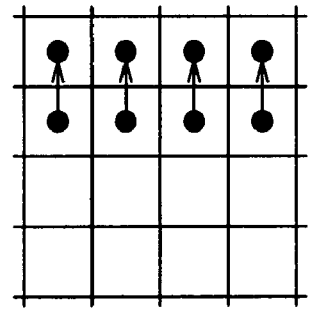
FIG. 9C is a diagram showing the pixel P2 as the next pixel adjacent to the pixel P1 for a case in which the relative position function $\delta$ is expressed as $\delta(1, 90°)$.

On the other hand, FIG. 9C shows the pixel P2 as the pixel right above the pixel P1 for a case in which the relative position function δ is expressed as δ=(1, 90°).

The simultaneous occurrence probability matrix is a square matrix. The elements of the simultaneous occurrence probability matrix are each a luminance value obtained as a result of cumulatively adding a combination of luminance levels of two pixels separated away from each other by a fixed relative position function δ to the luminance value.

FIG. 10 is explanatory diagrams showing image data simplified to make explanation easy to understand and a simultaneous occurrence probability matrix also simplified to make the explanation easy to understand.

Figure 10A:
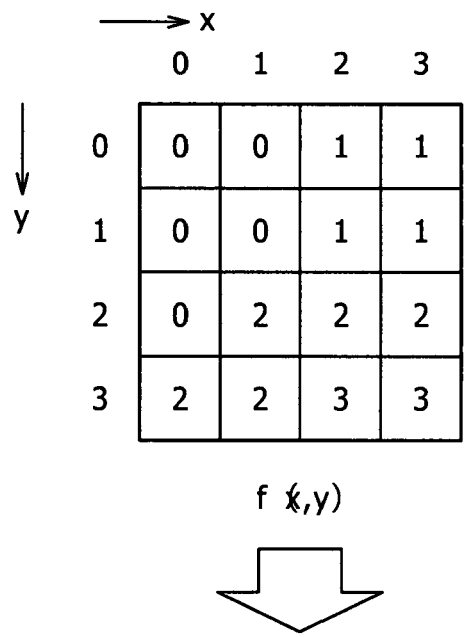
FIG. 10A is a diagram showing data of an image having 16 (=4×4) pixels with 4 luminance levels, that is, luminance levels 0 to 3.

To be more specific, FIG. 10A shows data of an image having 16 (=4×4) pixels with four luminance levels, that is, luminance levels 0 to 3.

Figure 10B:
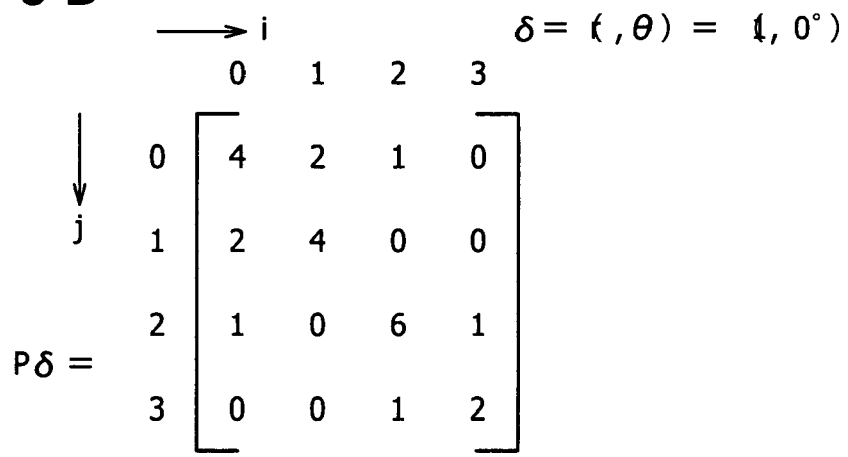
FIG. 10B shows a simultaneous occurrence probability matrix, which is a square matrix having 16 (=4×4) pixels with the 4 luminance levels.

FIG. 10B shows a simultaneous occurrence probability matrix, which is a square matrix having 16 (=4×4) pixels with the four luminance levels. The following description explains a procedure for creating the simultaneous occurrence probability matrix shown in FIG. 10B from the image data shown in FIG. 10A for a relative position function $\delta=(r, \theta)=(1, 0)$.

Let us assume that coordinates (0, 0) shown in FIG. 10A are the coordinates (x, y) of the pixel P1. In this case, the coordinates (x, y) of the pixel P2 are (1, 0). As shown in the figure, the luminance level i of the pixel P1 and the luminance level j of the pixel P2 are both 0. Thus, 1 is added to a luminance level at the position with coordinates (i, j)=(0, 0). In addition, since a reciprocal counting operation is carried out, 1 is further added to the luminance level at the position with coordinates (i, j)=(0, 0).

Then, let us assume that coordinates (1, 0) shown in FIG. 10A are the coordinates (x, y) of the pixel P1. In this case, the coordinates (x, y) of the pixel P2 are (2, 0). As shown in the figure, the luminance level i of the pixel P1 is 0 whereas the luminance level j of the pixel P2 is 1. Thus, 1 is added to a luminance level at the position with coordinates (i, j)=(0, 1). In addition, since a reciprocal counting operation is carried out, 1 is added to a luminance level at the position with coordinates (i, j)=(1, 0).

The operation to count up the value of a matrix element representing a combination of luminance levels of pixels separated away from each other by a relative position function $\delta$ as described above is carried out for all pixels. That is to say, the simultaneous occurrence probability matrix, which is a square matrix, is a counter matrix with each element thereof representing the number of times a combination of luminance levels of two pixels appears.

Let us keep in mind that it is the monitoring-system designer who makes a decision on whether the reciprocal counting operation is to be carried out.

From the property of the simultaneous occurrence probability matrix, it is desirable to use a plurality of relative position functions in order to generate a plurality of simultaneous occurrence probability matrixes.

By adoption of these methods for computing a characteristic quantity, a characteristic quantity expressed in terms of a matrix having a large number of pieces of data is found for each of image portions obtained as a result of dividing an image.

A difference between each of these computed characteristic quantities and a characteristic quantity found and held in advance as the characteristic quantity of typically a background sample is found and compared with a threshold value determined in advance. In the following description, the processing to compute such a difference is referred to as a characteristic-quantity difference computation process to be described later.

Let us keep in mind that it is the monitoring-system designer who properly selects one of the characteristic-quantity computation methods used as the examples in the above description by considering a tradeoff between the precision of the computed characteristic quantities and the amount of computation processing.

2.2: Characteristic-Quantity Difference Computation Methods

In accordance with the characteristic-quantity computation methods used as the examples in the above description, a characteristic quantity is found for each of image portions obtained as a result of dividing an image. All the characteristic quantities are each expressed in terms of a matrix having a large number of pieces of data.

Thus, such a difference is found by comparing data of two matrixes. How such a difference can be found? The difference represents the degree of similarity between the data of the two matrixes. The two matrixes are a matrix representing a characteristic quantity found for an image portion and a matrix representing the characteristic quantity of a background sample.

There are a variety of known existing methods for finding the degree of similarity between the data of the two matrixes. Some of the methods are listed as follows:

(1): SAD (Sum of Absolute Differences)

An absolute difference between the values of two corresponding elements in the two matrixes is found for each pair of such matrix elements and a sum of such absolute differences is computed.

(2): SSD (Sum of Squared Differences)

The second power of a difference between the values of two corresponding elements in the two matrixes is found for each pair of such matrix elements and a sum of such squared differences is computed.

(3): Normalization

Each matrix element is handled as an element of a vector and the inner product of the two matrixes is found. That is to say, the product of two corresponding elements in the two matrixes is found and a sum of such products is computed.

The characteristic-quantity comparison processing is carried out in order to eventually find a difference, which is a single scalar quantity.

The computed difference is then compared with a predetermined threshold value held in advance in order to produce a result of determination as to whether or not an image portion is a portion of a background sample.

Let us keep in mind that it is the monitoring-system designer who properly selects one of the characteristic-quantity difference computation methods used as the examples in the above description by considering a tradeoff between the precision of the computed difference and the amount of computation processing.

The characteristic-quantity computation methods and the characteristic-quantity difference computation methods described above can each be selected and adopted as a method common to the image-processing apparatus according to the first embodiment as well as image-processing apparatus according to second, third, fourth and fifth embodiments to be described later. That is to say, for any one of the embodiments, the color histogram method, the frequency analysis method or the simultaneous occurrence probability method can be adopted as a characteristic-quantity computation method whereas the SAD, SSD or normalization method can be adopted as a characteristic-quantity difference computation method.

3: Second Embodiment

Figure 11:
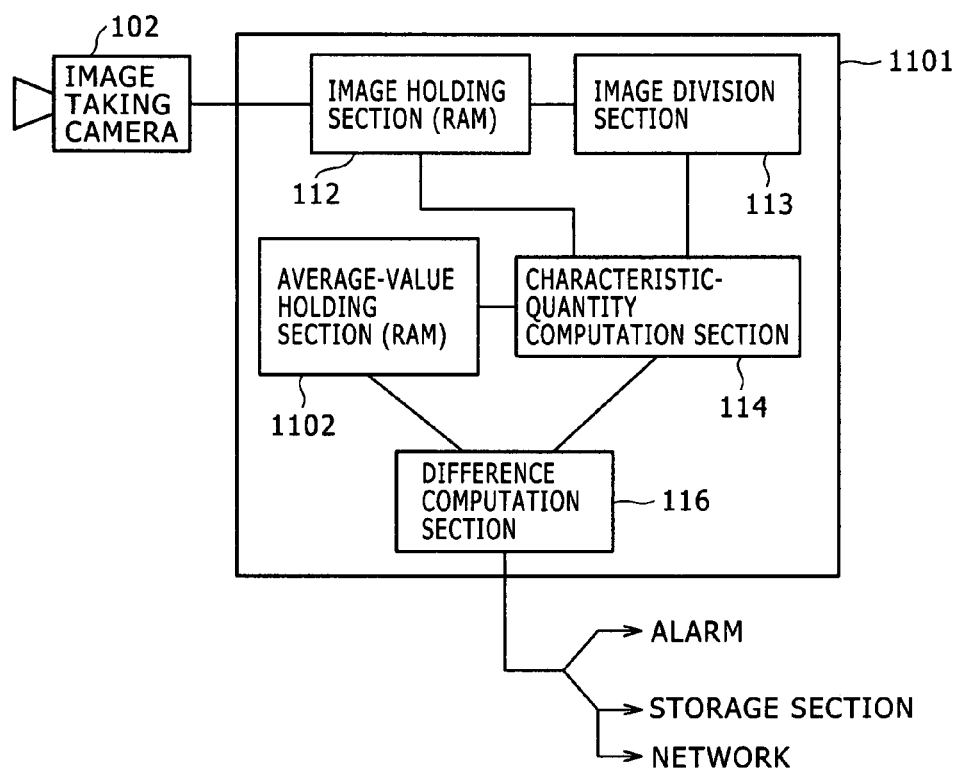
FIG. 11 is a block diagram showing an entire image-processing apparatus according to the second embodiment of the present invention.

FIG. 11 is a block diagram showing an image-processing apparatus according to the second embodiment of the present invention. The image-processing apparatus according to the second embodiment is based on the configuration shown in FIG. 1B. It is to be noted that sections common to the first embodiment explained earlier by referring to FIG. 2 are not explained again in the following description in order to avoid duplications of explanations.

The second embodiment is different from the first embodiment in that, in the case of the second embodiment, the background characteristic-quantity holding section 202 employed in the first embodiment is replaced with an average-value holding section 1102. The average-value holding section 1102 is a unit for computing the average value of characteristic values each computed by the characteristic-quantity computation section 114 for an image portion and holding the computed average value.

The difference computation section 116 computes differences between the average value held by the average-value holding section 1102 and characteristic values each computed by the characteristic-quantity computation section 114 as the characteristic quantity of an image portion. If a difference computed by the difference computation section 116 for an image portion indicates that the image portion is a portion of an unidentified object, an alarm is output.

FIGS. 12A, 12B and 12C are diagrams roughly showing an input image obtained as a result of operations carried out by the image-processing apparatus according to the second embodiment.

To be more specific, FIG. 12A shows an image 1201 including a sea 1202 and a ship 1204 serving as an unidentified object.

FIG. 12B shows a average-value holding section 1102 for holding a value computed thereby as the average value of characteristic quantities S(1) to S(25) each found by the characteristic-quantity computation section 114 as the characteristic quantity of one of image portions shown in FIG. 12C. That is to say, FIG. 12B shows an average value obtained by dividing the sum of the characteristic quantities S(1) to S(25) by the number of aforementioned characteristic quantities S(1) to S(25). In this case, the number of aforementioned characteristic quantities S(1) to S(25) is 25.

As described above, the difference computation section 116 computes differences between the average value B held by the average-value holding section 1102 and characteristic values each computed by the characteristic-quantity computation section 114 as the characteristic quantity of an image portion. The difference computation section 116 computes the differences sequentially one difference after another. To put it concretely, the difference computation section 116 sequentially computes:

the difference between the average value B and the characteristic quantity S(1); then, the difference between the average value B and the characteristic quantity S(2) and so on.

Finally, the difference computation section 116 computes:

the difference between the average value B and the characteristic quantity S(25).

Figure 13:
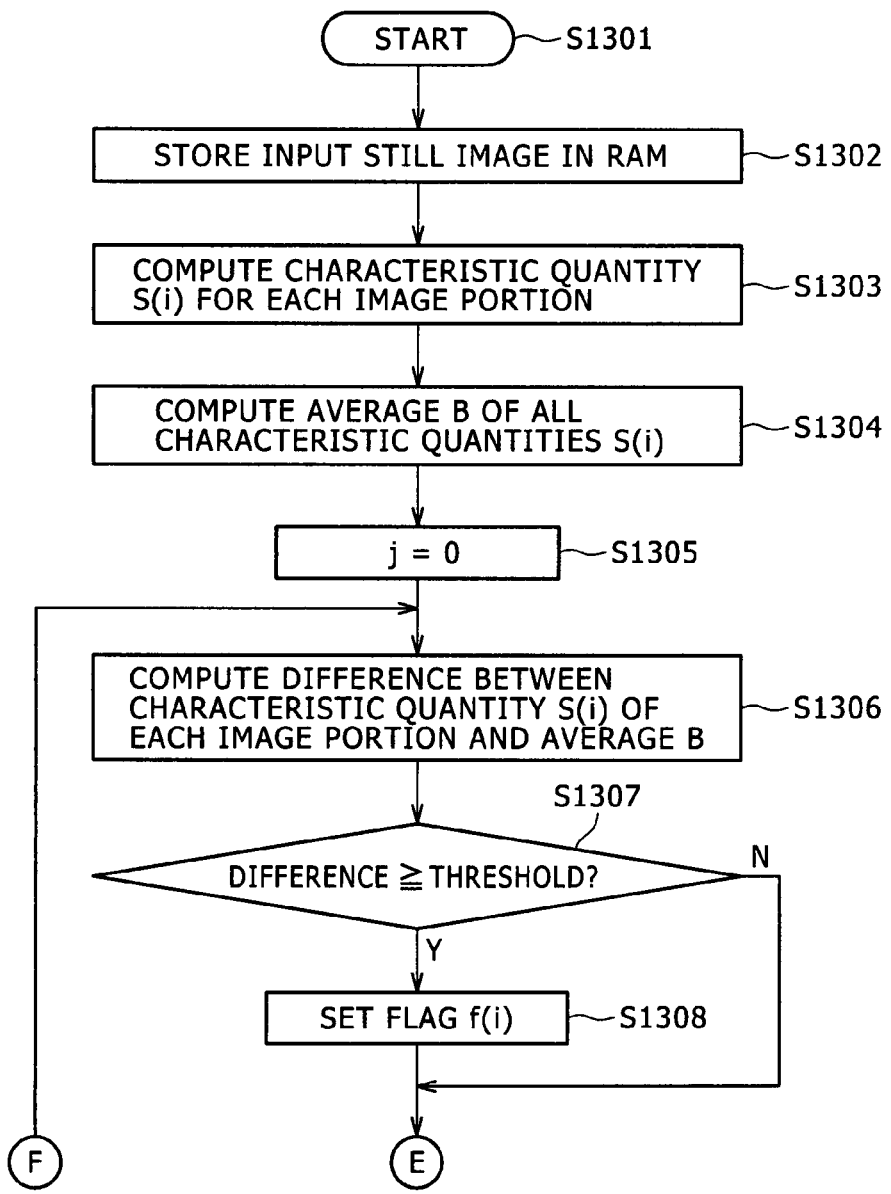
FIG. 13 shows the first part of a flowchart representing actual operations carried out by the image-processing apparatus according to the second embodiment.
Figure 14:
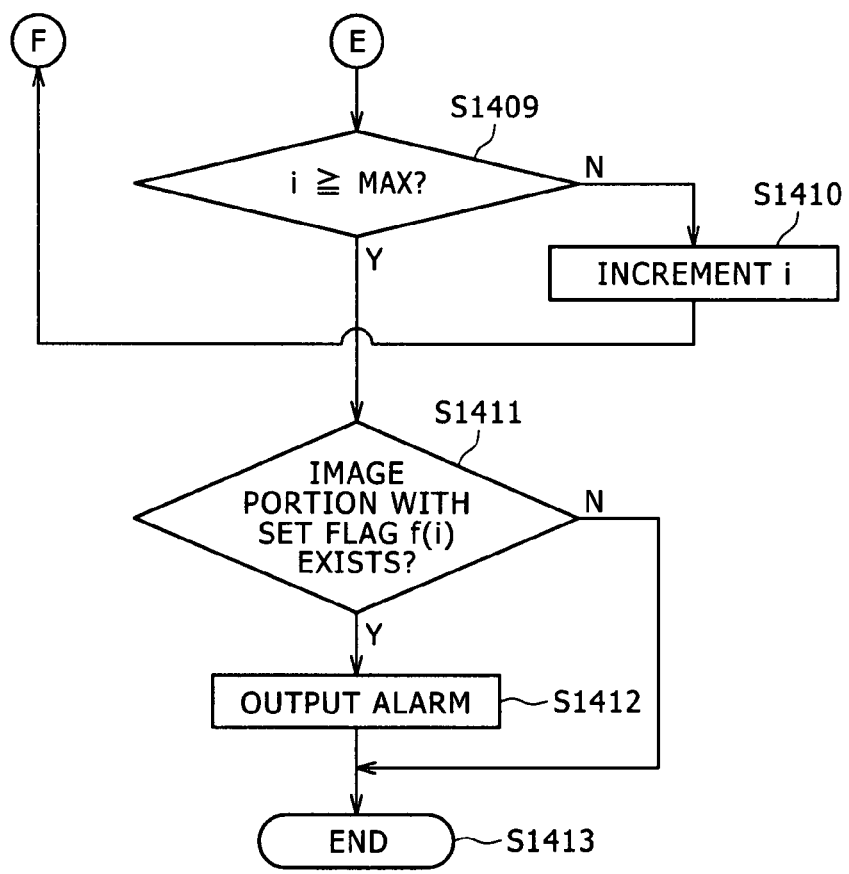
FIG. 14 shows the second part of the flowchart representing the actual operations carried out by the image-processing apparatus according to the second embodiment.

FIGS. 13 and 14 show a flowchart representing operations carried out by the image-processing apparatus according to the second embodiment.

The flowchart begins with a step S1301 at which execution of the actual operations is started. Then, at the next step S1302, an input still image is stored in the RAM of the image holding section 112.

Subsequently, at the next step S1303, the characteristic-quantity computation section 114 computes the characteristic quantity of each of image portions generated by the image division section 113 as a result of dividing the input still image.

Then, at the step S1304, the average value B is computed.

Subsequently, at steps following the step S1304, the difference between the characteristic quantity of each of the image portions and the average value B is computed as follows:

First of all, at a step S1305, a variable i is initialized to 1. The variable i is a variable used for identifying an image portion serving as an object in the processing to compute the difference between the characteristic quantities and the average value.

Then, at the next step S1306, the difference between the average value B and the characteristic quantity of an image portion (i) is computed.

Subsequently, at the next step S1307, the difference computed in the process carried out at the step S1304 is compared with a stored threshold value determined in advance in order to produce a result of determination as to whether or not the difference is at least equal to the threshold value. If the determination result indicates that the difference is at least equal to the threshold value, the flow goes on to a step S1308 at which a flag variable f(i) is set at 1. There are provided as many flag variables f(i) as image portions (i). That is to say, a flag variable f(i) is provided for each of the image portions (i). It is to be noted that, if the determination result produced in the process carried out at the step S1307 indicates that the difference is smaller than the threshold value, on the other hand, the flag variable f(i) is reset to 0 in order to indicate that the image portion (i) is an image portion of a background.

At the next step S1409, the variable i is examined whether or not the variable i is at least equal to an image-portion-count maximum value. If the determination result indicates that the variable i is smaller than the image-portion-count maximum value, the flow goes on to a step S1410 at which the variable i is incremented by 1. Then, the flow goes back to the step S1306. If the determination result indicates that the variable i is at least equal to the image-portion-count maximum value, on the other hand, the result of the determination is interpreted as a determination result indicating that all the image portions (i) have been used as objects in the processes carried out at the step S1306 and the subsequent steps. In this case, the flow goes on to a step S1411 at which all the flag variables f(i) are examined in order to produce a result of determination as to whether or not there is a flag variable f(i) set at 1.

If the determination result indicates that there is no flag variable f(i) set at 1, the result of the determination is interpreted as a determination result indicating that all the image portions (i) are image portions of the backgrounds or a determination result indicating that there is no unidentified object. In this case, the flow goes on to the last step S1413 at which the execution of the operations represented by this flowchart is ended.

If the determination result indicates that there is a flag variable f(i) set at 1, the result of the determination is interpreted as a determination result indicating that the image portion (i) set at 1 is not an image portion of a background, but an image portion of an unidentified object or a determination result indicating that an unidentified object exists on the image portion (i). That is to say, if the existence of an unidentified object is recognized, the flow goes on to a step S1412 at which an alarm is output. Finally, at the last step S1413, the execution of the operations represented by this flowchart is ended.

The description given above is summarized as follows.

The core component of the image-processing apparatus 1101 according to the embodiment is a microcomputer operating by execution of software.

When an input still image is supplied to the image-processing apparatus 1101, the image is stored in the image holding section 112, which is actually the RAM 105. The image division section 113 divides the input still image into image portions having the same size and the same shape. The characteristic-quantity computation section 114 computes a characteristic quantity for each of the image portions. Then, an average value of the characteristic quantities of all the image portions is computed and held in the average-value holding section 1102, which includes the RAM 105. The difference between the characteristic quantity computed for each of the image portions and the average value is then found and compared with a threshold value determined in advance. An image portion with a difference found smaller than the threshold value is determined to be an image portion of the background. In this case, a flag provided for the image portion determined to be an image portion of the background is reset to 0.

Thus, by carrying out the processing described above, it is possible to produce a result of determination as to whether an image portion is an image portion of a background of an image portion or an unidentified object. As is obvious from the above description, the processing described above includes a process to compute the characteristic quantity for each of the image portions obtained as a result of dividing the input still image and a process to compute the difference between the characteristic quantity computed for each of the image portions and the average value.

4: Third Embodiment

Figure 15A:
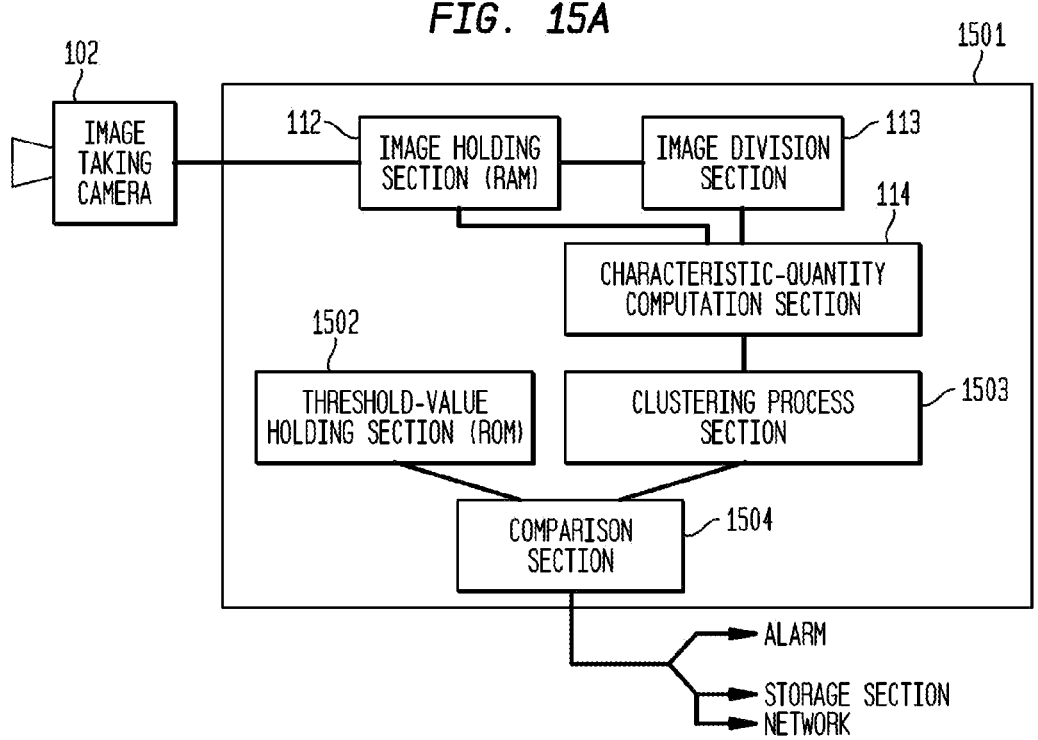
FIG. 15A is a block diagram showing an entire image-processing apparatus according to the third embodiment of the present invention.
Figure 15B:
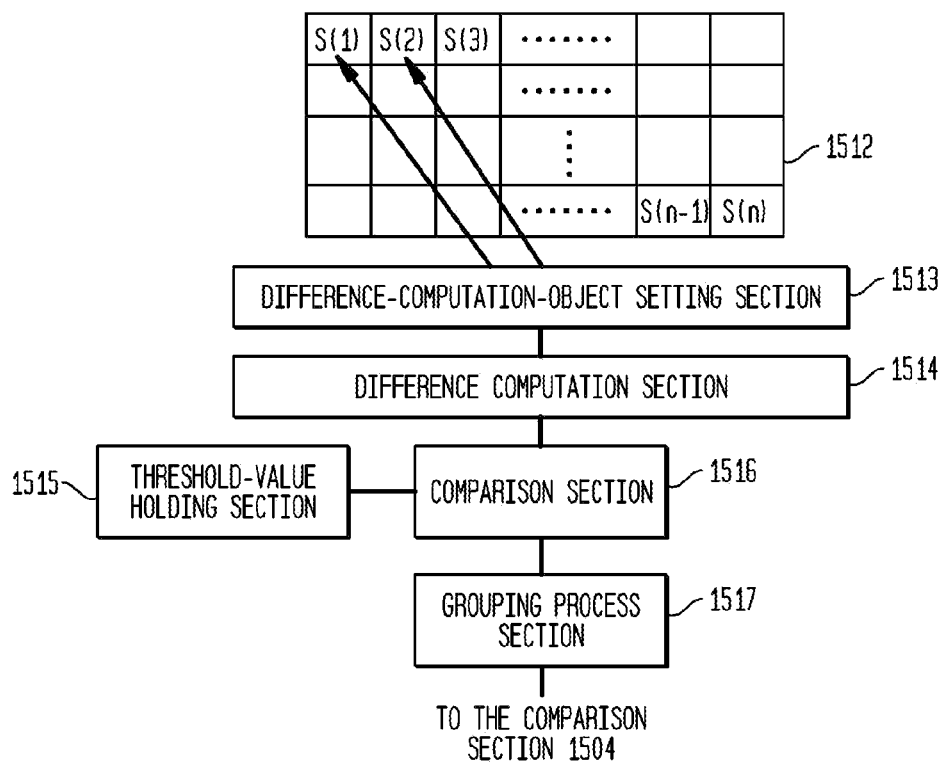
FIG. 15B is a block diagram showing the internal configuration of a clustering process section employed in the image-processing apparatus shown in FIG. 15A.

FIGS. 15A and 15B are block diagrams showing an image-processing apparatus 1501 according to the third embodiment of the present invention. The image-processing apparatus according to the third embodiment is based on the configuration shown in FIG. 1B. It is to be noted that sections common to the second embodiment explained earlier by referring to FIG. 11 are not explained again in the following description in order to avoid duplications of explanations.

The third embodiment is different from the second embodiment in that, in the case of the third embodiment, the third embodiment employs a ROM 1502, an image-portion count comparison section 1504 and a clustering process section 1503 provided between the characteristic-quantity computation section 114 and the comparison section 1504.

The clustering process section 1503 is a unit for computing a difference between any two characteristic quantities generated by the characteristic-quantity computation section 114 as characteristic quantities each found for an image portion in the entire input image and for putting image portions separated from each other by small differences in characteristic quantity in a similar-image group. This is because any two image portions separated from each other by a small difference in characteristic quantity are regarded as image portions having similar images. The process of putting image portions separated from each other by small differences in characteristic quantity in a similar-image group is referred to as a clustering process. Thus, the clustering process is a process to classify image portions into similar-image groups.

The comparison section 1504 compares the number of image portions put into the individual similar-image group received from the clustering process section 1503 with the an image-portion-count threshold value stored in advance in the ROM 1502. If the result of the comparison indicates that the individual similar-image group is not a part of a background, the individual similar-image group is determined to be a group existing in an unidentified object. In this case, an alarm is output.

FIG. 15B is a block diagram showing the internal configuration of the clustering process section 1503 employed in the image-processing apparatus 501 shown in FIG. 15A.

A difference-computation-object setting section 1513 is a unit for determining which characteristic quantities 1512 received from the characteristic-quantity computation section 114 are to be subjected to a difference computation process carried out by a difference computation section 1514.

The difference computation section 1514 is a unit for computing a difference between any two characteristic quantities selected and determined by the difference-computation-object setting section 1513.

The comparison section 1516 is a unit for comparing a difference computed by the difference computation section 1514 with the threshold value 1515. The result of the comparison indicates whether or not the two image portions having the two characteristic quantities are to be joined to each other in a similar-image group.

The grouping process section 1517 is a section for joining two image portions to each other in a similar-image group or leaving the two image portions as they are without joining them to each other in a similar-image group on the basis of the comparison result produced by the comparison section 1516.

By carrying out the series of processes described above, image portions are classified into some similar-image groups. Then, for each individual one of the similar-image groups, the comparison section 1504 compares the number of image portions put into the individual similar-image group with a predetermined image-portion-count threshold value stored in advance in the ROM 1502. The result of the comparison indicates whether or not the individual similar-image group is a part of a background.

FIGS. 16A, 16B, 16C and 16D are diagrams roughly showing an input image obtained as a result of operations carried out by the image-processing apparatus according to the third embodiment.

There is an image 1601 including a sea and a ship serving as an unidentified object.

The clustering process section 1503 compares characteristic quantities $S(1)$ to $S(25)$ output by the characteristic-quantity computation section 114 as characteristic quantities of all image portions with each other in order to classify the image portions into similar-image groups as follows.

Figure 16A:
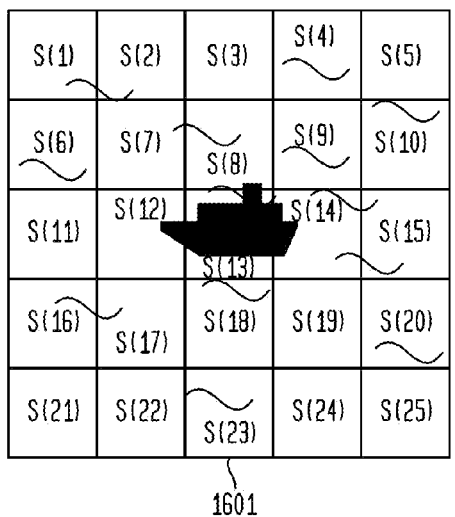
FIG. 16A is a diagram showing a typical image taken by making use of the image-processing apparatus according to the third embodiment as an image of a sea and a ship serving as an unidentified object.

First of all, the difference computation section 1514 computes a difference between the characteristic quantity $S(1)$ of the left top image portion on the image 1601 shown in FIG. 16A and the characteristic quantity $S(2)$ of an image portion adjacent to the left top image portion. Then, the comparison section 1516 compares the difference computed by the difference computation section 1514 as the difference between the two characteristic quantities with the difference threshold value stored in advance in the difference threshold-value holding section 1515 in order to produce a result of determination as to whether or not two image portions having the two characteristic quantities are similar to each other. In the case of the image 1601 shown in FIG. 16A, the two image portions having the characteristic quantities $S(1)$ and $S(2)$ are both a portion of the sea. Thus, the two image portions having the characteristic quantities $S(1)$ and $S(2)$ are similar to each other so that the difference between the two characteristic quantities is small. Therefore, the two image portions having the characteristic quantities $S(1)$ and $S(2)$ are considered to have the same pattern so that they can be joined to each other in a similar-image group. To put it concretely, the two image portions having the characteristic quantities $S(1)$ and $S(2)$ are put in a similar-image group shown at the left top corner of an image shown in FIG. 16B. That is to say, the process to put the two image portions having the characteristic quantities $S(1)$ and $S(2)$ in a similar-image group is based on a concept to eliminate the boundary between the two image portions adjacent to each other.

Figure 16B:
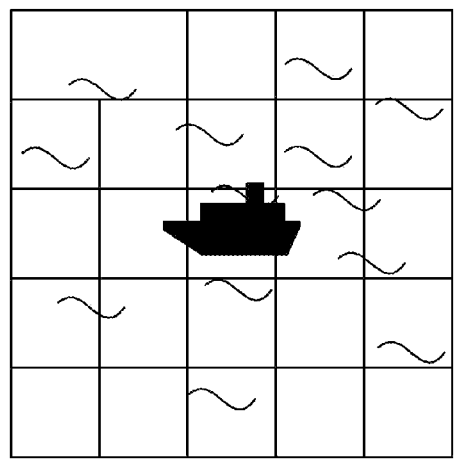
FIG. 16B is a diagram to be referred to in a process to put two image portions in a one group in accordance with the third embodiment.
Figure 16C:
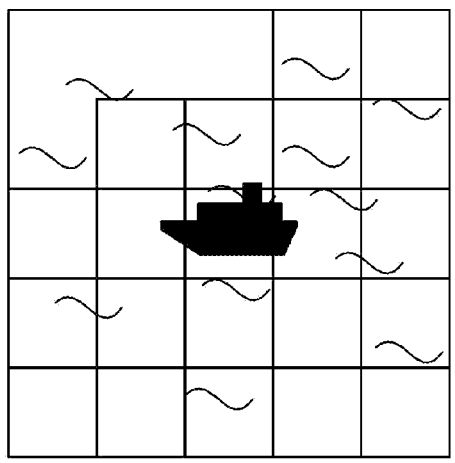
FIG. 16C is a diagram to be referred to in description of a process to put four image portions in a one group in accordance with the third embodiment.

The process to compute the difference between the characteristic quantities of two image portions adjacent to each other and to compare the computed difference with the difference threshold value stored in the difference threshold-value holding section 1515 is continued from the state shown in FIG. 16B. That is to say, other boundaries between image portions similar and adjacent to each other are eliminated to yield an image like one shown in FIG. 16C.

Figure 16D:
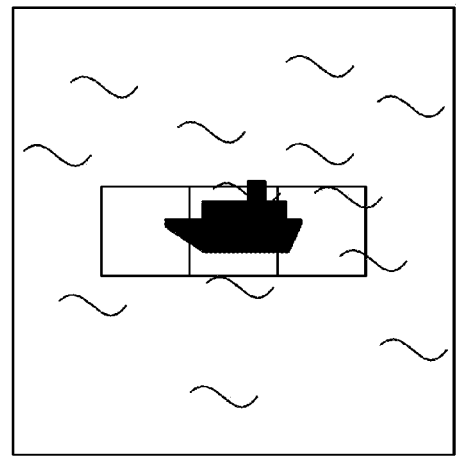
FIG. 16D is a diagram showing image portions left after the process to put image portions in a one group in accordance with the third embodiment.

Finally, image portions having characteristic quantities S(12), S(13) and S(14) are left as shown in FIG. 16D. This is because the characteristic quantities S(12), S(13) and S(14) each have big differences from the characteristic quantities of adjacent image portions. The image portions having characteristic quantities S(12), S(13) and S(14) are recognized as image portions in which an unidentified object exists.

Figure 17:
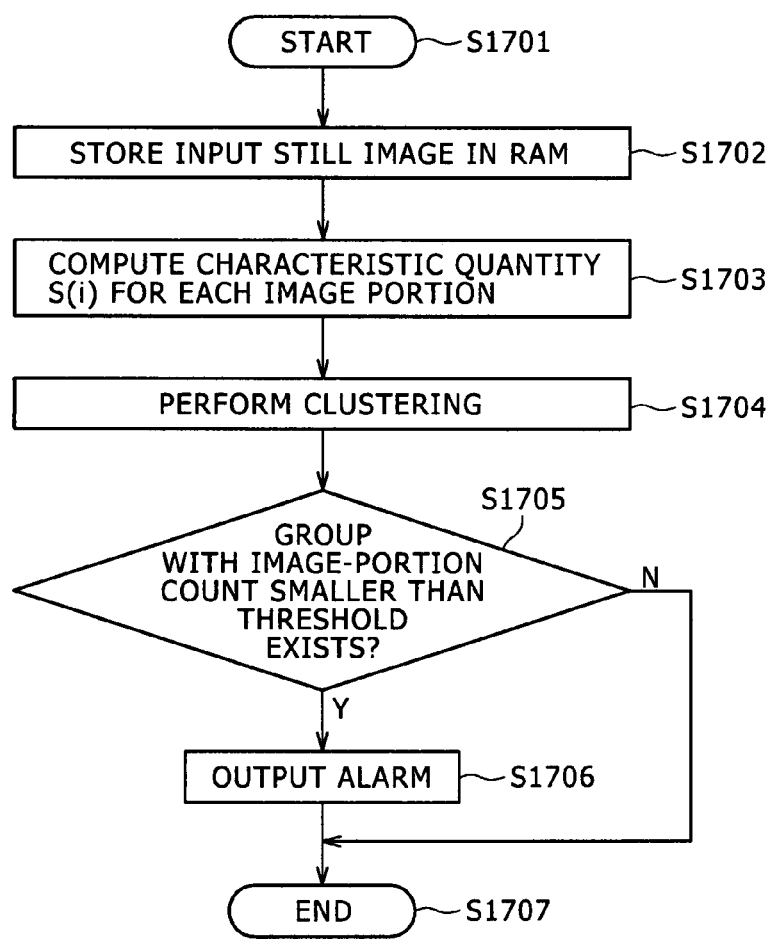
FIG. 17 shows a flowchart representing actual operations carried out by the image-processing apparatus according to the third embodiment.

FIG. 17 shows a flowchart representing operations carried out by the image-processing apparatus 1501 according to the third embodiment. As shown in the figure, the flowchart begins with a step S1701. Then, at the next step S1702, an input still image is stored in a RAM.

Subsequently, at the next step S1703, the characteristic-quantity computation section 114 computes a characteristic quantity for each of image portions obtained as a result a process carried out by the image division section 113 to divide the input still image.

Then, at the next step S1704, a clustering process is carried out on the basis of the characteristic quantities of all the image portions. As a result of the clustering process, image portions having small differences in characteristic quantity are put in a similar-image group.

Then, at the next step S1705, for each similar-image group, the number of image portions included in the similar-image group is compared with an image-portion-count threshold value held in the ROM 1502 in order to produce a result of determination as to whether the similar-image group exists in the background or in the area of an unidentified object. If the comparison result indicates that the number of image portions included in each similar-image group is at least equal to the image-portion-count threshold value held in the ROM 1502, the entire input still image is determined to be a background.

If the comparison result indicates that the number of image portions included in any specific similar-image group is smaller than the image-portion-count threshold value held in the ROM 1502, on the other hand, the specific similar-image group is determined to be a group in an unidentified object existing in the input still image.

If a specific similar-image group is determined to be a group in an unidentified object existing in the input still image, an alarm is output at a step S1706. Finally, at the last step S1707, execution of the operations represented by this flowchart is ended.

The description given above is summarized as follows. The core component of the image-processing apparatus 1501 according to the embodiment is a microcomputer operating by execution of software.

When an input still image is supplied to the image-processing apparatus 1501, the image is stored in the image holding section 112, which is actually the RAM 105. The image division section 113 divides the input still image into image portions having the same size and the same shape. The characteristic-quantity computation section 114 computes a characteristic quantity for each of the image portions in the entire input image. The clustering process section 1503 computes a difference between any two characteristic quantities generated by the characteristic-quantity computation section 114 as characteristic quantities each found for an image portion and puts image portions separated from each other by small differences in characteristic quantity in a similar-image group. This is because image portions separated from each other by small differences in characteristic quantity are regarded as image portions having similar images. The process of putting image portions separated from each other by small differences in characteristic quantity in a similar-image group is referred to as a clustering process. Thus, the clustering process is a process to classify image portions into similar-image groups.

Then, for each individual one of the similar-image groups, the number of image portions included in the similar-image group is compared with an image-portion-count threshold value held in the RAM 1502 in order to produce a result of determination as to whether the individual similar-image group exists in the background or in the area of an unidentified object. If the result of the comparison indicates that the number of image portions included in the individual similar-image group is at least equal to the image-portion-count threshold value held in the RAM 1502, the individual similar-image group is determined to be a group existing in a background. In this case, flags each provided for an image portion included in the individual similar-image group are set.

Thus, by carrying out the processing described above, it is possible to produce a result of determination as to whether an image portion is an image portion of the background of an image portion or an unidentified object. As is obvious from the above description, the processing described above includes a process to compute the characteristic quantity for each of the image portions obtained as a result of dividing the input still image and comparison processes.

5: Fourth Embodiment

Figures 18A, 18B, 18C:
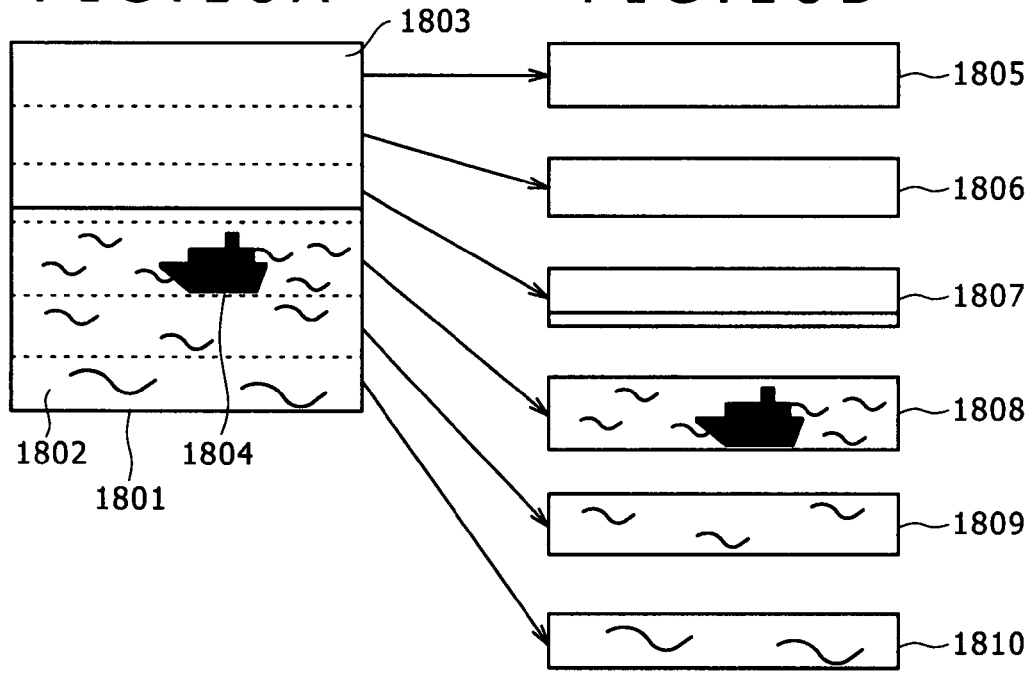
FIG. 18A is a diagram showing a typical image taken by making use of an image-processing apparatus according to the fourth embodiment of the present invention as an image including a sea, the sky and a ship serving as an unidentified object floating on the sea.
FIG. 18B is a diagram showing horizontal image portions obtained as a result of dividing the image shown in FIG. 18A.
FIG. 18C is a block diagram showing an entire image-processing apparatus according to the fourth embodiment of the present invention.

FIGS. 18A, 18B and 18C are image diagrams and an overall block diagram, which roughly show an input image obtained as a result of operations carried out by the image-processing apparatus according 1811 to the fourth embodiment of the present invention and the image-processing apparatus 1811.

To be more specific, FIG. 18A shows an input image 1801 including a sea 1802, the sky 1803 and a ship 1804 serving as an unidentified object floating on the sea 1802. The sea 1802 is a scenery, the picture of which has been taken in a photographing operation carried out at a remote location. The actual distance between the lower part of the sea 1802 and the vicinity of the sea horizon in the input image 1801 is long. Thus, a wave splash on the surface of the sea 1802 in front of the viewer is seen as a big splash while a wave splash on the surface of the sea 1802 at a location close to the sea horizon is seen as a small splash. That is to say, the sea 1802 in the input image 1801 obtained as a result of the photographing operation is not a uniform pattern.

If the entire input image 1801 is taken as an object of evaluation, it will be difficult to obtain an elaborate result.

In order to solve this problem, the input image 1801 is divided into a plurality of horizontal image portions each oriented in the direction parallel to the sea horizon. To put it concretely, the input image 1801 is divided into horizontal image portions 1805, 1806, 1807, 1808, 1809 and 1810 as shown in FIG. 18B.

Then, for each of the horizontal image portions, the characteristic-quantity computation process and the comparison process, which have been explained before, are carried out.

FIG. 18C is a block diagram showing the image-processing apparatus 1811 for implementing the technological concept described above. The image-processing apparatus 1811 is all but identical with the image-processing apparatus 101 shown in FIG. 1B. However, the image-processing apparatus 1811 shown in FIG. 18C is different from the image-processing apparatus 101 shown in FIG. 1B in that, in the case of the image-processing apparatus 1811, the image division section 1813 is divided into a horizontal image division section 1813a and a small image division section 1813b.

Main processing of the fourth embodiment is implemented by carrying out the processing of the first, second or third embodiment on the horizontal image portions 1805, 1806, 1807, 1808, 1809 and 1810.

It is to be noted that the width of a horizontal image portion to be produced by the horizontal image division section 1813a is determined at a design time or a time prior to the actual operation of the image-processing apparatus 1811 by considering a tradeoff between the state of the input image 1801 to be processed and the amount of computation to be carried out in the processing.

It is possible to provide a configuration in which the fourth embodiment is tried if the result of processing carried out in accordance with the first, second and third embodiments is not good.

The description given above is summarized as follows.

The core component of the image-processing apparatus 1811 according to the embodiment is a microcomputer operating by execution of software.

When an input still image is supplied to the image-processing apparatus 1811, the image is stored in the image holding section 112, which is actually the RAM 105. Then, after the horizontal image division section 1813a employed in the image division section 1813 divides the input still image into a plurality of horizontal mage portions oriented in the direction parallel to the sea horizon, the small image division section 1813b also employed in the image division section 1813 divides each of the horizontal image portions into small image portions having the same size and the same shape. Subsequently, on each of the horizontal input portions, the characteristic-quantity computation section 114 carries out the characteristic-quantity computation processing whereas the difference computation section 116 carries out the characteristic-quantity difference computation processing.

Then, each individual one of the horizontal input portions is examined to produce a result of determination as to whether or not any specific one of small image portions included in the individual horizontal input portion as an object of evaluation is an image portion of the background. If the result of the determination indicates that the specific small image portion included in the individual horizontal input portion as an object of evaluation is an image portion of the background, a flag provided for the specific small image portion is reset to 0.

By carrying out the processing described above, it is possible to distinguish an area of the background and an area of an unidentified object other than the area of the background from each other. As is obvious from the description given above, the processing includes a process to compute a characteristic quantity of every image portion and a process to compute a difference between any 2 characteristic quantities.

6: Fifth Embodiment

Figure 19:
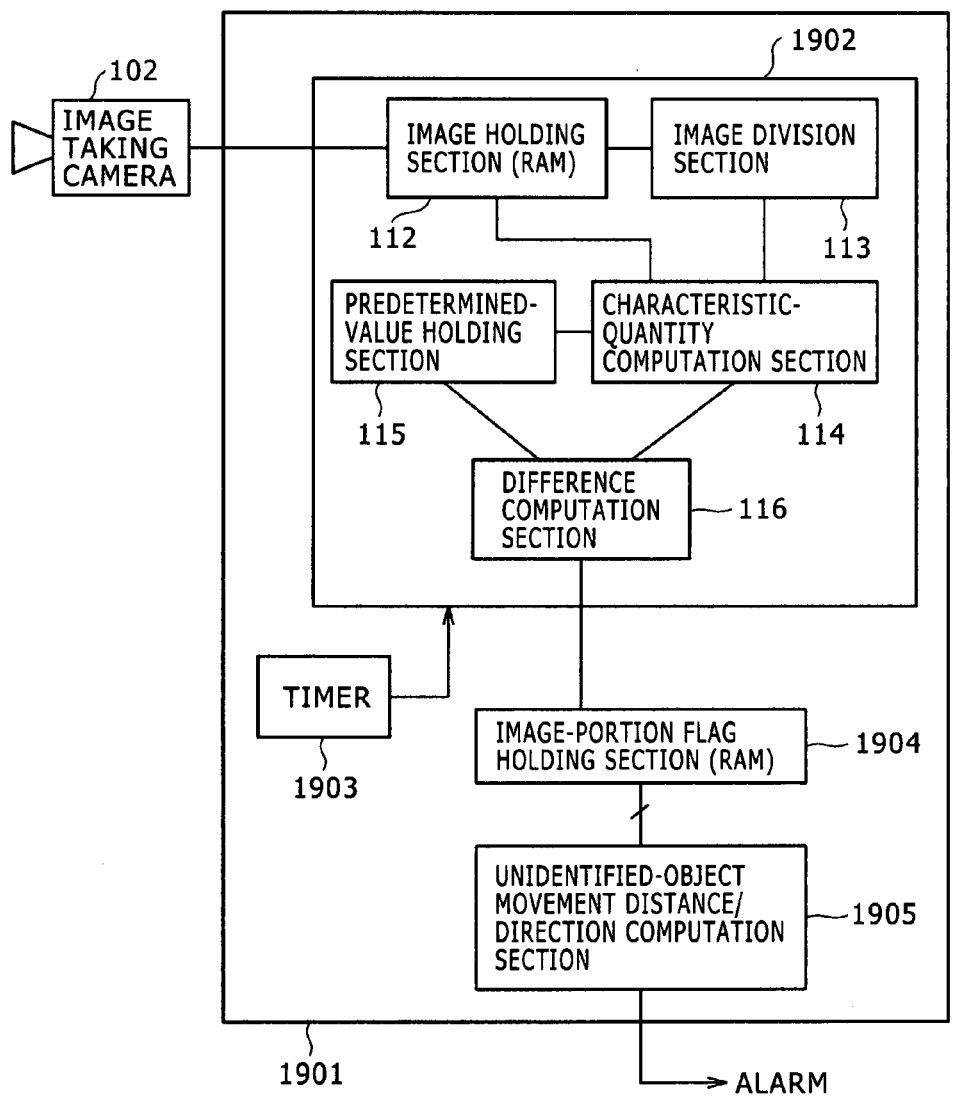
FIG. 19 is a block diagram showing an entire image-processing apparatus according to the fifth embodiment of the present invention.

FIG. 19 is a block diagram showing an image-processing apparatus 1901 according to the fifth embodiment of the present invention.

An image-portion determination processing section 1902 employed in the image-processing apparatus 1901 is identical with the image-processing apparatus 101 shown in FIG. 1B. That is to say, the image-portion determination processing section 1902 has the same function as the first, second, third or fourth embodiment.

As an output of the image-portion determination processing section 1902, the difference computation section 116 generates a set of flags each provided for each individual one of image portions, which are generated by the image division section 113 as a result of dividing an input image, as a flag indicating existence/non-existence of an unidentified object in the individual image portion.

A timer 1903 is a unit for generating triggers at time intervals determined in advance as triggers each used for putting the image-portion determination processing section 1902 in an operating state.

An image-portion flag holding section 1904 is a RAM used for storing a plurality of flag sets output by the image-portion determination processing section 1902.

An unidentified-object movement distance/direction computation section 1905 is a unit for comparing the flag sets stored in the image-portion flag holding section 1904 with each other in order to produce a result of determination as to whether or not an area thought to be an unidentified object is moving and, if such an area is moving, the direction of the movement is detected and an alarm is output.

Figures 20A, 20B:
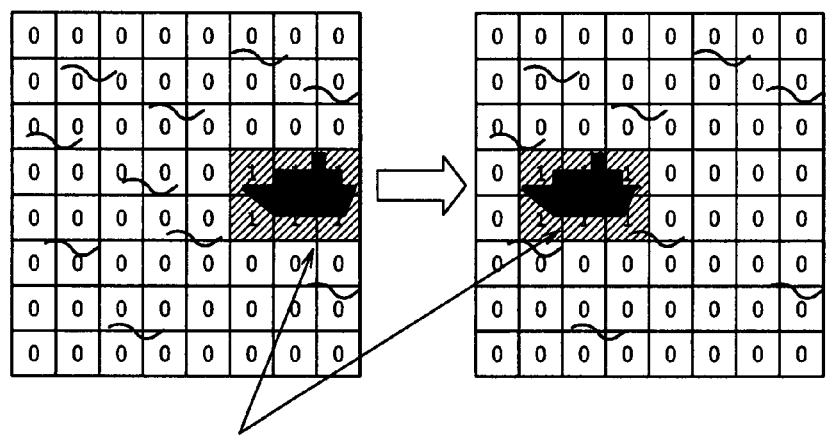
FIG. 20A is a diagram showing an image including a ship existing at a specific position in the image.
FIG. 20B is a diagram showing the image including the ship existing at a position different from the specific position in the image.

FIGS. 20A and 20B are each an image diagram referred to in description of a rough operation carried out by the image-processing apparatus 1901 according to the fifth embodiment. To be more specific, FIGS. 20A and 20B each show the image of an entire flag set.

As described above, as an output of the image-portion determination processing section 1902, the difference computation section 116 generates a set of flags each provided for each individual one of image portions, which are generated by the image division section 113 as a result of dividing an input image, as a flag indicating existence/non-existence of an unidentified object in the individual image portion. A value of 0 set in a flag of the flag set in FIG. 20A indicates that the image portion associated with the flag is not an image portion determined as a portion of an unidentified object. That is to say, a value of 0 set in a flag of the flag set in FIG. 20A indicates that the image portion associated with the flag is an image portion determined as a portion of a background.

In general, an unidentified object is moving. That is to say, a still unidentified object probably does not exist. For this reason, the image-portion determination processing section 1902 is put in an operating state at time intervals determined in advance and flag sets output by the image-portion determination processing section 1902 at the intervals are compared with each other in order to produce a result of determination as to whether or not an area thought to be an unidentified object is moving. As is obvious from FIG. 20, an area thought to be an unidentified object is moving with the lapse of time.

That is to say, instead of comparing a specific raw still image with another still raw still image separated away from the specific raw still image by a time interval in accordance with an existing technology, flag sets are compared with each other as sets of flags each set or reset on the basis of technologies provided by the embodiments.

By producing a result of determination as to whether or not an image portion on the basis of technologies provided by the embodiments described earlier is a portion of a background, it is possible to avoid incorrect recognition caused by a moving background. Thus, a movement of an unidentified object can be detected with a very high degree of precision in comparison with the existing technology.

Figure 21:
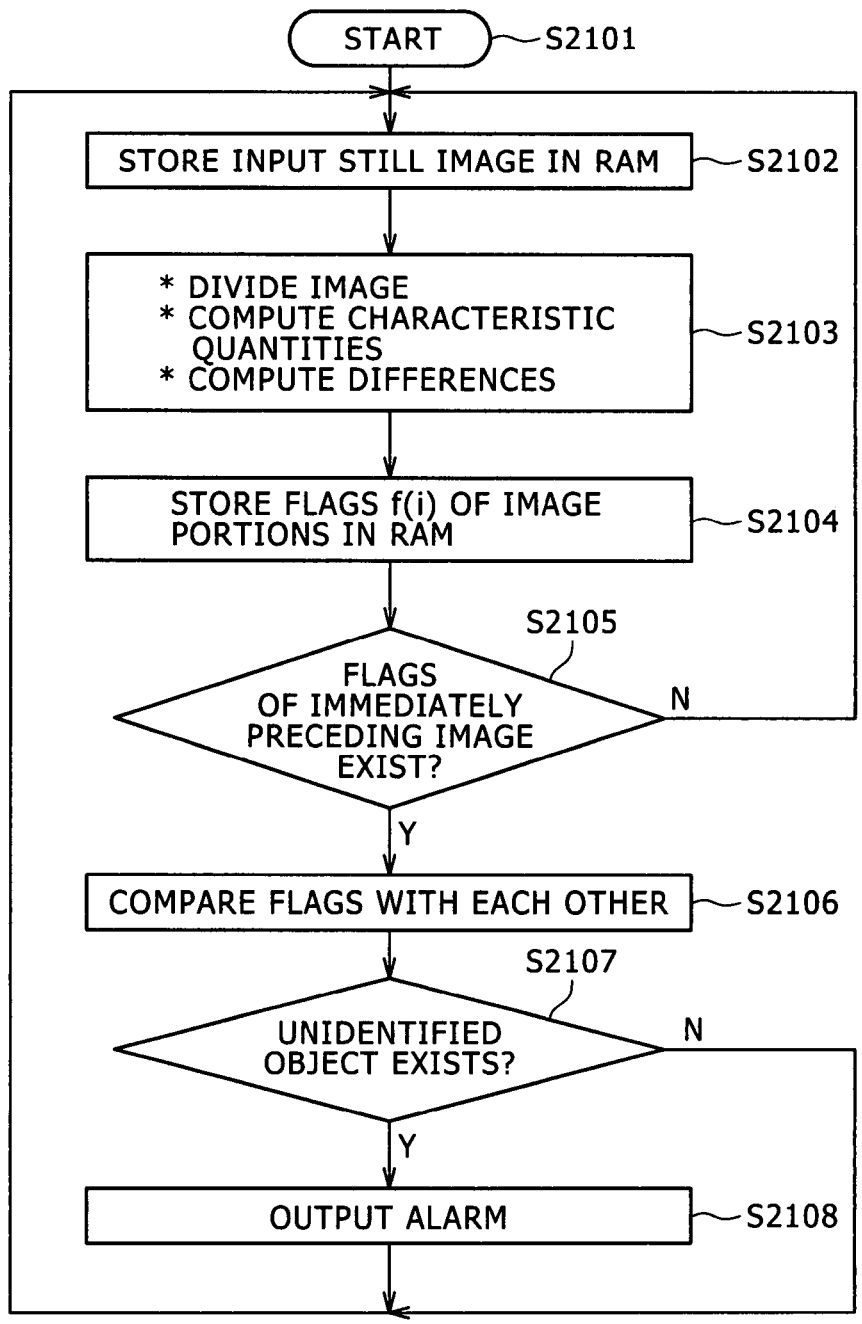
FIG. 21 shows a flowchart representing processing carried out by the image-processing apparatus according to the fifth embodiment.

FIG. 21 shows a flowchart representing processing carried out by the image-processing apparatus 1901 according to the fifth embodiment.

As shown in the figure, the flowchart begins with a step S2101. Then, at the next step S2102, an input still image is stored in a RAM. Subsequently, the flow goes on to a step S2103 to produce a result of determination as to whether each image portion is a portion of a background or a portion of an unidentified object in the same way as the first, second, third and fourth embodiments. To put it in detail, first of all, the image division section 113 divides an input still image into a plurality of image portions. Then, the characteristic-quantity computation section 114 computes a characteristic quantity for each of the image portions. Subsequently, the difference computation section 116 computes a difference between each of the characteristic quantities with a predetermined value stored in the predetermined-value holding section 115. Finally, each difference computed for an image portion is compared with a threshold value determined in advance in order to produce a result of determination as to whether the image portion is a portion of a background or a portion of an unidentified object. Then, at the next step S2104, a set of flags each representing the result of the determination for an image portion is stored in the image-portion flag holding section 1904, which is the RAM 105.

Subsequently, at the next step S2105, data stored in the RAM 105 is examined in order to produce a result of determination as to whether or not an immediately preceding set of flags has been stored in the image-portion flag holding section 1904. If the determination result indicates that no immediately preceding set of flags has been stored in the image-portion flag holding section 1904, the result of the determination is interpreted as a determination result indicating that that the processes carried out at the steps S2102, S2103, S2104 and S2105 described so far is processes of the first iteration loop of the processing represented by this flowchart. In this case, after the lapse of a time interval determined by a trigger signal generated by the timer 1903, the processes carried out at the steps S2102, S2103, S2104 and S2105 are repeated from the step S2102 at which another input still image is acquired from the image taking camera 102.

If the determination result indicates that an immediately preceding set of flags has been stored in the image-portion flag holding section 1904, on the other hand, the flow of the processing represented by this flowchart goes on to a step S2106 at which the flag set stored in the image-portion flag holding section 1904 in the process carried out at the step S2104 is compared with the immediately preceding set of flags in order to find the difference between the flag set stored in the image-portion flag holding section 1904 in the process carried out at the step S2104 and the immediately preceding set of flags. Then, the flow of the processing represented by this flowchart goes on to a step S2107 to produce a result of determination as to whether or not an unidentified object exists by determining whether or not the difference found in the process carried out at the step S2106 is at least equal to a value determined in advance. If the determination result produced in the process carried out at the step S2107 indicates that an unidentified object exists, the flow of the processing represented by this flowchart goes on to a step S2108 at which an alarm is output.

The description given above is summarized as follows. The core component of the image-processing apparatus 1901 according to the embodiment is a microcomputer operating by execution of software. With a timing determined by a trigger signal generated by the timer 1903, the image-portion determination processing section 1902 stores an input still image supplied to the image-processing apparatus 1190 in the image holding section 112, which is actually the RAM 105. Then, after the image division section 1813 divides the input still image into a plurality of image portions having the same size and the same shape, the characteristic-quantity computation section 114 computes the characteristic quantity of each of the horizontal image portions. Subsequently, the difference computation section 116 computes the difference between each of the characteristic quantities with a predetermined value stored in the predetermined-value holding section 115. Finally, each difference computed for an image portion is compared with a threshold value determined in advance. To put it concretely, an image portion having a characteristic-quantity difference smaller than the threshold value is determined to be a portion of a background. In this case, a flag provided for such an image portion is reset.

A set of set or reset flags each provided for an image portion as described above is stored in the image-portion flag holding section 1904 every time a trigger pulse signal is generated sequentially by the timer 1903 at intervals determined in advance. Then, the unidentified-object movement distance/direction computation section 1905 compares flag sets stored at the intervals in the image-portion flag holding section 1904 with each other in order to produce a result of determination as to whether or not a moving unidentified object exists on the input still image.

By carrying out the processing described above, it is possible to distinguish an area of a background of the input still image and an area of an unidentified object other than the area of the background from each other and produce a result of determination as to whether or not a moving unidentified object exists on the input still image. As is obvious from the description given above, the processing includes a process to compute a characteristic quantity of every image portion and comparison processes.

Typical implementations described below can each be conceived as a substitute for any of the embodiments described above.

(1) The microcomputer is replaced with a PLD (Programmable Logic Device).

(2) In the first, second, third and fourth embodiments, it is possible to add an exclusion process to exclude a background portion included in an image as a portion easy to mistakenly recognize as an unidentified object from the processing to compute characteristic quantities.

(3) The features provided by the first, second, third, fourth and fifth embodiments can all be implemented in one image-processing apparatus. In this case, flag values computed in accordance with the features of the first to fourth embodiments as the values of flags each provided for an image portion of an input image are multiplied logically by each other or subjected to an addition process to yield a resultant value to be compared with a threshold value in order to produce a result of determination as to whether or not an unidentified object exists in the input still image. Thus, flag sets to be compared with each other in accordance with the feature of the fifth embodiment are each a set of flags each having such a resultant value.

In the embodiments described above, it is possible to distinguish an unidentified object from the background of an input still image as an object different from the background. The technique adopted in the processing according to the embodiments is different from a commonly known technique based on the existing technology as a technique for comparing the present image with the image immediately preceding the present image. That is to say, in the processing according to the embodiments, only the present input still image is processed to produce a result of determination as to whether or not an unidentified object exists in the input still image. Thus, the present invention is particularly suitable for the configuration of a monitoring system in which the image taking camera is mounted on a slewing gear base in a state of allowing the camera to be rotated in the clockwise and counterclockwise directions over a horizontal plane.

In addition, in the embodiments described above, in order to produce a result of determination as to whether or not an unidentified object exists in an input still image, the image is divided into a plurality of image portions having a predetermined size and a predetermined shape, and a characteristic quantity is computed for each of the image portions. Then, a difference between each of the characteristic quantities and a value determined in advance is computed. Thus, even if a background such as a sea and the sky changes in accordance with natural phenomena, the background having a fixed characteristic quantity can be recognized in advance, allowing an unidentified object having a characteristic quantity different from the fixed characteristic quantity to be detected.

As a result, by combining an image-processing apparatus provided by the present invention with an image taking camera, it is possible, to provide an excellent image-processing apparatus capable of well recognizing a sea and/or the sky as a background even if waves of the sea move as splashes and/or clouds of the sky move as natural phenomena in comparison with an image-processing apparatus based on the existing technology.

7: Concept Common to Other Embodiments

FIGS. 22A and 22B are typical image diagrams referred to in description of an outline of operations carried out by an image-processing apparatus according to other embodiments to be described later. To be more specific, FIG. 22A shows an input image 5101 including a sea 5102, the sky 5103 and a ship 5104 serving as an unidentified object floating on the sea 5102. The sea 5102 is a scenery, the picture of which has been taken in a photographing operation carried out at a remote location. The actual distance between the lower part of the sea 5102 and the vicinity of the sea horizon in the input image 5101 is long. Thus, a wave splash on the surface of the sea 5102 in front of the viewer is seen as a big splash while a wave splash on the surface of the sea 5102 at a location close to the sea horizon is seen as a small splash. That is to say, the sea 5102 in the input image 5101 obtained as a result of the photographing operation is not a uniform pattern.

If the entire input image 5101 is taken as an object of evaluation, it will be difficult to obtain an elaborate result.

In order to solve this problem, the input image 5101 is divided into a plurality of horizontal image portions each oriented in a direction parallel to the sea horizon. To put it concretely, the input image 5101 is divided into horizontal image portions 5105, 5106, 5107, 5108, 5109 and 5110 as shown in FIG. 22B. Then, for each of the horizontal image portions 5105, 5106, 5107, 5108, 5109 and 5110, the characteristic-quantity computation process and the comparison process, which have been explained before, are carried out.

FIGS. 23A and 23B are each a block diagram showing an image-processing apparatus 5201 for implementing the technological concept described above. That is to say, FIG. 23 is block diagrams each showing the entire configuration of the image-processing apparatus 5201 as configurations based on the technological concept common to the embodiments. To be more specific, FIG. 23A is a block diagram showing core components of hardware employed in image-processing apparatus 5201 whereas FIG. 23B is a block diagram focused on functions of the image-processing apparatus 5201.

As shown in FIG. 23A, the image-processing apparatus 5201 is an apparatus for producing a result of determination as to whether or not an unidentified object exists in an image received from an image taking camera 5202 and for outputting a binary signal indicating whether or not an unidentified object exists in an image received from the image taking camera 5202. That is to say, the binary signal serves as an alarm output when the signal indicates that an unidentified object exists in an image received from the image taking camera 5202. The image taking camera 5202 is a commonly known camera for outputting an image signal. The image taking camera 5202 is typically a camera employing a CCD image-taking device. The image taking camera 5202 outputs the image signal to a large-capacity storage apparatus such as an HDD or a host apparatus through a communication line or the like by way of the image-processing apparatus 5201.

The image-processing apparatus 5201 employs a microcomputer as a core component. The microcomputer includes a CPU 5203, a ROM 5204 and a RAM 5205, which are connected to each other by a bus 5206. The microcomputer carries out a process determined in advance on an image received from the image taking camera 5202 and outputs the result of the process to the large-capacity storage apparatus such as an HDD or the host apparatus through an output I/F 5207.

It is to be noted that the configuration shown in FIG. 23A is a configuration common to all embodiments to be described later in detail.

All the functional sections shown in FIG. 23B except an image holding section 5212 implemented as the RAM 5205 are software programs stored in the ROM 5204 to be executed by the microcomputer described above.

An image received from the image taking camera 5202 is stored in the image holding section 5212 as a still image.

A horizontal image division section 5213 is a module for dividing the image stored in the image holding section 5212 into horizontal image portions 5502 each oriented in the horizontal direction.

An image-portion determination processing section 5214 is a module for processing each of the horizontal image portions 5502 obtained as a result of the process carried out by the horizontal image division section 5213 to divide the image stored in the image holding section 5212. To be more specific, the image-portion determination processing section 5214 produces a result of determination as to whether or not an unidentified object exists in each of the horizontal image portions 5502. If the result of the determination indicates that an unidentified object exists in a horizontal image portion 5502, the image-portion determination processing section 5214 recognizes attributes of the unidentified object. The attributes of an unidentified object include the location of the object, the shape of the object and the area of the object. The result of the processing carried out by the image-portion determination processing section 5214 is a binary alarm signal or an image output to the storage apparatus cited above or the aforementioned host apparatus through a network.

It is to be noted that the configuration shown in FIG. 23B is a configuration common to all embodiments to be described later in detail.

FIG. 23C shows a flowchart representing processing carried out by the image-processing apparatus 5201 shown in FIG. 23B.

The flowchart begins with a step S5221. Then, at the next step S5222, the horizontal image division section 5213 divides an input image 5101 into n horizontal image portions 5502, where n is an integer at least equal to 2. In actuality, in the process to divide an input image 5101 into n horizontal image portions 5502, a program implementing the horizontal image division section 5213 merely specifies relative address ranges in the RAM 5205 used for storing the input image 5101.

Then, at the next step S5223, a counter variable i used for controlling loop processing is initialized to 1. Subsequently, at the next step S5224, the image-portion determination processing section 5214 processes the ith horizontal image portion 5502 of the input image 5101. As described earlier, the processing carried out by the image-portion determination processing section 5214 includes a process to produce a result of determination as to whether or not an unidentified object exists in each of the ith horizontal image portion 5502.

After the processing is completed, at the next step S5225, the counter variable i is incremented by 1. Then, at the next step S5226, the counter variable i is compared with an integer n representing the number of horizontal image portions 5502 composing the input image 5101 in order to produce a result of determination as to whether or not the counter variable i is greater than the integer n. If the determination result indicates that the counter variable i is not greater than the integer n, the flow goes back to the step S5224 to repeat the processes of the steps S5224 to S5226. As a matter of fact, the processes of the steps S5224 to S5226 are carried out repeatedly till the determination result produced in the process carried out at the step S5226 indicates that the counter variable i is greater than the integer n.

When all the n horizontal image portions 5502 composing the input image 5101 have been processed, the flow goes on to a step S5227 at which the processing represented by the flowchart is ended.

Figure 24:
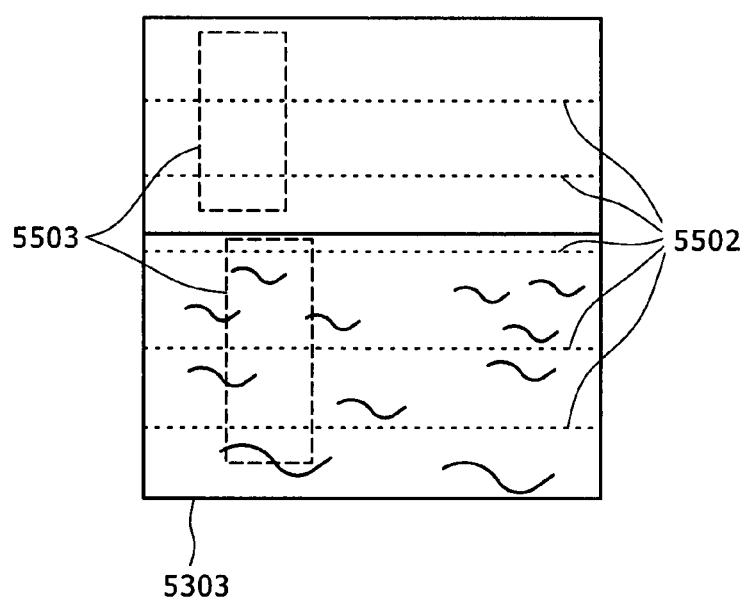
FIG. 24 is a diagram to be referred to in description of a method to specify background areas in accordance with the sixth embodiment of the present invention.

FIG. 24 is a diagram showing a screen appearing on a display section 5303. The displayed screen explicitly shows horizontal image portions 5502 cited earlier. In an operation carried out by an operator to specify a background area, the operator sets a background-area setting range 5503 by being aware of the horizontal image portions 5502 so that desired horizontal image portions 5502 are not excluded from the background-area setting range 5503.

8: Sixth Embodiment

Figure 25:
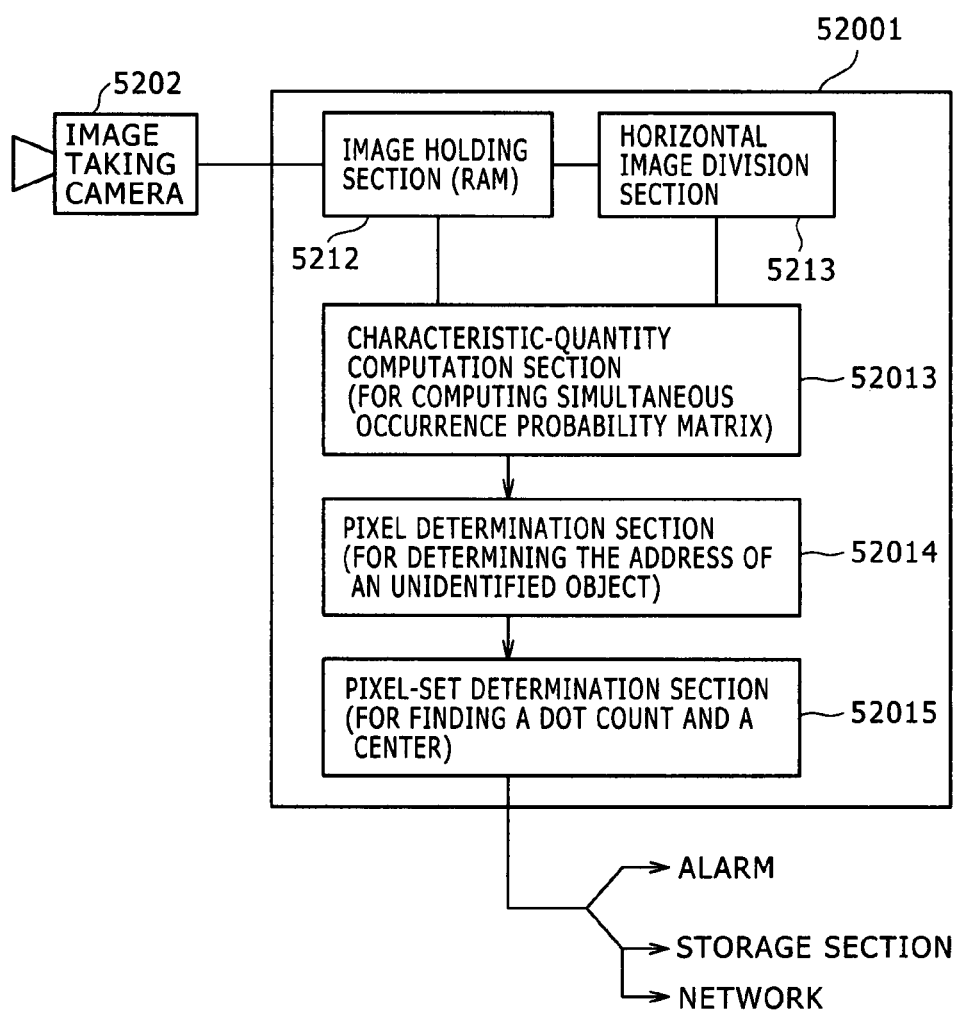
FIG. 25 is a block diagram showing an entire image-processing apparatus according to the sixth embodiment.

FIG. 25 is a block diagram showing an entire image-processing apparatus 52001 according to a sixth embodiment of the present invention.

All the functional sections shown in FIG. 25B except the image holding section 5212 implemented as the RAM 5205 are software programs stored in the ROM 5204 to be executed by the microcomputer described above.

An image received from the image taking camera 5202 is once stored in the image holding section 5212 as a still image.

The horizontal image division section 5213 divides the image stored in the image holding section 5212 into horizontal image portions each oriented in the horizontal direction.

A characteristic-quantity computation section 52013 is a module for acquiring the image stored in the image holding section 5212 and the horizontal image portions generated by the horizontal image division section 5213 and computing a characteristic quantity for each of the horizontal image portions. Thus, the characteristic quantity of each of the horizontal image portions is an array of relative addresses of the image. The arrays are created on a simultaneous-occurrence probability matrix to be described later.

A pixel determination section 52014 is a module for creating a bitmap used for identifying an unidentified object existing in a still image on the basis of an array created by the characteristic-quantity computation section 52013.

A pixel-set determination section 52015 is a module for computing the total area of an image part determined to be an unidentified object existing in a still image and for computing the coordinates of the center of the image part on the basis of the bitmap created by the pixel determination section 52014.

It is to be noted that the image-processing apparatus 52001 according to this embodiment is intended to serve as an apparatus installed at a shore in conjunction with the image taking camera 5202. A driving mechanism such as a motor drives the image taking camera 5202 into reciprocating movements in order to look over a wide area in a sea close to the shore. The driving mechanism itself is not shown in FIG. 25 though.

In order to detect an unidentified object remote from the beach, the image taking camera 5202 should have a large magnification power. However, increasing the magnification power of the image taking camera 5202 means reducing the photographing angle of the image taking camera 5202. For this reason, the image taking camera 5202 should be driven into reciprocating movements in order to look over a wide area.

Driving the image taking camera 5202 into reciprocating movements entails a technique to compare the present still image with an image immediately preceding the present still image and detect an unidentified object from a difference between the present still image and the immediately preceding still image, and such a technique is difficult to implement. Inventions according to the embodiments to be described below were innovated to solve this problem.

Figure 26:
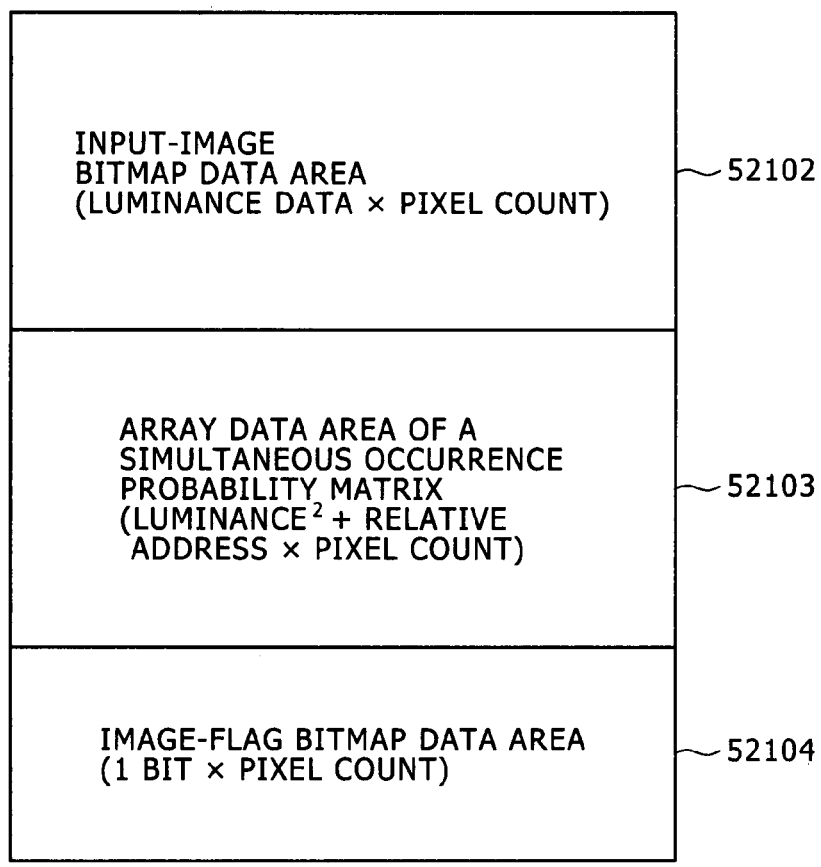
FIG. 26 is a diagram roughly showing a model of a layout of data stored in a RAM employed in the sixth embodiment.

FIG. 26 is a diagram showing a model of a layout of data stored in the RAM 5205. As shown in the figure, the layout includes three areas, i.e., an input-image bitmap data area 52102, which can also be said to be an image holding section 5212, a simultaneous occurrence probability matrix array data area 52103 for storing arrays of a simultaneous occurrence matrix and an image-flag bitmap data area 52104.

FIG. 27 is diagrams showing data internally stored in the RAM 5205.

To be more specific, FIG. 27A shows an input-image bitmap stored in the input-image bitmap data area 52102. The input image bitmap stored in the input-image bitmap data area 52102 is the bitmap of an input image generated by the image taking camera 5202 in a photographing operation. Each pixel in the image has a luminance level in a typical range of 0 to 255. The image shown in FIG. 27A includes a sea 52202, the sky 52203 and a ship 52204 serving as an unidentified object on the surface of the sea 52202.

FIG. 27B shows an image flag bitmap stored in the image-flag bitmap data area 52104 of the RAM 5205. In a process to be described later, the area of an unidentified object is detected from the input-image bitmap. The area of the ship 52204 corresponds to bits set at 1 in the image flag bitmap as shown in FIG. 27C.

FIG. 27C shows an enlarged portion of the image flag bitmap. In the bitmap shown in FIG. 27B as the enlarged portion of the image flag bitmap, a bit set at 1 corresponds to a pixel looking like a pixel of an unidentified object. On the other hand, a bit reset to 0 corresponds to a pixel looking like a pixel of a background.

Figure 28A:
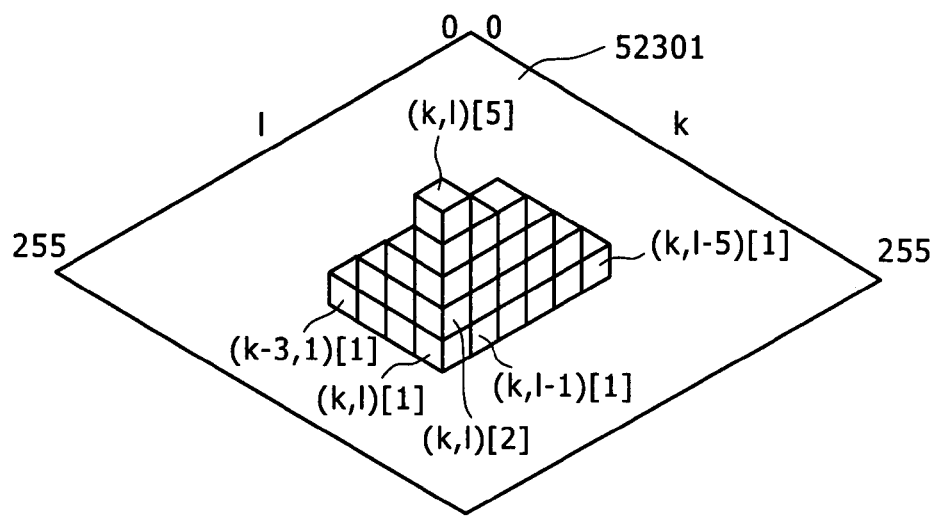
FIG. 28A is a diagram roughly showing a set field of arrays based on a simultaneous occurrence probability matrix as arrays having a variable length in accordance with the sixth embodiment.
Figure 28B:
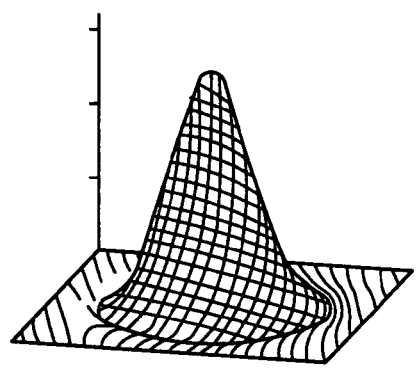
FIG. 28B is a diagram roughly showing a Gauss curved surface equivalent to the array set field shown in FIG. 28A.

FIGS. 28A and 28B are diagrams showing models of arrays stored in the simultaneous occurrence probability matrix array data area 52103 of the RAM 5205. In actuality, the arrays stored in the simultaneous occurrence probability matrix array data area 52103 at the center of the RAM 5205 do not have the shapes shown in the figures. However, the reader is requested to think that a software program ideally constructs such shapes.

To be more specific, FIG. 28A shows array data 52301, which is a set field of arrays based on a simultaneous occurrence probability matrix as arrays having a variable length. The simultaneous occurrence probability matrix is a square matrix having 256 elements (k, l). Notation element (k, l) denotes a matrix element at the intersection of the kth row and the lth column in the simultaneous occurrence probability matrix. The column number k and the row number l are each an integer in the range 0 to 255 representing luminance levels.

An array at every element position is expressed by stacked cubes. The stacked cubes include the relative address of an image pixel at the location of the stacked cubes.

Notation (k, l) [1] shown in FIG. 28A denotes the first array element of an array at a matrix element at the intersection of the kth row and the lth column in the simultaneous occurrence probability matrix.

By the same token, notation (k, l) [2] denotes the second array element of an array at a matrix element at the intersection of the kth row and the lth column in the simultaneous occurrence probability matrix.

An array can have up to five array elements. Thus, the fifth array element is denoted by notation (k, l) [5].

By the same token, notation (k, l−1) [1] shown in FIG. 28A denotes the first array element of an array at a matrix element at the intersection of the kth row and the (l−1)th column in the simultaneous occurrence probability matrix.

Likewise, notation (k, l−5) [1] denotes the first array element of an array at a matrix element at the intersection of the kth row and the (l−5)th column in the simultaneous occurrence probability matrix.

Similarly, notation (k−3, l) [1] denotes the first array element of an array at a matrix element at the intersection of the (k−3)th row and the first column in the simultaneous occurrence probability matrix.

The stacked cubes in an array include the relative address of an image pixel located at the position of the stacked cubes as a pixel of the image stored in the input-image bitmap data area 52102.

Due to page-space limitation, FIG. 28A can show few arrays each consisting of a heap of stacked cubes. However, from the few arrays each consisting of a heap of stacked cubes, it is possible to infer a shape close to the commonly known Gauss curved surface like one shown in FIG. 28B.

It is to be noted that description given later will explain a detailed method for creating arrays having a simultaneous occurrence probability matrix as a base.

Figure 29:
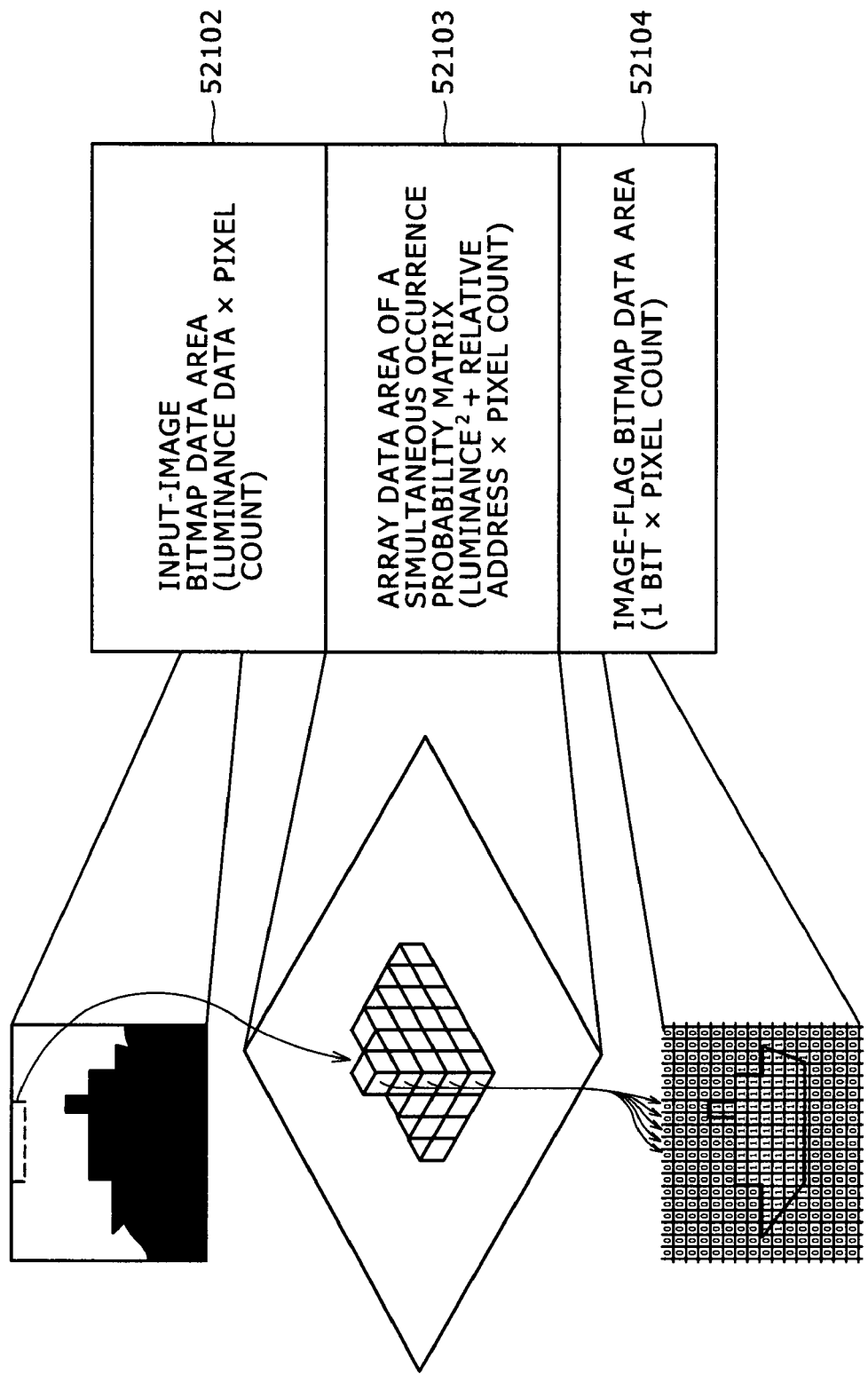
FIG. 29 is a diagram roughly showing pieces of data stored in the RAM employed in the sixth embodiment.

FIG. 29 is a diagram showing relations between the RAM 5205 and pieces of data stored in the RAM 5205.

A background stored in the input-image bitmap data area 52102 as an area having a large size includes a part concentrated in an area with many array elements in the simultaneous occurrence probability matrix array data area 52103 composing a simultaneous occurrence probability matrix. The relative addresses of image data stored as array elements of the concentrated part are some of the relative addresses of the entire background of the image-flag bitmap data area 52104. Flags at background relative addresses other than the relative addresses of image data stored as array elements of the concentrated part are reset.

In the example shown in FIG. 29, an area enclosed by a dashed line in the image stored in the input-image bitmap data area 52102 is a part of the sky, that is a part of the image stored in the input-image bitmap data area 52102. This part of the sky corresponds to arrays each consisting of stacked cubes in the simultaneous occurrence probability matrix array data area 52103. That is to say, an array variable representing an array of stacked cubes includes the relative address of a pixel serving as an element in the area enclosed by the dashed line. A flag included in the image-flag bitmap data area 52104 as a flag at such a relative address is reset from 1 to 0.

The process explained earlier by referring to FIGS. 9 and 10 as a process of creating a simultaneous occurrence probability matrix is a process to create arrays of the simultaneous occurrence probability matrix array data area 52103 shown in FIG. 29 from an input-image bitmap stored in the simultaneous occurrence probability matrix array data area 52103 also shown in FIG. 29.

However, this embodiment takes an approach different from the handling in related art of a simultaneous occurrence probability matrix.

In accordance with the technology in related art, a simultaneous occurrence probability matrix is used as a technique for comparing good products and rejected products with each other in a manufacturing process as described in documents such as Japanese Patent Laid-open No. Hei 8-297020. The image of a good product is taken in a photographing operation and a simultaneous occurrence probability matrix is created in advance. Then, the image of a product newly flowing along a manufacturing line is taken and a simultaneous occurrence probability matrix is created from the image. Subsequently, the simultaneous occurrence probability matrix of the new product is compared with the simultaneous occurrence probability matrix of the good product and differences in simultaneous occurrence probability matrix between the products are used as a basis for producing a result of determination as to whether an abnormality such as an injury or a stain exists on the new product. In this way, simultaneous occurrence probability matrixes in related art are used in a process of producing a result of determination as to whether an abnormality exists on a product.

In this embodiment, each matrix element of a simultaneous occurrence probability matrix is compared with a threshold value determined in advance. Simultaneous occurrence probability matrix elements greater than the threshold value are determined to be matrix elements corresponding to an image part having a large area, that is, matrix elements corresponding to the background of the image. Then, the area occupied by the background of the image is excluded.

Therefore, each matrix element is handled as an array and it is necessary to store the relative address of each pixel of the image in an array element of the array.

After all the processing is completed, a set-flag part included in the flag data as a narrow part showing luminance levels different from those shown by the background of the image is determined to be a part showing an unidentified object.

With regard to the determination of an unidentified object existing in an image, it may be probably nice to have the reader think determination by end-on cutting of the Gauss curved surface shown in FIG. 28B over a plane put in an orientation parallel to the xy plane as a plane representing the threshold value. The plane put in an orientation parallel to the xy plane as a plane representing the threshold value is referred to as a threshold plane. The relative address of image data corresponding to each matrix element resulting from the cutting of the Gauss curved surface over the threshold plane (that is, each matrix element in contact with the threshold plane) is the relative address of a location on the background.

Figure 30:
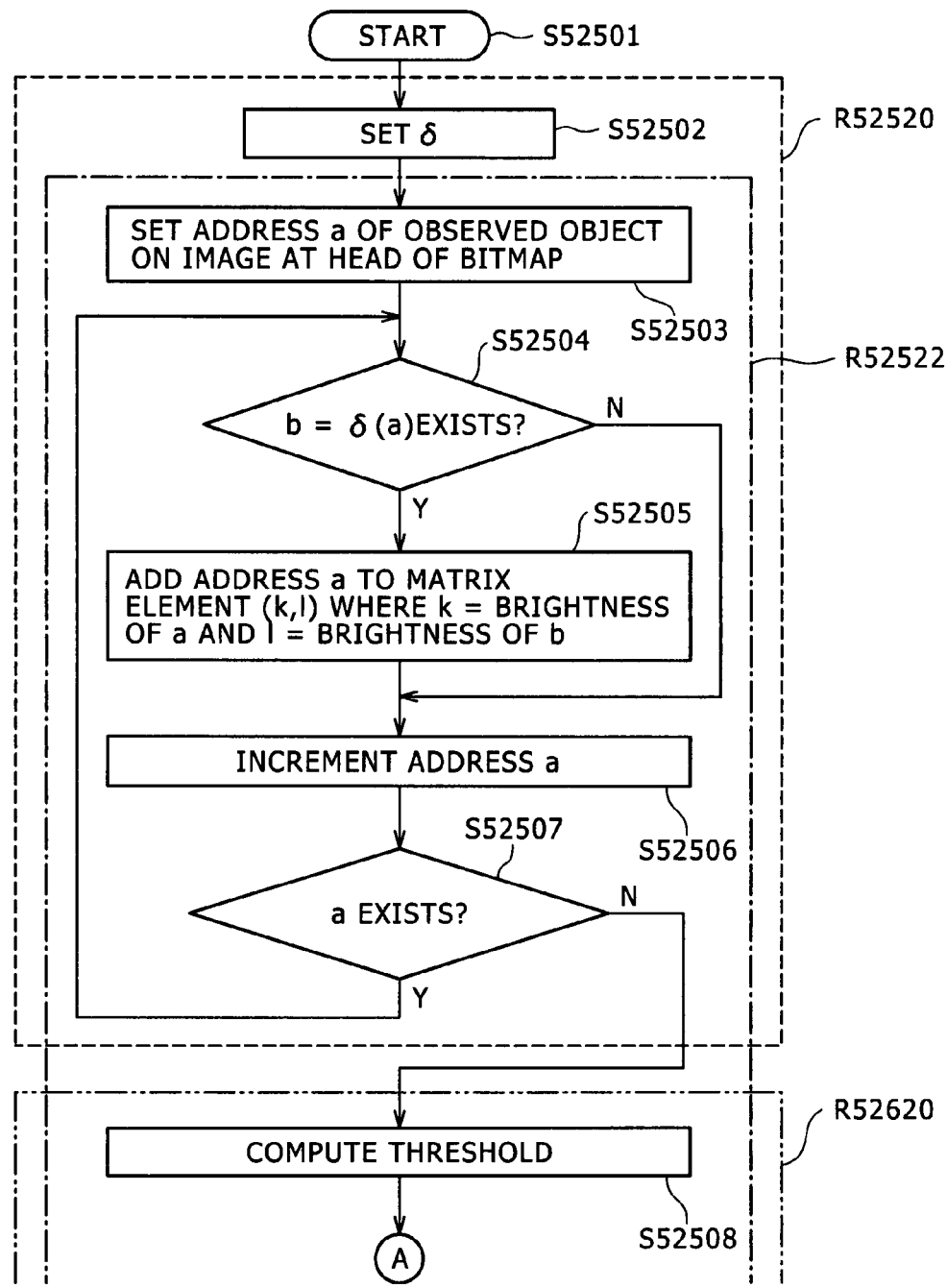
FIG. 30 shows the first part of a flowchart representing processing carried out by the image-processing apparatus according to the sixth embodiment.
Figure 31:
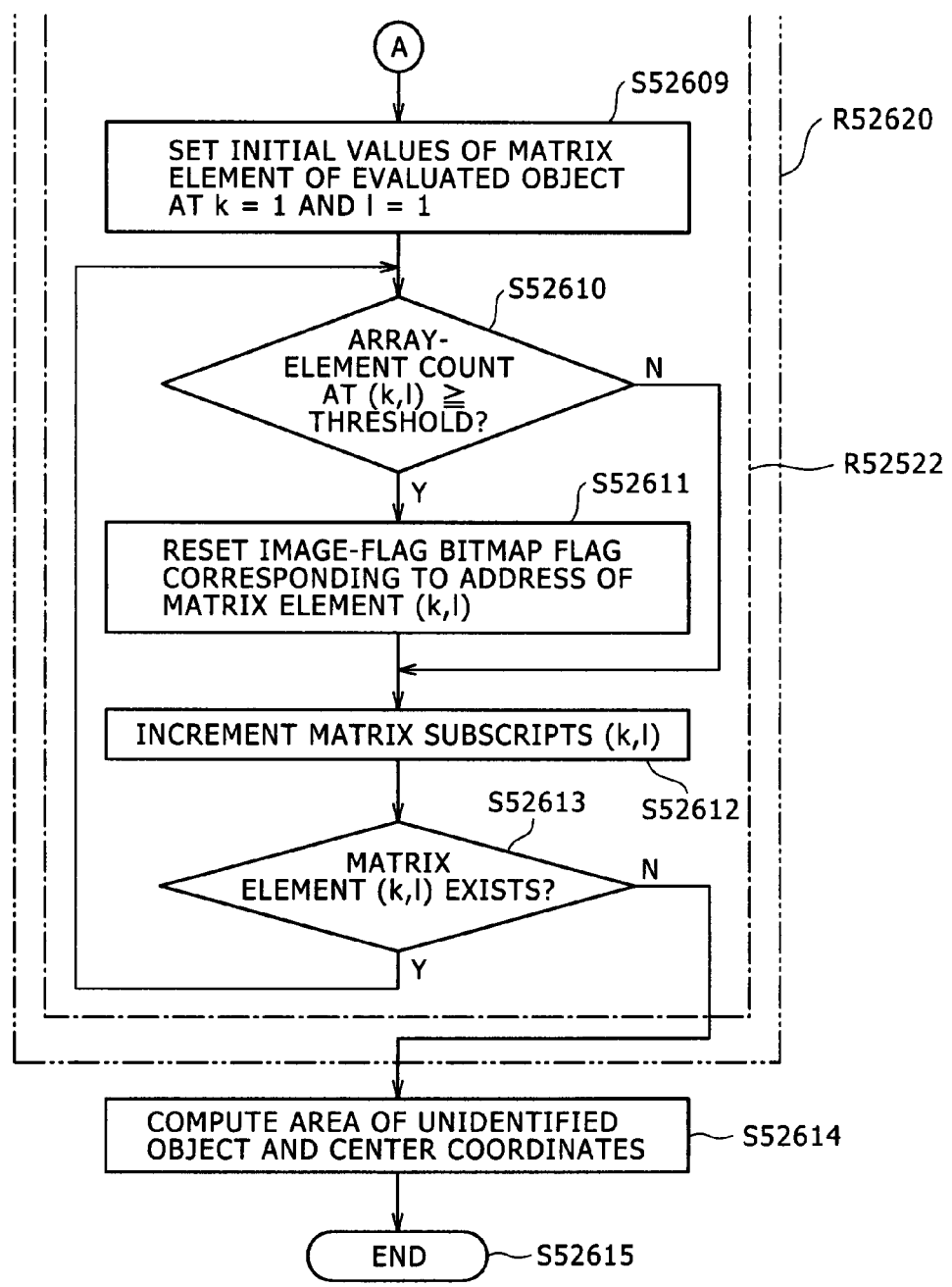
FIG. 31 shows the second part of the flowchart representing the processing carried out by the image-processing apparatus according to the sixth embodiment.

FIGS. 30 and 31 show a flowchart representing the flow of processing carried out by the image-processing apparatus 52001 according to the embodiment.

As shown in FIG. 30, the flowchart begins with a step S52501. Then, at the next step S52502, a relative position function δ is set as a rule for creating a simultaneous occurrence probability matrix, firstly. Subsequently, at the next step S52503, the address a of an observed object on an input-image bitmap is set to point to the head of the input image. The address a is a relative address in the input-image bitmap and, in process carried out at this step, the initial value of the relative address in the processing is set.

Then, the flow of the processing represented by this flowchart goes on to a step S52504 to produce a result of determination as to whether or not a pixel exists at a location separated away from the relative address a by the relative position function δ. For a relative position function δ=(1, 0°), for example, a relative address b=δ(a) does not exist if the relative address a is an address at the right end of the input-image bitmap.

If the determination result produced in the process carried out at the step S52504 indicates that the relative address b=δ(a) exists, the flow of the processing represented by this flowchart goes on to a step S52505 at which the luminance level at the relative address a is set as the row number k. Then, the relative address a is added to an array at the matrix element (k, l) in the array data area 51203. That is to say, one more cube is stacked on an array shown in FIG. 28A and the relative address a is stored in the cube. It is to be noted that, if the determination result produced in the process carried out at the step S52504 indicates that the relative address b=δ(a) does not exist, on the other hand, the flow of the processing represented by this flowchart goes on directly to a step S52506, skipping the process carried out at the step S52505. This is because the process to add a relative address to an array at an matrix element of the simultaneous occurrence probability matrix may not be carried out.

At the step S52506, the relative address a is incremented by 1. Then, the flow of the processing represented by this flowchart goes on to a step S52507 to produce a result of determination as to whether or not the relative address a exists. If the determination result produced in the process carried out at the step S52507 indicates that the relative address a exists, the flow of the processing represented by this flowchart goes back to the step S52504 to repeat the processing starting with the process of this step. If the determination result produced in the process carried out at the step S52507 indicates that the relative address a does not exist, on the other hand, the result of the determination is interpreted as a determination result indicating that the end of the input-image bitmap has been reached. In this case, the flow of the processing represented by this flowchart goes on to the next stage of processing starting with a process of a step S52508.

When the processing of the simultaneous occurrence probability matrix is completed for all the input-image bitmap, at the step S52508, a threshold value is computed from the matrix elements. There are a variety of conceivable methods for computing a threshold value. For example, a constant value determined in advance or an average of all matrix elements each having an array-element count of at least equal to 1 is used as a threshold value.

After a threshold value is computed, at a step S52609, initial values of a matrix element located in the array data area 51203 as a matrix element to be evaluated are set. That is to say, the row number k and the column number l are both set at 1.

Then, at the next step S52610, the array-element count at the matrix element (k, l) is compared with the threshold value in order to produce a result of determination as to whether or not the array-element count at the matrix element (k, l) is at least equal to the threshold value. If the determination result produced in the process carried out at the step S52610 indicates that the array-element count at the matrix element (k, l) is at least equal to the threshold value, the flow of the processing represented by this flowchart goes on to a step S52611 at which a flag included in the image-flag bitmap data area 52104 as a flag corresponding to the relative address stored in an array corresponding to an array at the matrix element (k, l) is reset. That is to say, the matrix element (k, l) is determined to be a matrix element corresponding to a position in the background. If the determination result produced in the process carried out at the step S52610 indicates that the array-element count at the matrix element (k, l) is smaller than the threshold value, on the other hand, the flow of the processing represented by this flowchart goes on directly to a step S52612 by skipping the process of the step S52611. That is to say, the matrix element (k, l) is determined to be a matrix element corresponding to a position in the background.

At the step S52612, the row number k and the column number l are updated to get the next matrix element (k, l). Then, the flow of the processing represented by this flowchart goes on to a step S52613 to produce a result of determination as to whether or not the next matrix element (k, l) exists. If the determination result produced in the process carried out at the step S52613 indicates that the next matrix element (k, l) exists, the flow of the processing represented by this flowchart goes back to the step S52610 to repeat the processes of this and subsequent steps. If the determination result produced in the process carried out at the step S52613 indicates that the next matrix element (k, l) does not exist, on the other hand, the flow of the processing represented by this flowchart goes on to a step S52614 because the processing described so far has been carried out on all matrix elements.

At the step S52614, the coordinates of the center of an area left in the image-flag bitmap data area 52104 as an area with set flags are computed. The area left in the image-flag bitmap data area 52104 as an area with set flags is the area of an unidentified object. Finally, at the last step S52615, the execution of the processing represented by this flowchart is ended.

The processes carried out at the steps S52502, S52503, S25204, S52505, S52506 and S25207 of the flowchart shown in FIG. 30 are the processing carried out by the characteristic-quantity computation section 52013 employed in the image-processing apparatus 52001 shown in FIG. 25. That is to say, these processes are processing to find a simultaneous occurrence probability matrix.

The process carried out at the step S52508 of the flowchart shown in FIG. 30 as well as the processes carried out at the steps S52609, S52610, S52611, S52612 and S52613 of the flowchart shown in FIG. 31 are the processing carried out by the pixel determination section 52014 employed in the image-processing apparatus 52001 shown in FIG. 25. That is to say, these processes are processing to determine the address of an unidentified object.

The process carried out at the step S52614 of the flowchart shown in FIG. 31 is the processing carried out by the pixel-set determination section 52015 employed in the image-processing apparatus 52001 shown in FIG. 25. That is to say, these processes are processing to find the coordinates of the center of the area in which the unidentified object exists.

9 Seventh Embodiment

Next, the seventh embodiment of the present invention is explained.

Figure 32:
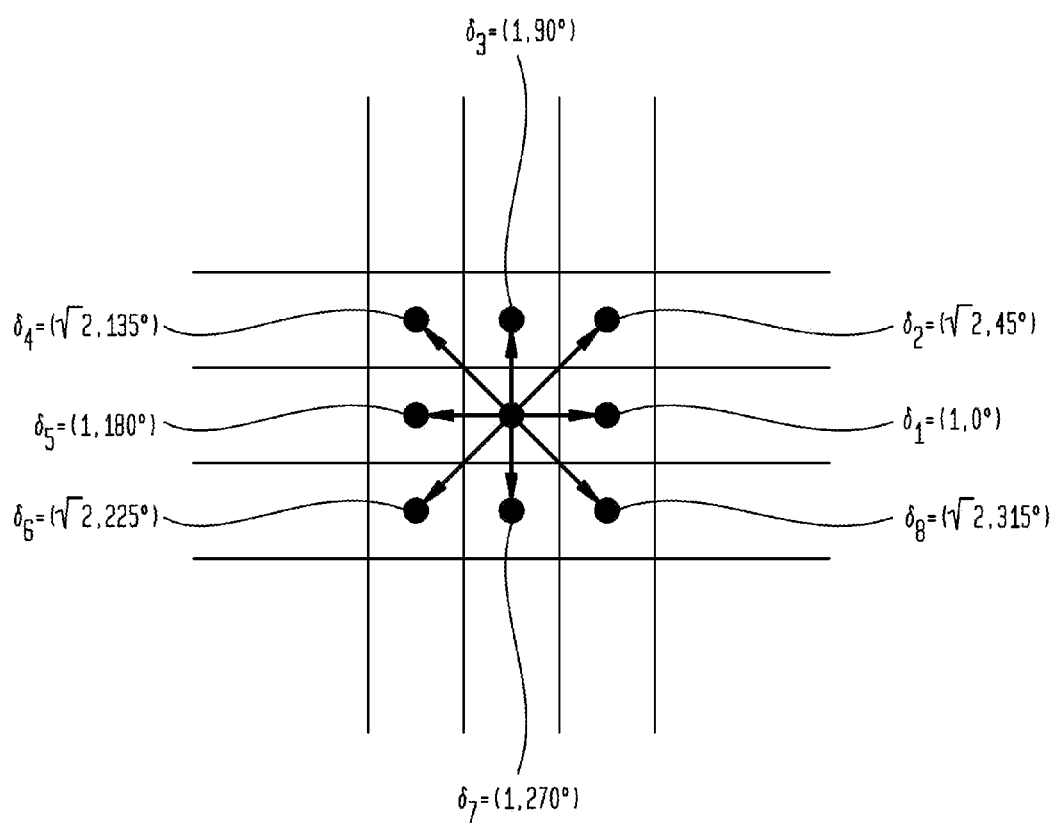
FIG. 32 is a diagram roughly showing relations between pixels of an image and relative position functions δ(i) used in the image-processing apparatus according to the seventh embodiment of the present invention.

FIG. 32 is a diagram roughly showing relative position functions δ used in an image-processing apparatus according to the seventh embodiment.

The internal configuration of the image-processing apparatus according to the seventh embodiment is not much different from the internal configuration of the image-processing apparatus according to the sixth embodiment shown in FIG. 25. In the case of the seventh embodiment, however, a plurality of relative position functions δ are used. Then, on the basis of the relative position functions δ, a plurality of simultaneous occurrence probability matrixes are created.

The image-processing apparatus according to the sixth embodiment has been explained by taking the relative position function δ=(1, 0°) as an example. By the way, also in accordance with the technology in related art, a plurality of simultaneous occurrence probability matrixes are created on the basis of a plurality of relative position function δ. This technique is merely a technique to quantize characteristic quantities of an image composed of a fixed pattern with a high degree of accuracy.

As is obvious from FIG. 32, there are eight pixels existing at locations surrounding a certain pixel. Relative position functions δ for these pixels are described as follows.

A relative position function δ1 is δ1=(1, 0°) having a distant of 1 and an angle of 0°. A relative position function δ2 is δ2=(√2, 45°) having a distant of √2 and an angle of 45°. By the same token, a relative position function δ3 is δ3=(1, 90°), a relative position function δ4 is δ4=(√2, 135°), a relative position function δ5 is δ5=(1, 180°), a relative position function δ6 is δ6=(√2, 225°), a relative position function δ7 is δ7=(1, 270°) and a relative position function δ8 is δ8=(√2, 315°).

That is to say, eight relative position functions δ1 to δ8 can be created. By making use of the eight relative position functions δ1 to δ8, eight simultaneous occurrence probability matrixes can be created.

Figure 33:
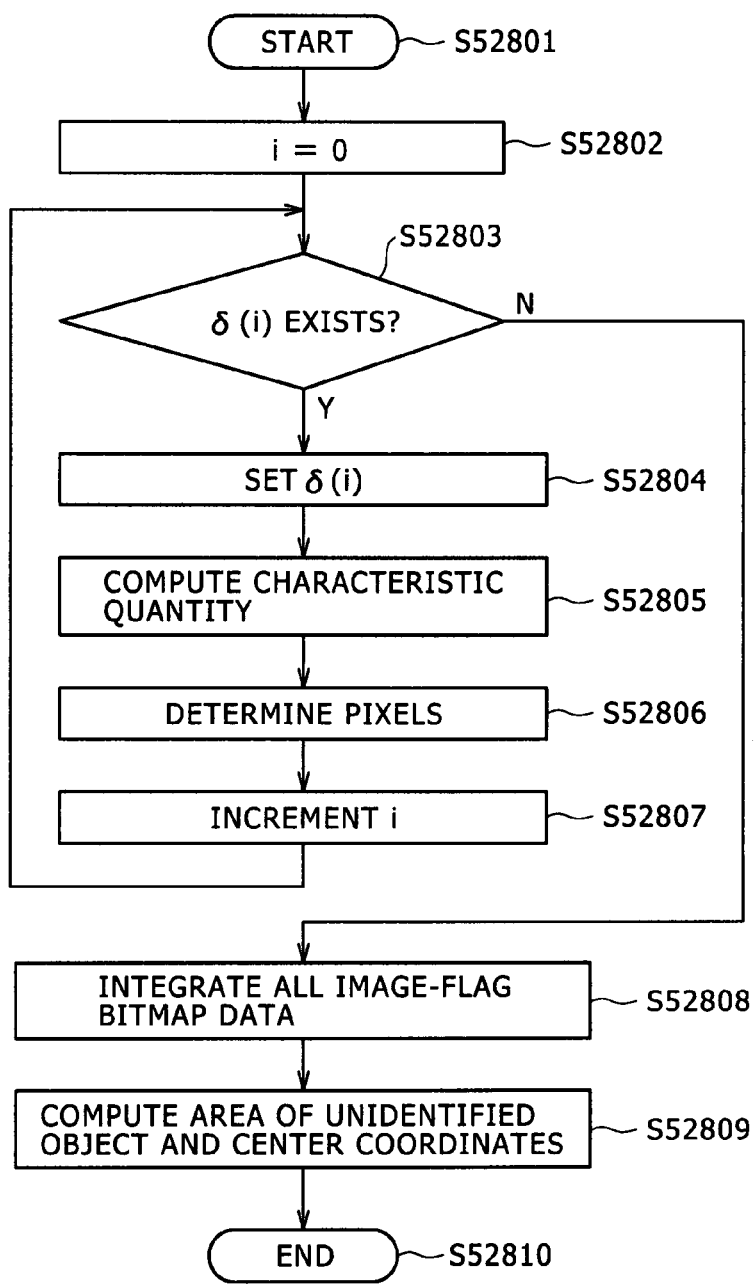
FIG. 33 shows a flowchart representing processing carried out by the image-processing apparatus according to the seventh embodiment.

FIG. 33 shows a flowchart representing processing carried out by the image-processing apparatus according to this embodiment. As shown in the figure, the flowchart begins with a step S52801. Then, at the next step S52802, a counter variable i is initialized to 0. Subsequently, the flow of the processing represented by this flowchart goes on to a step S52803 to produce a result of determination as to whether or not a relative position function δ(i) serving as a rule for creating a simultaneous occurrence probability matrix exists.

If the determination result produced in the process carried out at the step S52803 indicates that the relative position function δ(i) exists, the flow of the processing represented by this flowchart goes on to a step S52804 at which the relative position function δ(i) is set. Then, at the next step S52805, a characteristic quantity is computed on the basis of a simultaneous occurrence probability matrix based on this relative position function δ(i). Subsequently, at the next step S52806, a pixel determination process is carried out by making use of the data obtained as the data of arrays in the simultaneous occurrence probability matrix.

The process carried out at the step S52805 is equivalent to the processes carried out at the steps S52503, S52504, S52505, S52506 and S52507 of the flowchart shown in FIG. 30.

On the other hand, the process carried out at the step S52806 is equivalent to the process carried out at the step S52508 as well as the processes carried out at the steps S52609, S52610, S52611, S52612 and S52613 of the flowchart shown in FIG. 31.

Subsequently, at the next step S52503, the address a of an observed object on an input-image bitmap is set to point to the head of the input image. The address a is a relative address in the input-image bitmap and, in process carried out at this step, the initial value of the relative address in the processing is set.

That is to say, the processes carried out at the steps S52805 and S52806 are equivalent to a subroutine R52522 enclosed in a single-dotted line in the flowchart shown in FIG. 30. In the processes carried out at the steps S52805 and S52806, data of arrays on a simultaneous occurrence probability matrix is created and, pixels of an unidentified object are identified on the basis of an image-flag bitmap data area 52104 made from the created data.

When the process carried out at the step S52806 is completed, the flow of the processing represented by this flowchart goes on to a step S52807 at which the counter variable i is incremented by 1. Then, the flow of the processing represented by this flowchart goes back to the step S52803 to produce a result of determination as to whether or not a relative position function δ(i) exists. If the determination result produced in the process carried out at the step S52803 indicates that the relative position function δ(i) exists, the flow of the processing represented by this flowchart goes on to the step S52804 at which the relative position function δ(i) is set. Thereafter, the processes of the steps S52805 to S52807 are carried out. If the determination result produced in the process carried out at the step S52803 indicates that the relative position function δ(i) does not exist, on the other hand, the result of the determination is interpreted as a determination result indicating that the processing for all the relative position functions δ(i) has been completed. In this case, the flow of the processing represented by this flowchart goes on to a step S52808.

At the step S52808, all i image-flag bitmaps obtained for the relative position functions δ(i) are integrated. The process of the step S52808 is carried out typically by taking a logical product of every bit in all the image-flag bit maps or taking a sum of every bit in all the image-flag bit maps and comparing each sum with a proper threshold value in order to give a resultant flag. By carrying out this processing, the existence of an unidentified object can be determined with a high degree of precision.

Then, at the next step S52809, the coordinates of the center of the area in which the unidentified object exists are computed. Finally, at the last step S52810, the execution of the processing represented by this flowchart is ended.

The description given above is summarized as follows.

The core component of the image-processing apparatus 52001 according to the embodiment is a microcomputer operating by execution of software.

When an input still image is supplied to the image-processing apparatus 52001, the image is stored in the input-image bitmap data area 52102 of the RAM 5205. Later on, array data is created in the simultaneous occurrence probability matrix array data area 52103 by adoption of an algorithm based on a simultaneous occurrence probability matrix. Then, a threshold value is computed from the created array data. An image pixel corresponding to a matrix element having an array-element count satisfying the computed threshold value is determined to be a pixel of the background of the input still image. Subsequently, the relative address of the image pixel corresponding to a matrix element having an array-element count satisfying the computed threshold value is read out from the array data for the matrix element, whereas the flag included in the image-flag bitmap data area 52104 as a flag at the relative address is set.

By carrying out the processing described above, on the basis of a simultaneous occurrence probability matrix generated from an input still image, it is possible to distinguish the background of the image and parts other than the background from each other.

10: Eighth Embodiment

Figure 34:
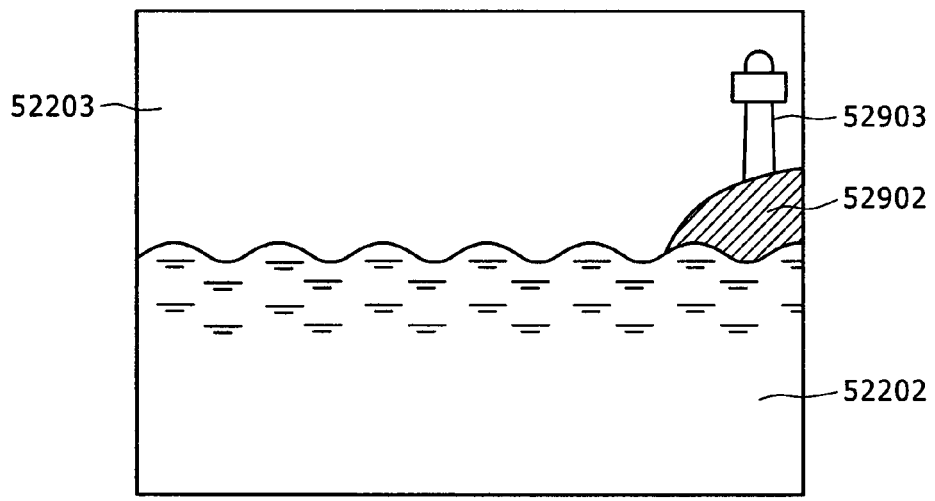
FIG. 34 is a diagram showing a typical still image taken by an image-processing apparatus according to the eighth embodiment of the present invention.

Next, the eighth embodiment of the present invention is explained. FIG. 34 is a diagram showing a typical still image taken by an image taking camera 5202.

The reader is requested to compare this typical still image with the image shown in FIG. 27A. The image shown in FIG. 27A includes a part serving as an unidentified object 5304 while the typical still image shown in FIG. 34 includes a shore 52902 and a light tower 52903 built on the shore 52902. Even though each of the shore 52902 and the light tower 52903 is obviously not an unidentified object, it is quite within the bounds of possibility that, by adoption of the technique according to the sixth embodiment as it is, the shore 52902 and the light tower 52903 will be each mistakenly recognized as an unidentified object. This is because, in comparison with the whole image, the size of the area occupied by each of the shore 52902 and the light tower 52903 is small so that each of the shore 52902 and the light tower 52903 is not recognized as a background. In order to solve this problem, it is necessary to carry out a process to remove objects each to be mistakenly recognized as an unidentified object from objects of the processing to create a simultaneous occurrence probability matrix in advance.

Figure 35A:
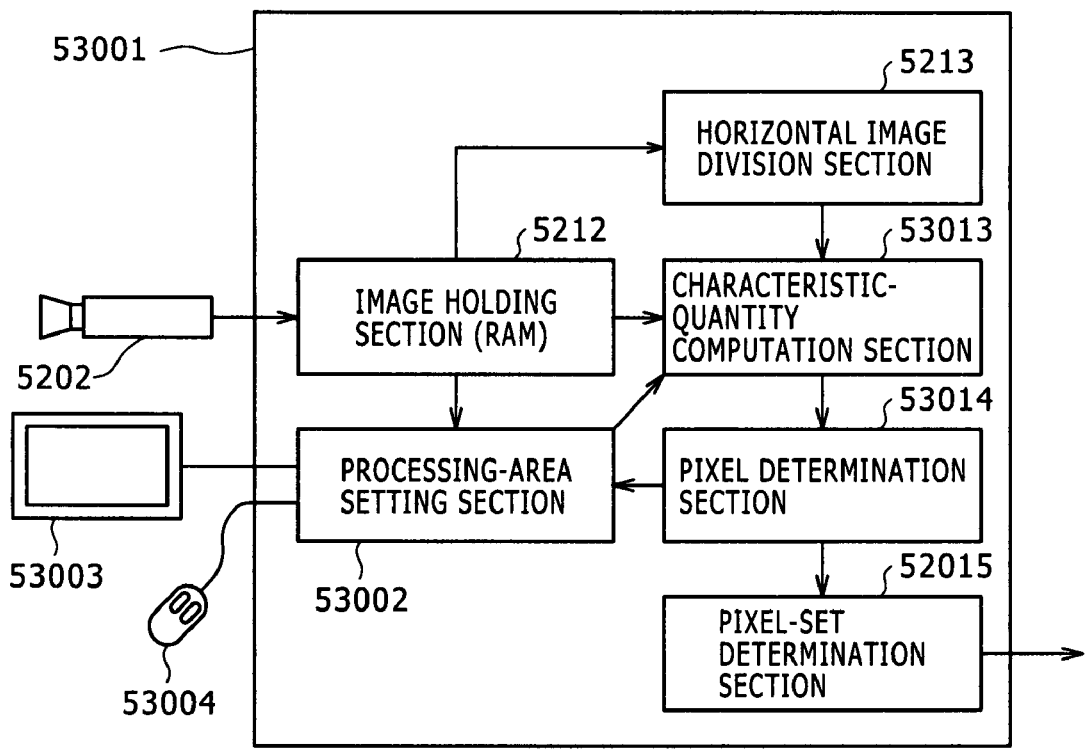
FIG. 35A is a block diagram showing an entire image-processing apparatus according to the eighth embodiment.

FIG. 35A is a block diagram showing the entire image-processing apparatus 53001 according to the eighth embodiment. The image-processing apparatus 53001 shown in FIG. 35A is all but identical with the image-processing apparatus 52001 according to the sixth embodiment shown in FIG. 25. Some components shown in FIG. 35A as components of the image-processing apparatus 53001 have the same functions as their counterparts employed in the image-processing apparatus 52001 shown in FIG. 25. The components having the same functions as their counterparts are denoted by the same reference numerals as the counterparts and the components having the same functions as their counterparts are not explained in detail in the following description.

Prior to execution of the main processing, on the basis of the data of a still image taken in a photographing operation, the image-processing apparatus 53001 according to this embodiment carries out a process to exclude special areas in the still image in advance from objects subjected to the processing to recognize an unidentified object. In order to exclude special areas in the still image in advance from objects subjected to the processing to recognize an unidentified object, the image-processing apparatus 53001 is designed by newly adding a processing-area setting section 53002, a display section 53003 and an input section 53004 to the image-processing apparatus 52001 according to the sixth embodiment shown in FIG. 25.

The display section 53003 is the LCD unit in related art whereas the input section 53004 is the mouse in related art.

On the basis of a processing result output by an pixel determination section 53014, the processing-area setting section 53002 places an area looking like the area of an unidentified object on the image held in the image holding section 5212, displaying the area looking like the area of an unidentified object and the image to the display section 53003. Then, the user operates the input section 53004 in order to specify an area displayed on the display section 53003 in a state of overlapping a still image also appearing on the display section 53003 as an area to be excluded.

The processing-area setting section 53002 sets the area to be excluded in the characteristic-quantity computation section 53013 so that the area is excluded from a process carried out by the characteristic-quantity computation section 53013 to compute a simultaneous occurrence probability matrix.

In the case of the typical still image shown in FIG. 34, the processing-area setting section 53002 sets the areas of the shore 52902 and the light tower 52903 in the characteristic-quantity computation section 53013 as areas to be excluded from a process carried out by the characteristic-quantity computation section 53013 to compute a simultaneous occurrence probability matrix. The characteristic-quantity computation section 53013 does not carry out the process to compute a simultaneous occurrence probability matrix on image pixels corresponding to the areas to be excluded. That is to say, the characteristic-quantity computation section 53013 forcibly handles the areas to be excluded from a process carried out by the characteristic-quantity computation section 53013 to compute a simultaneous occurrence probability matrix as areas in the background.

11: Ninth Embodiment

Next, the ninth embodiment of the present invention is explained.

Figure 35B:
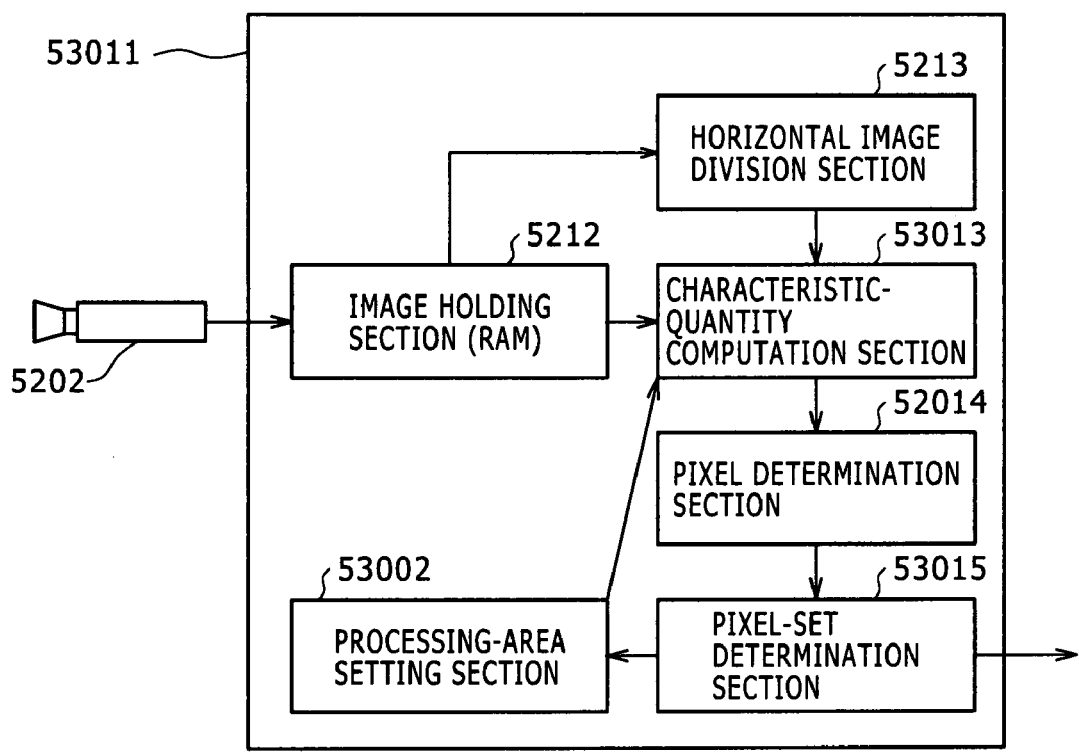
FIG. 35B is a block diagram showing an entire image-processing apparatus according to the ninth embodiment of the present invention.

FIG. 35B is a block diagram showing the entire image-processing apparatus 53011 according to the ninth embodiment. The image-processing apparatus 53011 shown in FIG. 35B is all but identical with the image-processing apparatus 53001 according to the eighth embodiment shown in FIG. 35A. Some components shown in FIG. 35B as components of the image-processing apparatus 53011 have the same functions as their counterparts employed in the image-processing apparatus 53001 shown in FIG. 35A. The components having the same functions as their counterparts are denoted by the same reference numerals as the counterparts and the components having the same functions as their counterparts are not explained in detail in the following description.

Much like the image-processing apparatus 53001 shown in FIG. 35A, prior to execution of the main processing, on the basis of the data of a still image taken in a photographing operation, the image-processing apparatus 53011 according to this embodiment carries out a process to exclude special areas in the still image in advance from objects subjected to the processing to recognize an unidentified object. The image-processing apparatus 53011 according to the ninth embodiment is different from the image-processing apparatus 53001 according to the eighth embodiment in that the image-processing apparatus 53011 automatically sets an area to be excluded from a still image so that the operator does not need to specify such an area. For this reason, the image-processing apparatus 53011 does not have the display section 53003 and the input section 53004, which are employed in the image-processing apparatus 53001 according to the eighth embodiment shown in FIG. 35A. In addition, a processing-area setting section 53002 is also connected to the pixel-set determination section 53015.

The processing-area setting section 53002 regards a processing result received from the pixel-set determination section 53015 as an area to be excluded from a process carried out by the characteristic-quantity computation section 53013 to compute a simultaneous occurrence probability matrix and sets the area in the characteristic-quantity computation section 53013.

The characteristic-quantity computation section 53013 excludes the area from a process carried out by the characteristic-quantity computation section 53013 to compute a simultaneous occurrence probability matrix.

The image-processing apparatus according to the first, second, third, fourth, fifth, sixth, seventh, eighth and ninth embodiments described so far are particularly suitable for monitoring an environment having a single background such as a sea as explained earlier by referring to FIGS. 27A and 34. Thus, in many cases, the image taking camera is rotated so as to be capable of monitoring a wide range.

Figure 36A:
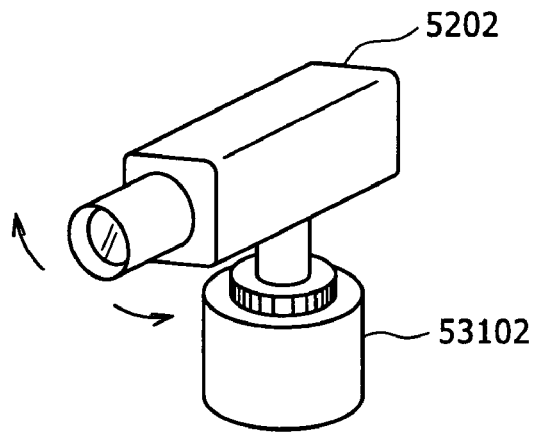
FIG. 36A is a diagram showing an external view of a typical image-taking camera employed in the embodiments.
Figure 36B:
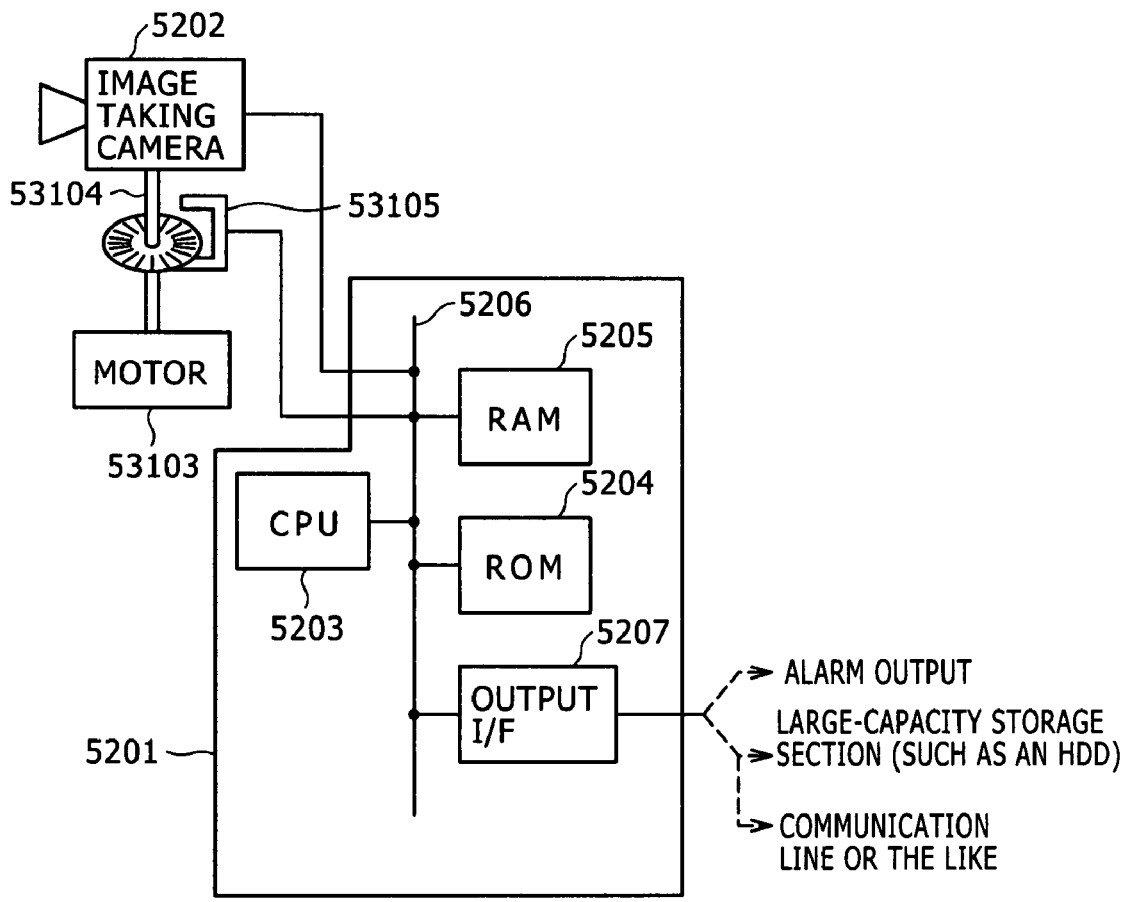
FIG. 36B is a block diagram showing a combination of the image taking camera shown in FIG. 36A and an image-processing apparatus according to any one of the embodiments.

FIG. 36A is a diagram showing an external view of the image-taking camera 5202 employed in the embodiments. FIG. 36B is a block diagram showing a combination of the image taking camera 5202 shown in FIG. 36A and the image-processing apparatus 5201.

As shown in FIG. 36A, the image taking camera 5202 is mounted on a slewing gear apparatus 53102 so as to make the image taking camera 5202 capable of monitoring a wide range.

As shown in FIG. 36B, a motor 53103 is linked to the internal portion of the image taking camera 5202 by a shaft 53104 through an angle detection section 53105, which is driven into rotation along with the image taking camera 5202. The angle detection section 53105 is typically a tachometer generator adopting an optical detection technique, a magnetic detection technique or the like.

A detection signal generated by the angle detection section 53105 as a signal representing the rotation angle of the image taking camera 5202 is supplied to a bus 5106 employed in a microcomputer serving as the image-processing apparatus 5201. In this way, a still image generated by the image taking camera 5202 can be stored in a RAM 5105 employed in the image-processing apparatus 5201 and the processing described before can be carried out every rotation angle determined in advance as a rotation of the image taking camera 5202.

In the case of the eighth and ninth embodiments, an area to be excluded from a process carried out by the characteristic-quantity computation section 53013 to compute a simultaneous occurrence probability matrix is set every rotation angle cited above as the rotation angle of the image taking camera 5202.

Typical implementations described below can each be conceived as a substitute for any of the embodiments described above.

(1): The microcomputer is replaced with a PLD (Programmable Logic Device).

(2): In the first, second and third embodiments, it is possible to add an exclusion process to exclude a background portion included in an image as a portion easy to mistakenly recognize as an unidentified object from the processing to compute characteristic quantities.

(3): The features provided by the first, second, third, fourth, fifth, sixth, seventh, eighth and ninth embodiments can all be implemented in one image-processing apparatus. In this case, flag values computed in accordance with the features of the first to ninth embodiments as the values of flags each provided for an image portion of an input image are multiplied logically by each other or subjected to an addition process to yield a resultant value to be compared with a threshold value in order to produce a result of determination as to whether or not an unidentified object exists in the input still image.

(4): An area selected by the processing-area setting section 53002, the display section 53003 and the input section 53004 in the case of the eighth embodiment or by the processing-area setting section 53002 in case of the ninth embodiment as an area to be excluded from a process carried out by the characteristic-quantity computation section 53013 to compute a simultaneous occurrence probability matrix is set in the characteristic-quantity computation section 53013. However, the area to be excluded can also be set in the pixel-set determination section 53015 in case of the eighth embodiment or the characteristic-quantity computation section 53013 in case of the ninth embodiment to give the same effects. That is to say, the area to be excluded is handled as a background and flags stored in the image-flag bitmap data area 52104 as the flags of the area are thus reset.

(5): In the layout shown in FIG. 26 as the layout of the RAM 5205, the image bitmap data area 52102 and the image-flag bitmap data area 52104 are separated from each other. However, the image bitmap data area 52102 and the image-flag bitmap data area 52104 can also be combined to form a single area.

For example, for every pixel of an image, a data structure can be created as a structure including the luminance level and flag of the pixel. With such a structure, an absolute address of the pixel can be stored in direct array data 52301. Thus, the relative-address computation process is not necessary.

(6): There are a variety of conceivable techniques for structuring a simultaneous occurrence probability matrix to be stored in the simultaneous occurrence probability matrix array data area 52103. For example, one of the techniques is implemented by making use of an associative array, which is realized in a technique for creating a relational database or a technique making use of perl or the like as the interpreter language processing system.

(7): Basically, the procedure for determining horizontal image portions of a still image can be selected arbitrarily in accordance with the image. It is ideal however to automate the procedure for determining horizontal image portions of a still image. Thus, it is possible to adopt a conceivable technique by which, the clustering technology is applied to the entire input still image in the case of the fifth embodiment explained earlier. Then, as a plurality of similar horizontal areas are recognized, a horizontal image portion covering the similar areas is determined.

In this embodiment, by reducing the size of a horizontal image portion obtained as a result of the clustering technology as a portion covering similar areas, we can expect that it is possible to make the horizontal dividing line coincide with the sea horizon. This means that the number of objects each recognized as a background in the horizontal image portion can be reduced. Thus, an increased background recognition rate can be expected.

In the embodiments described above, an unidentified object different from the background of a still image can be detected from the image, which is uniform in the horizontal direction but varies in the vertical direction. An example of such an image is a picture taken from a remote location as the picture of a natural scenery. The techniques provided by the embodiments as techniques to detect an unidentified object different from the background of a still image from the image are different from the technique based on the technology in related art as a technique of comparing the present image with an image immediately preceding the present image. In accordance the techniques provided by the embodiments, an unidentified object different from the background of a still image can be detected from the image by making use of the present still image. Thus, the embodiments are specially suitable for a monitoring configuration in which the image taking camera is mounted on a slewing gear base in a state of allowing the camera to be rotated in the clockwise and counterclockwise directions over a horizontal plane.

The embodiments adopt a variety of methods of recognizing an unidentified object existing in horizontal image portions. With such embodiments, a sea, the sky or the like can each be recognized as a background having a constant characteristic even if the sea, the sky or the like moves due to natural phenomena. The range of backgrounds includes a background moving due to a natural phenomenon.

Thus, by making use of the image-processing apparatus according to the embodiments in conjunction with an image taking camera, it is possible to provide a monitoring system in which, in comparison with the technology in related art, a background such as a sea, the sky or the like can be well recognized without mistakenly recognizing natural phenomena such as waves of the sea and clouds in the sky as an unidentified object.

The embodiments of the present invention have been described. However, the scope of the present invention is by no means limited to the embodiments. In other words, it is needless to say that other modified versions of the embodiments and other implementations can be included in the scope of the embodiments as long as the other modified versions and the other implementations do not deviate from descriptions in the claim chapter and the specifications of the present invention.

In addition, it should be understood by those skilled in the art that a variety of modifications, combinations, sub-combinations and alterations may occur in dependence on designs and other factors insofar as they are within the scope of the appended claims or the equivalents thereof.

The invention claimed is:

1. An image-processing apparatus comprising:
   an image holding section configured to store an input image;
   an image division section configured to divide said input image stored in said image holding section into a plurality of image portions having the same size and the same shape;
   a characteristic-quantity computation section configured to compute a characteristic quantity of each of said image portions generated by said image division section; and
   a difference computation section configured to carry out a difference computation process of computing a difference between said characteristic quantity computed by said characteristic-quantity computation section as the characteristic quantity of each individual one of said image portions generated by said image division section and a value determined in advance as well as a determination process of producing a result of determination as to whether or not said individual image portion is a portion of a background of said input image on the basis of said difference.

2. The image-processing apparatus according to claim 1 wherein said value determined in advance is the characteristic quantity of a sample selected from said background.

3. The image-processing apparatus according to claim 1 wherein said value determined in advance is an average value of said characteristic quantities of all said image portions composing said input image.

4. The image-processing apparatus according to claim 1 wherein
   a difference in said characteristic quantity between any two of said image portions is computed in order to produce a result of determination as to whether or not said two image portions are similar to each other,
   a grouping process based on said results of determination is carried out on said image portions generated by said image division section in order to generate groups each consisting of similar image portions, and
   each individual one of said groups each consisting of similar image portions is examined in order to produce a result of determination as to whether or not said individual group is a group of similar image portions composing said background.

5. The image-processing apparatus according to claim 1 wherein said image division section includes
   a horizontal image division section configured to divide said input image into a plurality of horizontal image portions, and
   a small image division section configured to divide each of said horizontal image portions generated by said horizontal image division section into a plurality of small image portions having the same size and the same shape
   wherein said difference computation section carries out said difference-computation process and said determination process on each individual one of said small image portions generated by said small image division section by making use of said value determined in advance for one of said horizontal image portions generated by said horizontal image division section as a horizontal image portion that includes said individual small image portion.

6. The image-processing apparatus according to claim 1, said image-processing apparatus further comprising:
   an image-portion flag holding section configured to store results of said determination processes carried out repeatedly; and
   an unidentified-object movement distance/direction computation section configured to compute the distance and direction of a movement made by an unidentified object by comparing a plurality of results stored in said image-portion flag holding section as said results of said determination processes carried out at different times.

7. An image-processing method comprising the steps of:
   dividing an input image into a plurality of image portions having the same size and the same shape;
   computing a characteristic quantity of each of said image portions generated at said image division step;
   computing a difference between said characteristic quantity computed at said characteristic-quantity computation step as the characteristic quantity of each individual one of said image portions generated at said image division step and a value determined in advance; and
   determining whether or not said individual image portion is a portion of a background of said input image on the basis of said difference computed at said difference computation step,
   wherein the method is performed using a computer or processor.

8. A non-transitory computer-readable medium which stores an image-processing program including instructions executable by a computer to perform functions comprising:
   an image division function configured to divide an input image into a plurality of image portions having the same size and the same shape;
   a characteristic-quantity computation function configured to compute a characteristic quantity of each of said image portions generated by said image division function;
   a difference computation function configured to compute a difference between said characteristic quantity computed by said characteristic-quantity computation function as the characteristic quantity of each individual one of said image portions generated by said image division function and a value determined in advance; and
   a determination function configured to produce a result of determination as to whether or not said individual image portion is a portion of a background of said input image on the basis of said difference computed by said difference computation function.

9. An image-processing apparatus comprising:
   an image holding section configured to store an input image;
   a horizontal image division section configured to divide said input image stored in said image holding section into a plurality of horizontal image portions; and an image-portion determination section configured to produce a result of determination as to whether an unidentified object exists or does not exist for each of said horizontal image portions generated by said horizontal image division section, wherein said image-portion determination section including:

a small image division section configured to divide each of said horizontal image portions generated by said horizontal image division section into a plurality of small image portions having the same size and the same shape;

a characteristic-quantity computation section configured to compute a characteristic quantity of each of said small image portions generated by said small image dividing section; and a difference computation section configured to carry out a difference computation process of computing a difference between said characteristic quantity computed by said characteristic-quantity computation section as the characteristic quantity of each individual one of said small image portions generated by said small image division section and the characteristic quantity of a sample selected from a background of said input image as well as a determination process of producing a result of determination as to whether or not said individual small image portion is a portion of said background of said input image on the basis of said difference.

10. An image-processing apparatus comprising:

an image holding section configured to store an input image;

a horizontal image division section configured to divide said input image stored in said image holding section into a plurality of horizontal image portions; and an image-portion determination section configured to produce a result of determination as to whether an unidentified object exists or does not exist for each of said horizontal image portions generated by said horizontal image division section, wherein said image-portion determination section including:

a small image division section configured to divide each of said horizontal image portions generated by said horizontal image division section into a plurality of small image portions having the same size and the same shape;

a characteristic-quantity computation section configured to compute a characteristic quantity of each of said small image portions generated by said small image dividing section; and a difference computation section configured to carry out a difference computation process of computing a difference between said characteristic quantity computed by said characteristic-quantity computation section as the characteristic quantity of each individual one of said small image portions generated by said small image division section for each individual one of said horizontal image portions generated by said horizontal image division section and an average value of the characteristic quantities of said small image portions in said individual horizontal image portion as well as a determination process of producing a result of determination as to whether or not said individual small image portion is a portion of a background of said individual horizontal image portion on the basis of said difference.

11. An image-processing apparatus comprising:

an image holding section configured to store an input image;

a horizontal image division section configured to divide said input image stored in said image holding section into a plurality of horizontal image portions; and an image-portion determination section configured to produce a result of determination as to whether an unidentified object exists or does not exist for each of said horizontal image portions generated by said horizontal image division section, wherein said image-portion determination section including:

a small image division section configured to divide each of said horizontal image portions generated by said horizontal image division section into a plurality of small image portions having the same size and the same shape;

a characteristic-quantity computation section configured to compute a characteristic quantity of each of said small image portions generated by said small image dividing section; and a clustering process section configured to perform a grouping process by carrying out a difference computation process of computing a difference between any two of said characteristic quantities computed by said characteristic-quantity computation section as the characteristic quantity of each individual one of said small image portions generated by said small image division section and the characteristic quantity of one of said small image portions, which is adjacent to said individual small image portion, carrying out a determination process of producing a result of determination as to whether or not said individual small image portion and said small image portion adjacent to said individual small image portion are similar to each other on the basis of said difference computed in said difference computation process, and putting said individual small image portion and said small image portion adjacent to said individual small image portion in a group if said determination result produced in said determination process indicates that said individual small image portion and said small image portion adjacent to said individual small image portion are similar to each other.

12. An image-processing apparatus comprising:

an image holding section configured to store an input image;

a horizontal image division section configured to divide said input image stored in said image holding section into a plurality of horizontal image portions; and an image-portion determination section configured to produce a result of determination as to whether an unidentified object exists or does not exist for each of said horizontal image portions generated by said horizontal image division section, wherein said image-portion determination section including:

a characteristic-quantity computation section configured to compute a simultaneous occurrence probability matrix of each of said horizontal image portions generated by horizontal small image dividing section;

a pixel determination section configured to compare the value of each individual one of matrix elements composing said simultaneous occurrence probability matrix generated by said characteristic-quantity computation section with a threshold value determined in advance in order to produce a result of determination as to whether or not a pixel corresponding to said individual matrix element is a pixel of a background; and a pixel-set determination section configured to produce a result of determination as to whether or not an unidentified object exists on the basis of said determination result produced by said pixel determination section.

13. The image-processing apparatus according to claim 12 wherein each matrix element of said simultaneous occurrence probability matrix computed by said characteristic-quantity computation section for each individual one of said horizontal image portions generated by said horizontal image division section is an array including the address of one of pixels composing image data in said individual horizontal image portion.

14. An image-processing method comprising the steps of:
dividing an input image into a plurality of horizontal image portions; and
producing a result of determination as to whether an unidentified object exists or does not exist for each of said horizontal image portions generated at said horizontal image division step,
wherein said image-portion determination step including the steps of:
dividing each of said horizontal image portions generated at said horizontal image division step into a plurality of small image portions having the same size and the same shape;
computing a characteristic quantity of each of said small image portions generated at said small image dividing step;
computing a difference between said characteristic quantity computed at said characteristic-quantity computation step as the characteristic quantity of each individual one of said small image portions generated at said small image dividing step and a value determined in advance; and
determining whether or not said individual small image portion is a portion of a background of said input image on the basis of said difference computed at said difference computation step, and
wherein the method is performed using a computer or processor.

15. An image-processing method comprising the steps of:
dividing an input image into a plurality of horizontal image portions; and
producing a result of determination as to whether an unidentified object exists or does not exist for each of said horizontal image portions generated at said horizontal image division step,
wherein said image-portion determination step including the steps of:
evaluating every pixel in each individual one of said horizontal image portions generated at said horizontal image division step by making use of a relative position function determined in advance in order to generate a simultaneous occurrence probability matrix for said individual horizontal image portion;
storing the address of each individual one of pixels composing each individual one of said horizontal image portions generated at said horizontal image division step in a matrix element included in said simultaneous occurrence probability matrix generated at said pixel evaluation step for said individual horizontal image portion as a matrix element corresponding to said individual pixel;
comparing the value of each individual one of matrix elements composing said simultaneous occurrence probability matrix generated at said pixel evaluation step with a threshold value determined in advance; and
producing a result of determination as to whether or not a pixel corresponding to said individual matrix element is a pixel of a background on the basis of a comparison result produced at said matrix-element comparison step, and
wherein the method is performed using a computer or processor.

16. A non-transitory computer-readable medium which stores an image-processing program including instructions executable by a computer to perform functions comprising:
a horizontal image division function configured to divide an input image into a plurality of horizontal image portions; and
an image-portion determination function configured to produce a result of determination as to whether an unidentified object exists or does not exist for each of said horizontal image portions generated by said horizontal image division function,
wherein said image-portion determination function including:
a small image division function configured to divide each of said horizontal image portions generated by said horizontal image division function into a plurality of small image portions having the same size and the same shape;
a characteristic-quantity computation function configured to compute a characteristic quantity of each of said small image portions generated by said small image dividing function;
a difference computation function configured to compute a difference between said characteristic quantity computed by said characteristic-quantity computation function as the characteristic quantity of each individual one of said small image portions generated by said small image dividing function and a value determined in advance; and
a determination function configured to produce a result of determination as to whether or not said individual small image portion is a portion of a background of said input image on the basis of said difference computed by said difference computation function.

17. A non-transitory computer-readable medium which stores an image-processing program including instructions executable by a computer to perform functions comprising:
a horizontal image division function configured to divide an input image into a plurality of horizontal image portions; and
an image-portion determination function configured to produce a result of determination as to whether an unidentified object exists or does not exist for each of said horizontal image portions generated by said horizontal image division function,
wherein said image-portion determination function including:
a function preparation function configured to prepare one or more relative position functions;
a pixel evaluation function configured to evaluate every pixel in each individual one of said horizontal image portions generated by said horizontal image division function by making use of at least one of said relative position functions prepared by said function preparation function in order to generate a simultaneous occurrence probability matrix for said individual horizontal image portion;
an address storing step of storing the address of each individual one of pixels composing each individual one of said horizontal image portions generated by said horizontal image division function in a matrix element included in said simultaneous occurrence probability matrix generated by said pixel evaluation function for said individual horizontal image portion as a matrix element corresponding to said individual pixel;

a matrix-element comparison function configured to compare the value of each individual one of matrix elements composing said simultaneous occurrence probability matrix generated by said pixel evaluation function with a threshold value determined in advance; and a pixel-set determination function configured to produce a result of determination that a pixel corresponding to said individual matrix element is a pixel of a background if said value of said individual matrix element reaches said threshold value determined in advance.

* * * * *